(12) United States Patent
Yoshimochi et al.

(10) Patent No.: US 11,743,423 B2
(45) Date of Patent: *Aug. 29, 2023

(54) TRANSMISSION DEVICE, RECEPTION DEVICE, CONTROL METHOD, PROGRAM, AND TRANSMISSION AND RECEPTION SYSTEM

(71) Applicant: Sony Semiconductor Solutions Corporation, Kanagawa (JP)

(72) Inventors: Naoki Yoshimochi, Tokyo (JP); Masatoshi Mizuno, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,838

(22) Filed: Dec. 1, 2021

(65) Prior Publication Data

US 2022/0094878 A1 Mar. 24, 2022

Related U.S. Application Data

(63) Continuation of application No. 16/618,625, filed as application No. PCT/JP2018/020115 on May 25, 2018, now Pat. No. 11,196,961.

(30) Foreign Application Priority Data

Jun. 9, 2017 (JP) ................................. 2017-114381

(51) Int. Cl.
*H04N 7/20* (2006.01)
*H04N 7/12* (2006.01)
(Continued)

(52) U.S. Cl.
CPC ............... *H04N 7/12* (2013.01); *G06F 13/20* (2013.01); *H04N 7/0352* (2013.01); *H04N 7/0357* (2013.01)

(58) Field of Classification Search
CPC ........... G06F 13/20; G06F 3/147; H04N 7/12; G09G 5/006
See application file for complete search history.

(56) References Cited

U.S. PATENT DOCUMENTS 8,867,895 B2   10/2014   Hosokawa
8,970,750 B2   3/2015   Sugioka et al.
(Continued)

FOREIGN PATENT DOCUMENTS

EP   2640055 A1   9/2013
JP   2003-218843 A   7/2003
(Continued)

OTHER PUBLICATIONS

Extended European Search Report dated Apr. 2, 2020 for corresponding European Application No. 18813300.3.
(Continued)

*Primary Examiner* — Henry Tsai
*Assistant Examiner* — Christopher A Daley
(74) *Attorney, Agent, or Firm* — Michael Best & Friedrich LLP

(57) ABSTRACT

The present technology relates to a transmission device, a reception device, a control method, a program, and a transmission and reception system capable of increasing a data transmission efficiency.
In a case where a data stream is transmitted in a predetermined mode, and when a parameter that defines content of the mode is changed, the transmission device according to one aspect of the present technology switches transmission of the data stream in the mode defined by the changed parameter is started after training processing for performing data synchronization and correction of a difference between data timings of the lanes by the reception device is executed or is started without executing the training processing
(Continued)

according to a type of a parameter to be changed. The present technology is applied to data transmission between chips.

19 Claims, 59 Drawing Sheets

(51) Int. Cl.
    *G06F 13/20*     (2006.01)
    *H04N 7/035*     (2006.01)

(56) References Cited

U.S. PATENT DOCUMENTS

| | | |
|---|---|---|
| 10,075,566 B2 | 9/2018 | Lee et al. |
| 2001/0008547 A1 | 7/2001 | Oh |
| 2008/0049029 A1 | 2/2008 | Kurata |
| 2012/0120289 A1 | 5/2012 | Sugioka |
| 2012/0224712 A1 | 9/2012 | Shiba |
| 2014/0108686 A1 | 4/2014 | Wagh |
| 2014/0215245 A1 | 7/2014 | Zhang et al. |

FOREIGN PATENT DOCUMENTS

| | | |
|---|---|---|
| JP | 2012-120159 A | 6/2012 |
| JP | 2012120158 A | 6/2012 |
| JP | 2015-015533 A | 1/2015 |
| JP | 2015-076621 A | 4/2015 |
| WO | 2012/063949 A1 | 5/2012 |
| WO | 2014/147743 A1 | 9/2014 |

OTHER PUBLICATIONS

Chen Chaoliang et al., Reconfigurable Implementation of Image Processing System for Small Satellite Platform "Electro-Optic Technology Application" No. 3 Jun. 15, 2016 full text.

FIG. 7

| LARGE ITEM | SMALL ITEM | INFORMATION AMOUNT | CONTENT |
|---|---|---|---|
| FRAME INFORMATION | Frame Start | 1bit | INDICATE HEAD OF FRAME (EXAMPLE: FIRST LINE) |
| | Frame End | 1bit | INDICATE END OF FRAME (EXAMPLE: LINE BEFORE REAR DUMMY) |
| LINE INFORMATION | Line Valid | 1bit | INDICATE VALID/INVALID LINE |
| | Line Number | 13bit | INDICATE LINE NUMBER |
| OTHERS | Reserved | 32bit | SECURE FOR EXTENSIBILITY IN FUTURE |
| | Header ECC | 18byte | ECC OF HEADER INFORMATION |

FIG. 8

| Byte | Bit | Contents |
|---|---|---|
| H1 | 15 | CRC[15] X^15 |
| | 14 | CRC[14] X^14 |
| | 13 | CRC[13] X^13 |
| | 12 | CRC[12] X^12 |
| | 11 | CRC[11] X^11 |
| | 10 | CRC[10] X^10 |
| | 9 | CRC[9] X^9 |
| | 8 | CRC[8] X^8 |
| H0 | 7 | CRC[7] X^7 |
| | 6 | CRC[6] X^6 |
| | 5 | CRC[5] X^5 |
| | 4 | CRC[4] X^4 |
| | 3 | CRC[3] X^3 |
| | 2 | CRC[2] X^2 |
| | 1 | CRC[1] X^1 |
| | 0 | CRC[0] X^0 |

| Byte | Bit | Contents |
|---|---|---|
| H3 | 31 | Reserved[15] |
| | 30 | Reserved[14] |
| | 29 | Reserved[13] |
| | 28 | Reserved[12] |
| | 27 | Reserved[11] |
| | 26 | Reserved[10] |
| | 25 | Reserved[9] |
| | 24 | Reserved[8] |
| H2 | 23 | Reserved[7] |
| | 22 | Reserved[6] |
| | 21 | Reserved[5] |
| | 20 | Reserved[4] |
| | 19 | Reserved[3] |
| | 18 | Reserved[2] |
| | 17 | Reserved[1] |
| | 16 | Reserved[0] |

| Byte | Bit | Contents |
|---|---|---|
| H5 | 47 | Reserved[31] |
| | 46 | Reserved[30] |
| | 45 | Reserved[29] |
| | 44 | Reserved[28] |
| | 43 | Reserved[27] |
| | 42 | Reserved[26] |
| | 41 | Reserved[25] |
| | 40 | Reserved[24] |
| H4 | 39 | Reserved[23] |
| | 38 | Reserved[22] |
| | 37 | Reserved[21] |
| | 36 | Reserved[20] |
| | 35 | Reserved[19] |
| | 34 | Reserved[18] |
| | 33 | Reserved[17] |
| | 32 | Reserved[16] |

| Byte | Bit | Contents |
|---|---|---|
| H7 | 63 | Frame Start |
| | 62 | Frame End |
| | 61 | Line Valid |
| | 60 | Line Number[12] |
| | 59 | Line Number[11] |
| | 58 | Line Number[10] |
| | 57 | Line Number[9] |
| | 56 | Line Number[8] |
| H6 | 55 | Line Number[7] |
| | 54 | Line Number[6] |
| | 53 | Line Number[5] |
| | 52 | Line Number[4] |
| | 51 | Line Number[3] |
| | 50 | Line Number[2] |
| | 49 | Line Number[1] |
| | 48 | Line Number[0] |

FIG. 12

| Pixel | Bit |
|---|---|
| Pixel N | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |
| Pixel N+1 | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |
| Pixel N+2 | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |
| Pixel N+3 | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |

⇒

| Byte | Bit | Pixel |
|---|---|---|
| Byte 1.75*N | Data[13] | Pixel N |
| | Data[12] | |
| | Data[11] | |
| | Data[10] | |
| | Data[9] | |
| | Data[8] | |
| | Data[7] | |
| | Data[6] | |
| Byte 1.75*N+1 | Data[13] | Pixel N+1 |
| | Data[12] | |
| | Data[11] | |
| | Data[10] | |
| | Data[9] | |
| | Data[8] | |
| | Data[7] | |
| | Data[6] | |
| Byte 1.75*N+2 | Data[13] | Pixel N+2 |
| | Data[12] | |
| | Data[11] | |
| | Data[10] | |
| | Data[9] | |
| | Data[8] | |
| | Data[7] | |
| | Data[6] | |
| Byte 1.75*N+3 | Data[13] | Pixel N+3 |
| | Data[12] | |
| | Data[11] | |
| | Data[10] | |
| | Data[9] | |
| | Data[8] | |
| | Data[7] | |
| | Data[6] | |
| Byte 1.75*N+4 | Data[5] | Pixel N |
| | Data[4] | |
| | Data[3] | |
| | Data[2] | |
| | Data[1] | |
| | Data[0] | |
| | Data[5] | Pixel N+1 |
| | Data[4] | |
| Byte 1.75*N+5 | Data[3] | |
| | Data[2] | |
| | Data[1] | |
| | Data[0] | |
| | Data[5] | Pixel N+2 |
| | Data[4] | |
| | Data[3] | |
| | Data[2] | |
| Byte 1.75*N+6 | Data[1] | |
| | Data[0] | |
| | Data[5] | Pixel N+3 |
| | Data[4] | |
| | Data[3] | |
| | Data[2] | |
| | Data[1] | |
| | Data[0] | |

FIG. 21

| PHY CONTROL CODE | USE APPLICATION | 8B10B SYMBOL CONFIGURATION | | |
|---|---|---|---|---|
| Idle Code | SYMBOL GROUP USED TO CONTINUOUSLY TOGGLE OUTPUT SIGNAL IN PERIOD OTHER THAN TIME WHEN PACKET IS TRANSMITTED (MARGIN PERIOD AND THE LIKE) | D00.0 | | |
| Start Code | INDICATE START OF PACKET (LINE/H) | K28.5 | K28.2 | K27.7 |
| End Code | INDICATE END OF PACKET (LINE/H) | K28.5 | K28.7 | K29.7 |
| Pad Code | Padding SYMBOL GROUP THAT IS INSERTED SO AS TO FILL DIFFERENCE BETWEEN PIXEL DATA (PAYLOAD DATA) BAND AND PHY TRANSMISSION BAND | K23.7 | K28.4 | K28.6 |
| Sync Code | SYMBOL GROUP USED TO SECURE BIT SYNCHRONIZATION OF I/F AND 8B10B SYMBOL SYNCHRONIZATION | K28.5 | Any** | ← |
| Deskew Code | SYMBOL GROUP USED AS MARKING SO AS TO ADJUST Data Skew BETWEEN LANES | K28.5 | Any** | ← |
| Standby Code | SYMBOL GROUP USED TO NOTIFY RX SIDE THAT TX OUTPUT BECOMES High-Z | K28.5 | Any** | ← |

FIG. 22

Control Symbol

| Code | 8B<br>HGF_EDCBA | 10B<br>abcdei_fghj | | memo |
|---|---|---|---|---|
| | | RD- | RD+ | |
| K23.7 | 11110111 | 1110101000 | 0001010111 | Used in Pad Code |
| K27.7 | 11111011 | 1101101000 | 0010010111 | Used in Start Code |
| K28.0 | 00011100 | 0011110100 | 1100001011 | Reserved |
| K28.1 | 00111100 | 0011111001 | 1100000110 | Reserved |
| K28.2 | 01011100 | 0011110101 | 1100001010 | Used in Start Code |
| K28.3 | 01111100 | 0011110011 | 1100001100 | Used in Pad Code |
| K28.4 | 10011100 | 0011110010 | 1100001101 | Used in Pad Code |
| K28.5 | 10111100 | 0011111010 | 1100000101 | Comma Character |
| K28.6 | 11011100 | 0011110110 | 1100001001 | Used in Pad Code |
| K28.7 | 11111100 | 0011111000 | 1100000111 | Reserved |
| K29.7 | 11111101 | 1011101000 | 0100010111 | Used in End Code |
| K30.7 | 11111110 | 0111101000 | 1000010111 | Used in End Code |

FIG. 32

| LARGE ITEM | SMALL ITEM | INFORMATION AMOUNT | CONTENT |
|---|---|---|---|
| FRAME INFORMATION | Frame Start | 1bit | INDICATE HEAD OF FRAME (EXAMPLE: FIRST LINE) |
| | Frame End | 1bit | INDICATE END OF FRAME (EXAMPLE: LINE BEFORE REAR DUMMY) |
| LINE INFORMATION | Line Valid | 1bit | INDICATE VALID/INVALID LINE |
| | Line Number | 13bit | INDICATE LINE NUMBER |
| | Embedded Line | 1bit | INDICATE EMBEDDED LINE NUMBER |
| DATA INFORMATION | Data ID | Pbit | INDICATE DATA IDENTIFICATION |
| REGION INFORMATION | Region Number | 1bit | INDICATE REGION NUMBER |
| OTHERS | Reserved | 30-Pbit | SECURE FOR EXTENSIBILITY IN FUTURE |
| | Header ECC | 18byte | ECC OF HEADER INFORMATION |

FIG. 36

| Register | Description | Unit | Range | Default |
|---|---|---|---|---|
| Lane Num | Set the number of Lane | - | 1,2,4,6,8 | - |
| Pixel Bit | Set the number of bits per pixel | Bit | 8,10,12,14,16 | - |
| Line Length | Set the number of pixels per line | Pixel | 4 OR MORE | - |
| ECC Option | Set an option of Payload Data ECC | - | 0,1,2 | 0 |
| CRC Option | Set an option of Packet Footer (CRC) | - | On,Off | Off |
| Baud Grade | Set a grade of PHY baud rate | - | (Grade1),Grade2 | Grade2 |

FIG. 50

| LARGE ITEM | SMALL ITEM | INFORMATION AMOUNT | CONTENT |
|---|---|---|---|
| FRAME INFORMATION | Frame Start | 1bit | INDICATE HEAD OF FRAME (EXAMPLE: FIRST LINE) |
| | Frame End | 1bit | INDICATE END OF FRAME (EXAMPLE: LINE BEFORE REAR DUMMY) |
| LINE INFORMATION | Line Valid | 1bit | INDICATE VALID/INVALID LINE |
| | Line Number | 13bit | INDICATE LINE NUMBER |
| | Embedded Line | 1bit | INDICATE EMBEDDED LINE NUMBER |
| DATA INFORMATION | Data ID | 4bit | INDICATE DATA IDENTIFICATION |
| OTHERS | Reserved | 27bit | SECURE FOR EXTENSIBILITY IN FUTURE |
| | Header ECC | 18byte | ECC OF HEADER INFORMATION |

FIG. 51

DEFINITION OF Reserved[26:0]

| Name | Value |
|---|---|
| Reserved[26:24] | Information Type[2:0]<br>3'd0: RESERVE REGION IS NOT USED<br>(DUE TO COMPATIBILITY WITH OLD VERSION)<br>3'd1: Parameter Change Indicator<br>Others: Reserved |
| Reserved[23:0] | Additional Information[23:0]<br>DEFINE FOR EACH Information Type |

FIG. 52

DEFINITION OF Additional Information [23:0]
AT THE TIME WHEN Information Type=3'd1

| Name | Value |
|---|---|
| Additional Information[23] | Parameter Change Indicator<br>1'b1:Parameter change occurs<br>1'b0:Parameter change doesn't occur |
| Additional Information[22:0] | Reserved |

FIG. 54

DEFINITION OF Reserved [26:0]

| Name | Value |
|---|---|
| Reserved[26:24] | Information Type[2:0]<br>3'd0: RESERVE REGION IS NOT USED<br>(DUE TO COMPATIBILITY WITH OLD VERSION)<br>3'd1: Link Parameters<br>Others: Reserved |
| Reserved[23:0] | Additional Information[23:0]<br>DEFINE FOR EACH Information Type |

FIG. 55

DEFINITION OF Additional Information [23:0]
AT THE TIME WHEN Information Type = 3'd1

| Name | Value |
|---|---|
| Additional Information[23:21] | Pixel Bit.<br>3'd0:8bit/pixel     3'd1:10bit/pixel<br>3'd2:12bit/pixel     3'd3:14bit/pixel<br>3'd4:16bit/pixel     Others:Reserved |
| Additional Information[20:3] | Line Length.<br>SET THE NUMBER OF Pixels PER Line<br>4 to 262140 PIXELS CAN BE SET |
| Additional Information[2:1] | ECC Option.<br>2'd0:ECC Option 0     2'd1:ECC Option 1<br>2'd2:ECC Option 2     2'd3:Reserved |
| Additional Information[0] | CRC Option.<br>1'b1:CRC ON     1'b0:CRC OFF |

TRANSMISSION DEVICE, RECEPTION DEVICE, CONTROL METHOD, PROGRAM, AND TRANSMISSION AND RECEPTION SYSTEM

CROSS REFERENCES TO RELATED APPLICATIONS

The present application is a Continuation application of U.S. patent application Ser. No. 16/618,625 filed Dec. 2, 2019, which is a 371 National Stage Entry of International Application No.: PCT/JP2018/020115, filed on May 25, 2018, which in turn claims priority from Japanese Application No. 2017-114381, filed on Jun. 9, 2017, the entire contents of which are incorporated herein by reference.

TECHNICAL FIELD

The present technology relates to a transmission device, a reception device, a control method, a program, and a transmission and reception system, and particularly, to a transmission device, a reception device, a control method, a program, and a transmission and reception system capable of increasing a data transmission efficiency.

BACKGROUND ART

As image quality and a frame rate of an image sensor increase, a data transmission amount required for an interface between the image sensor and a Digital Signal Processor (DSP) that processes an image captured by the image sensor increases.

Patent Document 1 describes a transmission method in which a packet storing image data is distributed into a plurality of lanes and data is transmitted from an image sensor to a DSP via the plurality of lanes. In this transmission method, the image data forming each line of one frame is stored in each packet in the image sensor and is transmitted to the DSP.

CITATION LIST

Patent Document

Patent Document 1: Japanese Patent Application Laid-Open No. 2012-120159

SUMMARY OF THE INVENTION

Problems to be Solved by the Invention

In a case where data transmission is temporarily stopped and resynchronization by a CDR on a reception side and training processing for correcting Data Skew between lanes (difference between data reception timings) are performed each time when a data transmission mode is changed, a transmission efficiency decreases.

For example, image data cannot be transmitted during the training processing, and it is necessary to transmit invalid data used to perform the training processing, and the transmission efficiency decreases by an amount of such invalid data to be transmitted.

The present technology has been made in consideration of such a situation and can increase a data transmission efficiency.

Solutions to Problems

A transmission device according to a first aspect of the present technology includes a distribution unit that distributes packet data configuring a packet that stores data to be transmitted into a plurality of lanes, a plurality of signal processing units that transmits data streams having the same data structure including the distributed packet data to a reception device by using the plurality of lanes in parallel, and a control unit that, in a case where the data stream is transmitted in a predetermined mode, when a parameter that defines content of the mode is changed, switches transmission of the data stream in the mode defined by the changed parameter is started after training processing for performing data synchronization and correction of a difference between data timings of the lanes by the reception device is executed or without executing the training processing according to a type of the parameter to be changed.

A reception device according to a second aspect of the present technology includes a plurality of signal processing units that distributes packet data configuring a packet that stores data to be transmitted into a plurality of lanes and receives data streams transmitted from a transmission device that transmits the data streams having the same data structure including the distributed packet data by using the plurality of lanes in parallel and a control unit that, in a case where the data stream is transmitted in a predetermined mode, when a parameter that defines content of the mode is changed, switches the reception of the data stream transmitted in the mode defined by the changed parameter is started after training processing for performing data synchronization and correction of a difference between data timings of the lanes is executed or without executing the training processing according to a type of the parameter to be changed.

In the first aspect of the present technology, in a case where a data stream is transmitted in a predetermined mode, and when a parameter that defines content of the mode is changed, to start transmission of the data stream in the mode defined by the changed parameter after training processing for performing data synchronization and correction of a difference between data timings of the lanes by the reception device is executed or to start the transmission of the data stream without executing the training processing can be switched according to a type of a parameter to be changed.

In the second aspect of the present technology, in a case where a data stream is transmitted in a predetermined mode, and when a parameter that defines content of the mode is changed, to start the reception of the data stream transmitted in the mode defined by the changed parameter after training processing for performing data synchronization and correction of a difference between data timings of the lanes is executed or to start the reception of the data stream without executing the training processing can be switched according to a type of a parameter to be changed.

Effects of the Invention

According to the present technology, a data transmission efficiency can be increased.

Note that the effects described herein are not limited and that the effect may be any effects described in the present disclosure.

BRIEF DESCRIPTION OF DRAWINGS

FIG. 7 is a diagram illustrating contents and an information amount of header information.

FIG. 8 is a diagram illustrating an example of a bit arrangement.

FIG. 12 is a diagram illustrating an example of Pixel to Byte conversion in a case where a pixel value of each pixel is represented by 14 bits.

FIG. 21 is a diagram illustrating examples of control codes.

FIG. 22 is a diagram illustrating values of K Character.

FIG. 32 illustrates contents of the header information.

FIG. 36 is a diagram illustrating an example of a parameter set to a register.

FIG. 50 is a diagram illustrating an example of information stored in a header.

FIG. 51 is a diagram illustrating an example of reserve region allocation.

FIG. 52 is a diagram illustrating an example of Additional Information.

FIG. 54 is a diagram illustrating another example of the reserve region allocation.

FIG. 55 is a diagram illustrating an example of Additional Information.

MODE FOR CARRYING OUT THE INVENTION

Embodiments for carrying out the present technology will be described below. The description will be made in the following order.

1. Regarding Data Transmission
2. Regarding Mode Change
  (1) Normal Mode Change
  (2) Mode Change in Which Training Sequence Is Omitted
  (3) Simplified Mode Change in Which No Invalid Frame Is Transmitted
3. Modification
4. Application Example

1. Regarding Data Transmission

[Exemplary Configuration of Transmission System]

Figure 1:
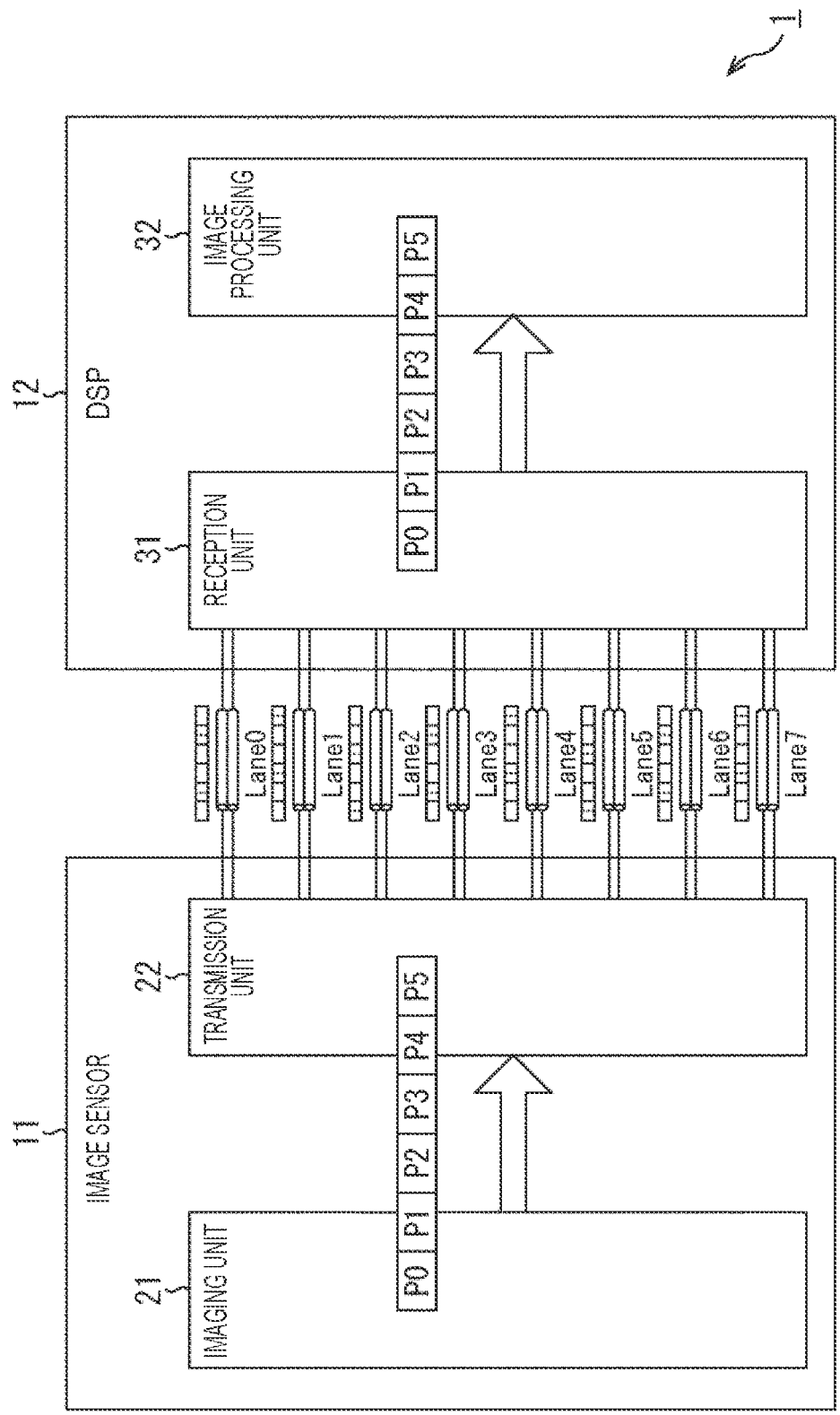
FIG. 1 is a diagram illustrating a first exemplary configuration of a transmission system.

FIG. 1 is a diagram illustrating a first exemplary configuration of a transmission system according to one embodiment of the present technology.

A transmission system 1 in FIG. 1 includes an image sensor 11 and a DSP 12. The image sensor 11 and the DSP 12 are respectively configured by Large Scale Integrated Circuits (LSI) different from each other and are provided in the same imaging device having an imaging function such as a digital camera and a mobile phone. An imaging unit 21 and a single transmission unit 22 are provided in the image sensor 11, and a single reception unit 31 and an image processing unit 32 are provided in the DSP 12.

The imaging unit 21 of the image sensor 11 includes an imaging element such as a Complementary Metal Oxide Semiconductor (CMOS) and photoelectrically converts light received via a lens. Furthermore, the imaging unit 21 performs A/D conversion on a signal acquired by the photoelectric conversion, for example, and outputs pixel data included in a one-frame image to the transmission unit 22 in order by one-pixel data.

The transmission unit 22 allocates the data of each pixel supplied from the imaging unit 21 to a plurality of transmission paths, for example, in an order of the supplement from the imaging unit 21 and transmits the data to the DSP 12 via the plurality of transmission paths in parallel. In the example in FIG. 1, the pixel data is transmitted by using eight transmission paths. The transmission path between the image sensor 11 and the DSP 12 may be a wired transmission path or a wireless transmission path. Hereinafter, the transmission path between the image sensor 11 and the DSP 12 is appropriately referred to as a lane (Lane).

The reception unit 31 of the DSP 12 receives the pixel data transmitted from the transmission unit 22 via the eight lanes and outputs the data of each pixel to the image processing unit 32 in order.

The image processing unit 32 generates a one-frame image on the basis of the pixel data supplied from the reception unit 31 and executes various image processing by using the generated image. The pixel data transmitted from the image sensor 11 to the DSP 12 is RAW data, and the image processing unit 32 executes various processing such as compression of the image data, display of the image, recording of the image data to a recording medium, and the like.

Figure 2:
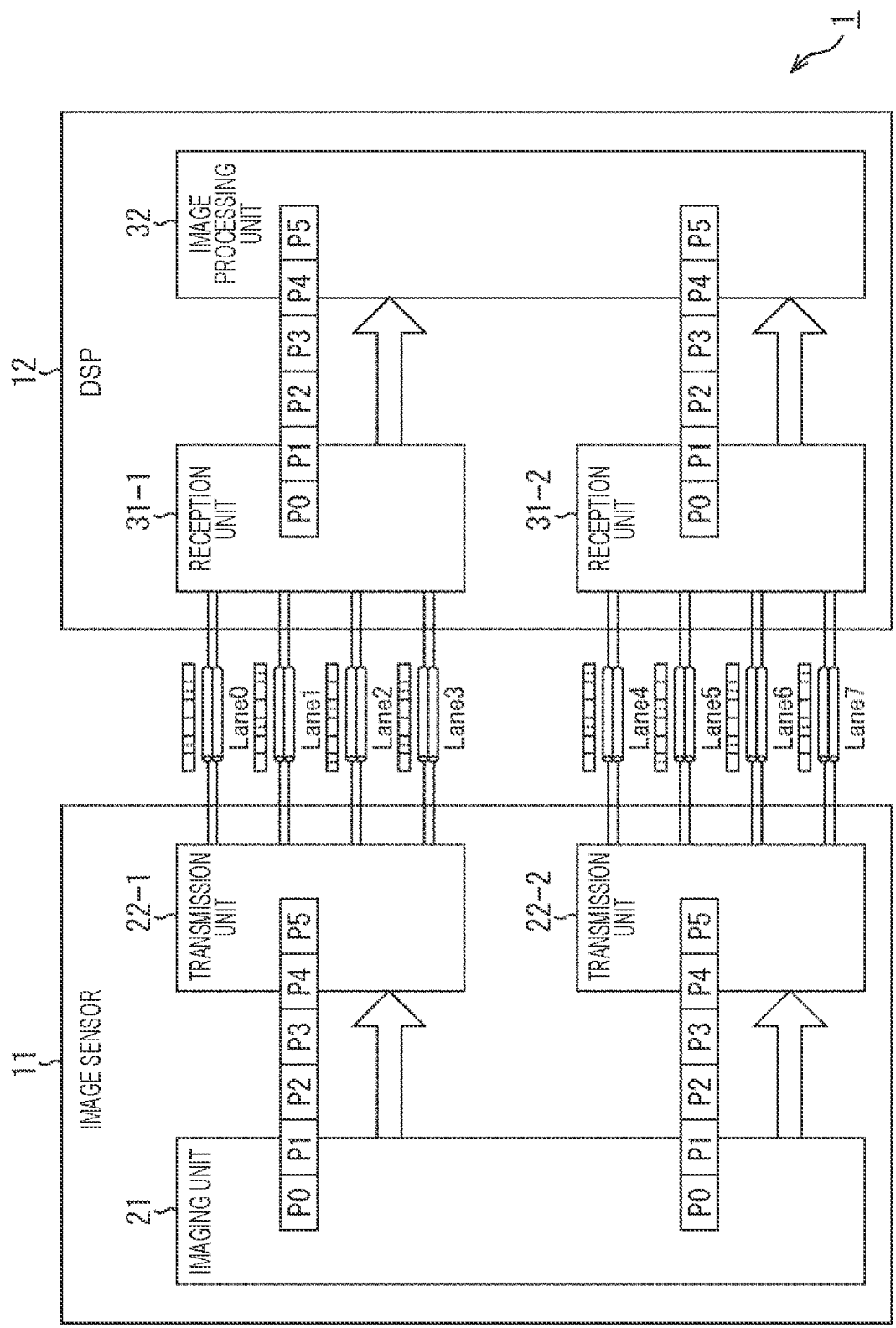
FIG. 2 is a diagram illustrating a second exemplary configuration of the transmission system.

FIG. 2 is a diagram illustrating a second exemplary configuration of the transmission system 1. Components illustrated in FIG. 2 same as the components illustrated in FIG. 1 are respectively denoted with the same reference numerals. The overlapped description will be appropriately omitted.

The imaging unit 21 and two transmission units 22-1 and 22-2 are provided in the image sensor 11 of the transmission system 1 in FIG. 2, and two reception units 31-1 and 31-2 and the image processing unit 32 are provided in the DSP 12.

The imaging unit 21 outputs pixel data included in one-frame image acquired by imaging to the transmission units 22-1 and 22-2 in parallel by one-pixel data. For example, the imaging unit 21 outputs data of pixels in odd-number lines to the transmission unit 22-1 and outputs data of pixels in even-number lines to the transmission unit 22-2.

The transmission unit 22-1 allocates the data of each pixel supplied from the imaging unit 21 to a plurality of lanes, for example, in an order of the supplement from the imaging unit 21 and transmits the data to the DSP 12 via the plurality of lanes in parallel. The transmission unit 22-2 similarly allocates the data of each pixel supplied from the imaging unit 21 to a plurality of lanes, for example, in an order of the supplement from the imaging unit 21 and transmits the data to the DSP 12 via the plurality of lanes in parallel.

In the example in FIG. 2, the image sensor 11 is connected to the DSP 12 via the eight lanes. Each of the transmission units 22-1 and 22-2 transmits the pixel data by using four lanes.

The reception unit 31-1 of the DSP 12 receives the pixel data transmitted from the transmission unit 22-1 via the four lanes and outputs the data of each pixel to the image processing unit 32 in order. The reception unit 31-2 of the DSP 12 similarly receives the pixel data transmitted from the transmission unit 22-2 via the four lanes and outputs the data of each pixel to the image processing unit 32 in order.

The image processing unit 32 generates a one-frame image on the basis of the pixel data supplied from the reception unit 31-1 and the pixel data supplied from the reception unit 31-2 and executes various image processing by using the generated image.

As illustrated in FIG. 2, by providing the two transmission units in the image sensor 11 and providing the two reception units in the DSP 12 in correspondence with the two transmission units, even in a case where a rate of the pixel data output from the imaging unit 21 is high, the pixel data can be transmitted to the DSP 12.

Figure 3:
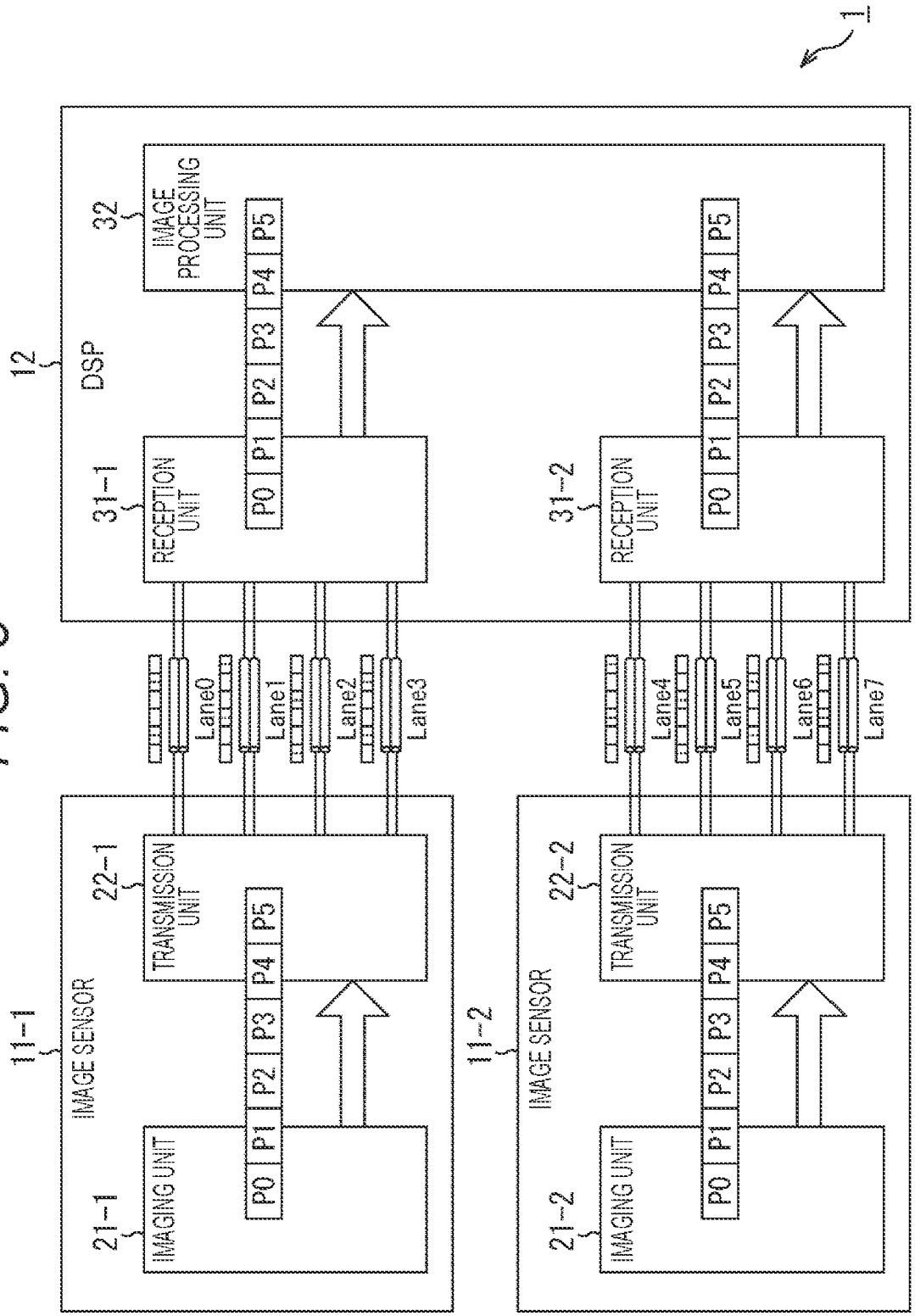
FIG. 3 is a diagram illustrating a third exemplary configuration of the transmission system.

FIG. 3 is a diagram illustrating a third exemplary configuration of the transmission system 1. Components illustrated in FIG. 3 same as the components illustrated in FIG. 1 are respectively denoted with the same reference numerals. The overlapped description will be appropriately omitted.

In the transmission system 1 in FIG. 3, two image sensors including image sensors 11-1 and 11-2 are provided. An imaging unit 21-1 and a transmission unit 22-1 that is one transmission unit are provided in the image sensor 11-1, and an imaging unit 21-2 and a transmission unit 22-2 that is one transmission unit are provided in the image sensor 11-2. As in a case of FIG. 2, the reception units 31-1 and 31-2 that are two reception units and the image processing unit 32 are provided in the DSP 12.

The imaging unit 21-1 of the image sensor 11-1 outputs pixel data included in the one-frame image acquired by imaging to the transmission unit 22-1 in order by one-pixel data.

The transmission unit 22-1 allocates the data of each pixel supplied from the imaging unit 21-1 to a plurality of lanes, for example, in an order of the supplement from the imaging unit 21-1 and transmits the data to the DSP 12 via the plurality of lanes in parallel.

The imaging unit 21-2 of the image sensor 11-2 outputs pixel data included in the one-frame image acquired by imaging to the transmission unit 22-2 in order by one-pixel data.

The transmission unit 22-2 allocates the data of each pixel supplied from the imaging unit 21-2 to a plurality of lanes, for example, in an order of the supplement from the imaging unit 21-2 and transmits the data to the DSP 12 via the plurality of lanes in parallel.

In the example in FIG. 3, the image sensor side is connected to the DSP 12 via the eight lanes. Four lanes are allocated to each of the image sensors 11-1 and 11-2, and each of the transmission units 22-1 and 22-2 transmits the pixel data by using the four lanes.

The reception unit 31-1 of the DSP 12 receives the pixel data transmitted from the transmission unit 22-1 of the image sensor 11-1 via the four lanes and outputs the data of each pixel to the image processing unit 32 in order. The reception unit 31-2 similarly receives the pixel data transmitted from the transmission unit 22-2 of the image sensor 11-2 via the four lanes and outputs the data of each pixel to the image processing unit 32 in order.

The image processing unit 32 generates one-frame image on the basis of the pixel data supplied from the reception unit 31-1 and generates one-frame image on the basis of the pixel data supplied from the reception unit 31-2. The image processing unit 32 executes various image processing by using the generated images.

By providing the two image sensors as illustrated in FIG. 3, a single DSP 12 can process a 3D image including an image for a left eye imaged by the image sensor 11-1 and an image for a right eye imaged by the image sensor 11-2, for example. There is a parallax between the image for the left eye and the image for the right eye.

As described above, in the image sensor of the transmission system 1, one or the plurality transmission units that transmits the imaged one-frame image data is provided. On the other hand, in the DSP, one or the plurality of reception units that receives the data transmitted from the image sensor is provided in correspondence with the transmission unit of the image sensor.

Hereinafter, data transmission in the transmission system 1 in FIG. 1 in which the one transmission unit is provided in the image sensor 11 and the one reception unit is provided in the DSP 12 will be described. Data is similarly transmitted between the transmission unit 22-1 and the reception unit 31-1 and between the transmission unit 22-2 and the reception unit 31-2 in FIGS. 2 and 3.

[Frame Format]

Figure 4:
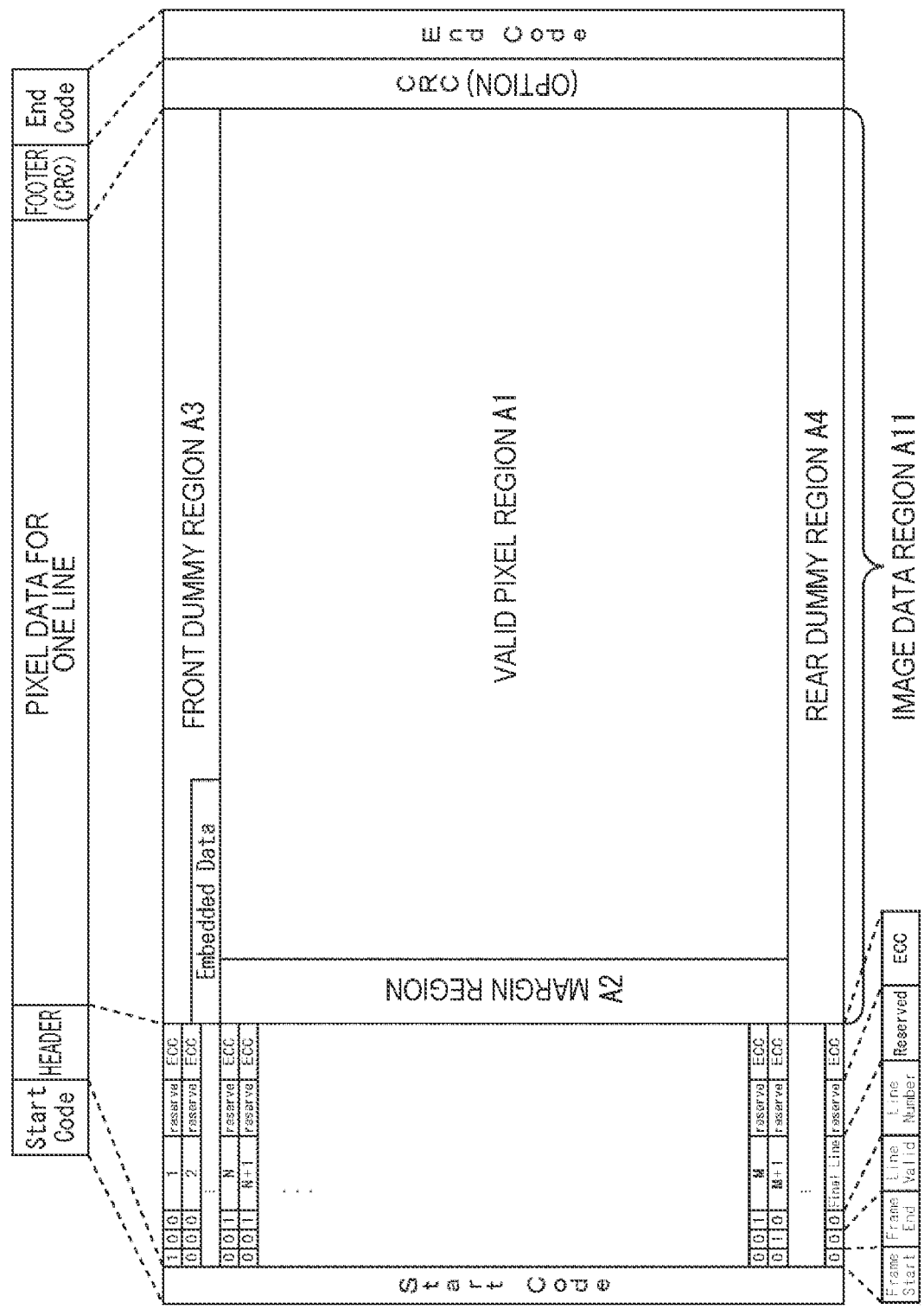
FIG. 4 is a diagram illustrating an example of a frame format.

FIG. 4 is a diagram illustrating an example of a format used to transmit the one-frame image data between the image sensor 11 and the DSP 12.

An valid pixel region A1 is a region of a valid pixel of a one-frame image imaged by the imaging unit 21. On the left side of the valid pixel region A1, a margin region A2, of which the number of pixels arranged in the vertical direction is the same as the number of pixels of the valid pixel region A1 in the vertical direction, is set.

On the upper side of the valid pixel region A1, a front dummy region A3, of which the number of pixels in the horizontal direction is the same as the number of pixels of an entire region including the valid pixel region A1 and the margin region A2 in the horizontal direction, is set. In the example in FIG. 4, Embedded Data is inserted in the front dummy region A3. Embedded Data includes information regarding a setting value regarding imaging by the imaging unit 21 such as a shutter speed, an aperture value, and a gain. Embedded data may be inserted into a rear dummy region A4.

On the lower side of the valid pixel region A1, the rear dummy region A4, of which the number of pixels in the horizontal direction is the same as the number of pixels of an entire region including the valid pixel region A1 and the margin region A2 in the horizontal direction, is set.

The valid pixel region A1, the margin region A2, the front dummy region A3, and the rear dummy region A4 constitute an image data region A11.

A header is added before each line included in the image data region A11, and Start Code is added before the header. Furthermore, a footer is optionally added after each line included in the image data region A11, and a control code as described later such as End Code is added after the footer.

In a case where no footer is added, the control code such as End Code is added after each line included in the image data region A11.

Each time when the one-frame image imaged by the imaging unit 21 is transmitted from the image sensor 11 to the DSP 12, entire data of the format illustrated in FIG. 4 is transmitted as transmission data.

An upper band in FIG. 4 indicates a packet structure used for transmission of the transmission data illustrated on the lower side. When arrangement of the pixels in the horizontal direction is assumed as a line, data of pixels included in a single line of the image data region A11 is stored in a payload of a packet. The entire one-frame image data is transmitted by using packets more than the number of pixels of the image data region A11 in the vertical direction.

A header and a footer are added to the payload storing pixel data for one line so as to form a single packet. As will be described in detail later, the header includes additional information of the pixel data stored in the payload such as Frame Start, Frame End, Line Valid, Line Number, and ECC. At least Start Code and End Code which are the control codes are added to each packet.

In this way, by adopting a format in which the pixel data included in the one-frame image is transmitted for each line, it is possible to transmit the additional information such as the header and the control code such as Start Code and End Code in a blanking interval of each line.

[Configuration of Transmission Unit 22 and Reception Unit 31]

Figure 5:
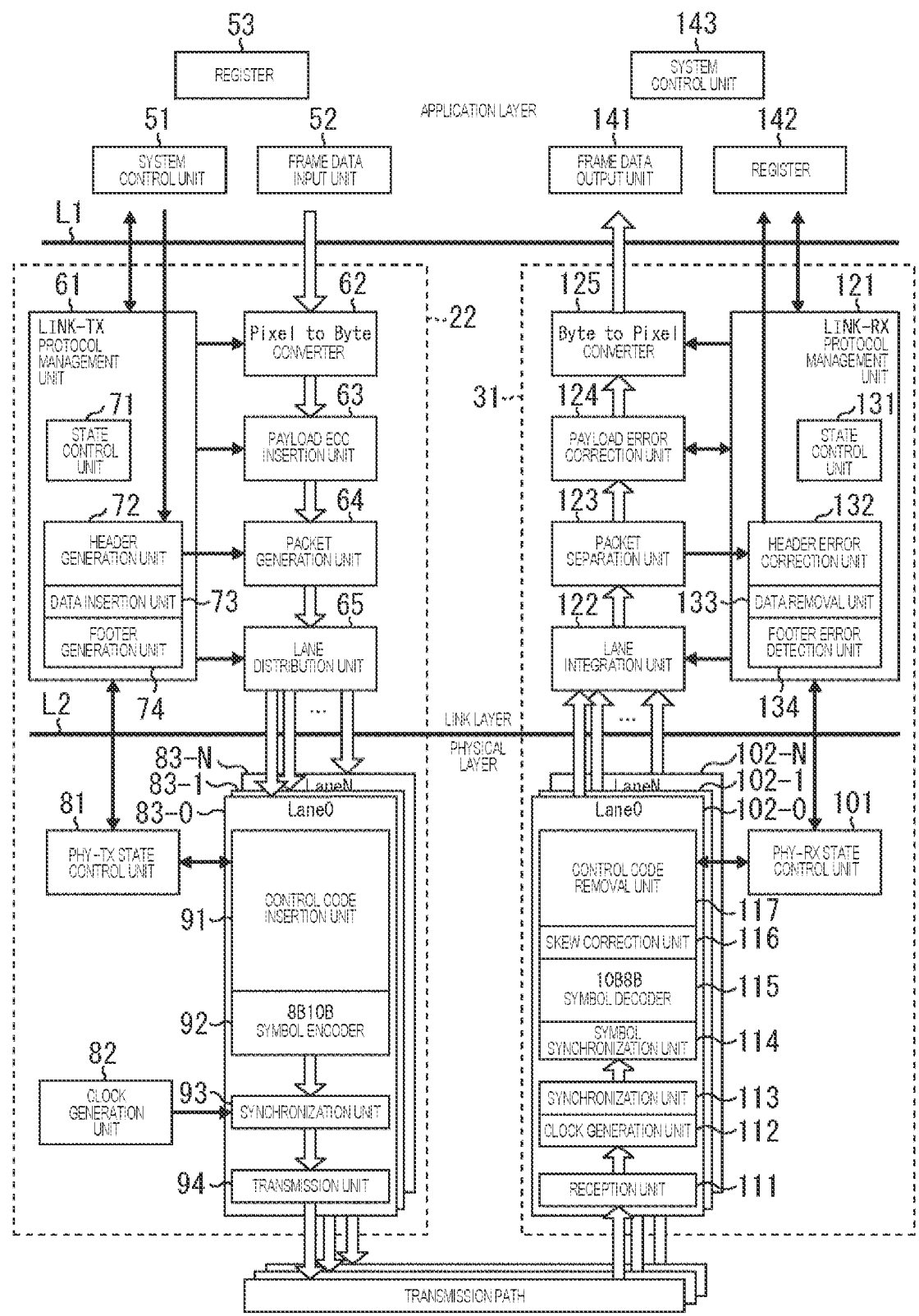
FIG. 5 is a diagram illustrating an exemplary configuration of a transmission unit and a reception unit.

FIG. 5 is a diagram illustrating an exemplary configuration of the transmission unit 22 and the reception unit 31.

A configuration illustrated on the left side of FIG. 5 surrounded by a broken line is a configuration of the transmission unit 22, and a configuration illustrated on the right side surrounded by a broken line is a configuration of the reception unit 31. The transmission unit 22 and the reception unit 31 respectively have a link layer configuration and a physical layer configuration. A configuration illustrated above a solid line L2 is a link layer configuration, and a configuration illustrated below the solid line L2 is a physical layer configuration.

Note that a configuration illustrated above a solid line L1 is an application layer configuration. A system control unit 51, a frame data input unit 52, and a register 53 are realized in the imaging unit 21. The system control unit 51 communicates with a LINK-TX protocol management unit 61 of the transmission unit 22 and controls the transmission of the image data, for example, by providing information regarding the frame format. The frame data input unit 52 performs imaging in response to an instruction by a user and the like and supplies the data of each pixel included in the image acquired by imaging to a Pixel to Byte converter 62 of the transmission unit 22. The register 53 stores information such as the bit length, the number of Lanes, and the like of the Pixel to Byte conversion. Image data transmission processing is executed according to information stored in the register 53.

Furthermore, a frame data output unit 141, a register 142, and a system control unit 143 in the configuration of the application layer are realized in the image processing unit 32. The frame data output unit 141 generates and outputs a one-frame image on the basis of the pixel data of each line supplied from the reception unit 31. Various processing is executed by using the image output from the frame data output unit 141. The register 142 stores various setting values regarding the reception of the image data such as the bit length, the number of Lanes, and the like of the Byte to Pixel conversion. Image data reception processing is executed according to information stored in the register 142. The system control unit 143 communicates with a LINK-RX protocol management unit 121 and controls a sequence such as a mode change.

[Configuration of Link Layer of Transmission Unit 22]

First, the configuration of the link layer of the transmission unit 22 will be described.

The transmission unit 22 includes the LINK-TX protocol management unit 61, the Pixel to Byte converter 62, a payload ECC insertion unit 63, a packet generation unit 64, and a lane distribution unit 65 as the configuration of the link layer. The LINK-TX protocol management unit 61 includes a state control unit 71, a header generation unit 72, a data insertion unit 73, and a footer generation unit 74.

The state control unit 71 of the LINK-TX protocol management unit 61 manages a state of the link layer of the transmission unit 22.

The header generation unit 72 generates a header to be added to the payload storing the pixel data for one line and outputs the generated header to the packet generation unit 64.

Figure 6:
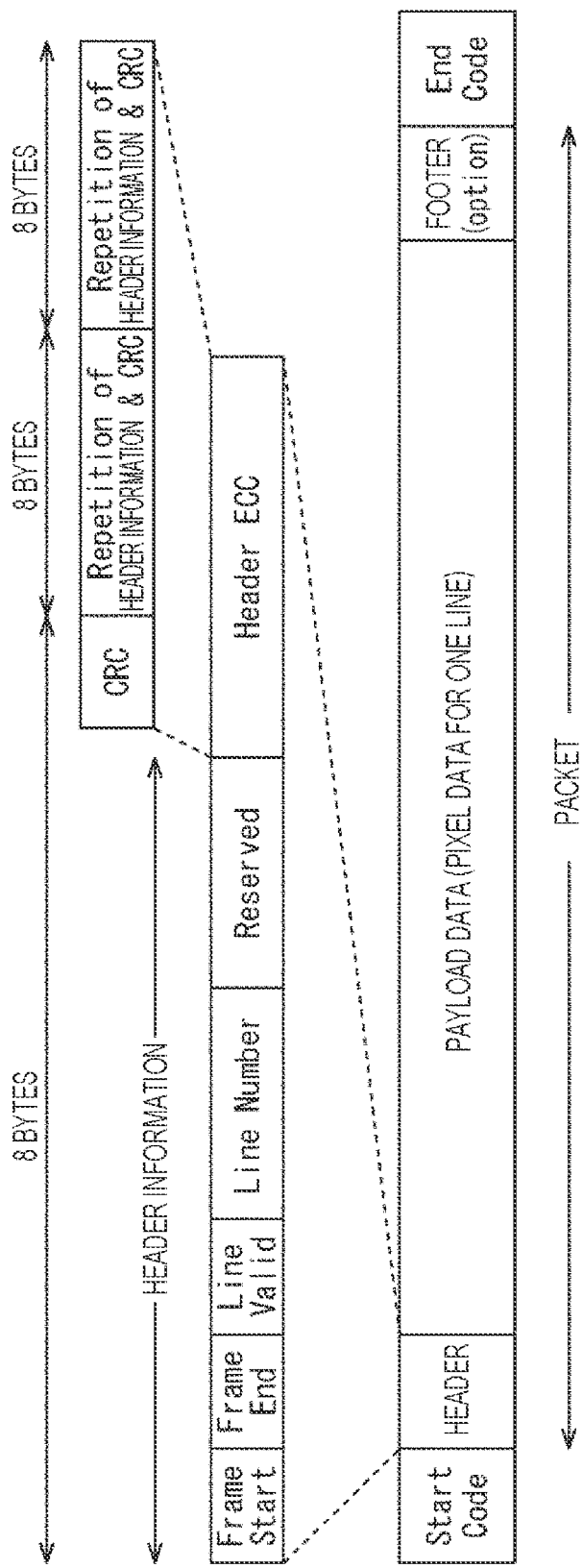
FIG. 6 is a diagram illustrating a header structure.

FIG. 6 is a diagram illustrating a structure of the header generated by the header generation unit 72.

As described above, an entire packet includes a header and payload data that is pixel data for one line. A footer may be added to the packet. The header includes header information and Header ECC.

The header information includes Frame Start, Frame End, Line Valid, Line Number, and Reserved. Contents and an amount of each piece of the information are illustrated in FIG. 7.

Frame Start is one-bit information indicating a head of a frame. A value of one is set to Frame Start of the header of the packet used for transmission of pixel data in a first line of the image data region A11 in FIG. 4, and a value of zero is set to Frame Start of the header of the packet used for transmission of pixel data in other line.

Frame End is one-bit information indicating an end of the frame. A value of one is set to Frame End of the header of the packet including pixel data in an end line in the valid pixel region A1 in the payload, and a value of zero it set to Frame End of the header of the packet used for the transmission of the pixel data in the other line.

Frame Start and Frame End are frame information that is information regarding the frame.

Line Valid is one-bit information indicating whether or not a line of pixel data stored in the payload is a line of a valid pixel. A value of one is set to Line Valid of the header of the packet used for the transmission of the pixel data in a line in the valid pixel region A1, and a value of zero is set to Line Valid of the header of the packet used for the transmission of the pixel data in the other line.

Line Number is 13-bit information indicating a line number of a line including the pixel data stored in the payload.

Line Valid and Line Number are line information that is information regarding the line.

Reserved is a 32-bit region for extension. A total data amount of the header information is six bytes.

As illustrated in FIG. 6, Header ECC arranged after the header information includes a Cyclic Redundancy Check (CRC) code that is a two-byte error detection code that is calculated on the basis of six-byte header information. Furthermore, Header ECC includes two pieces of information same as eight-byte information that is a pair of the header information and the CRC code, subsequent to the CRC code.

In other words, the header of the single packet includes three same pairs of the header information and the CRC code. A total data amount of the header includes eight bytes of the first pair of the header information and the CRC code, eight bytes of the second pair of the header information and the CRC code, and eight bytes of the third pair of the header information and the CRC code, that is, 24 bytes in total.

FIG. 8 is a diagram illustrating an example of an eight-byte bit arrangement configuring a single pair of the header information and the CRC code.

A byte H7 that is a first one byte of eight bytes included in the header includes each of one bit of Frame Start, one bit of Frame End, one bit of Line Valid, and first to fifth bits of the 13 bits of Line Number in an order from the first bit. Furthermore, a byte H6 that is a second one byte includes sixth to 13th bits of the 13 bits of Line Number.

Bytes from a byte H5 that is a third one byte to a byte H2 that is a sixth one byte are Reserved. Each of a byte H1 that is a seventh one byte and a byte H0 that is an eighth one byte includes each bit of the CRC code.

Returning to the description of FIG. 5, the header generation unit 72 generates the header information according to control by the system control unit 51. For example, the system control unit 51 supplies the information indicating the line number of the pixel data output from the frame data input unit 52 and the information indicating the head and the end of the frame.

Furthermore, the header generation unit 72 calculates the CRC code by applying the header information to a generator polynomial. The generator polynomial of the CRC code added to the header information is expressed by, for example, the following formula (1).

[Formula 1]

$$CRC16 = X^{16} + X^{15} + X^2 + 1 \quad (1)$$

The header generation unit 72 generates a pair of the header information and the CRC code by adding the CRC code to the header information and generates a header by repeatedly arranging the three same pairs of the header information and the CRC code. The header generation unit 72 outputs the generated header to the packet generation unit 64.

The data insertion unit 73 generates data used for stuffing and outputs the generated data to the Pixel to Byte converter 62 and the lane distribution unit 65. Payload stuffing data that is stuffing data supplied to the Pixel to Byte converter 62 is added to the pixel data on which the Pixel to Byte conversion has been performed and is used to adjust a data amount of the pixel data to be stored in the payload. Furthermore, lane stuffing data that is stuffing data supplied to the lane distribution unit 65 is added to data after lane allocation and is used to adjust data amounts of the lanes.

The footer generation unit 74 appropriately applies the payload data to the generator polynomial to calculate a 32-bit CRC code according to the control by the system control unit 51 and outputs the CRC code acquired by calculation to the packet generation unit 64 as a footer. The generator polynomial of the CRC code added as a footer is expressed by, for example, the following formula (2).

[Formula 2]

$$CRC32 = X^{32} + X^{31} + X^4 + X^3 + X + 1 \quad (2)$$

The Pixel to Byte converter 62 acquires the pixel data supplied from the frame data input unit 52 and performs the Pixel to Byte conversion that converts data of each pixel into data in units of one byte. For example, a pixel value (RGB) of each pixel of an image imaged by the imaging unit 21 is represented by any one of eight bits, 10 bits, 12 bits, 14 bits, and 16 bits.

Figure 9:
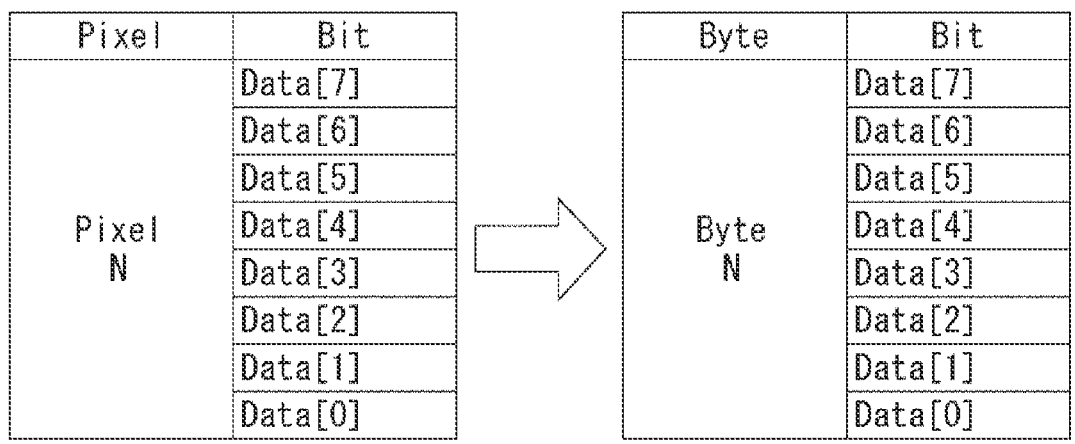
FIG. 9 is a diagram illustrating an example of Pixel to Byte conversion in a case where a pixel value of each pixel is represented by eight bits.

FIG. 9 is a diagram illustrating an example of the Pixel to Byte conversion in a case where the pixel value of each pixel is represented by eight bits.

Data[0] indicates LSB, and Data[7] having the largest number indicates MSB. As indicated by an outline arrow, in this case, eight bits of Data[7] to [0] indicating a pixel value of a pixel N are converted into Byte N including Data[7] to [0]. In a case where the pixel value of each pixel is represented by eight bits, the number of pieces of data in byte unit after the Pixel to Byte conversion is the same as the number of pixels.

Figure 10:
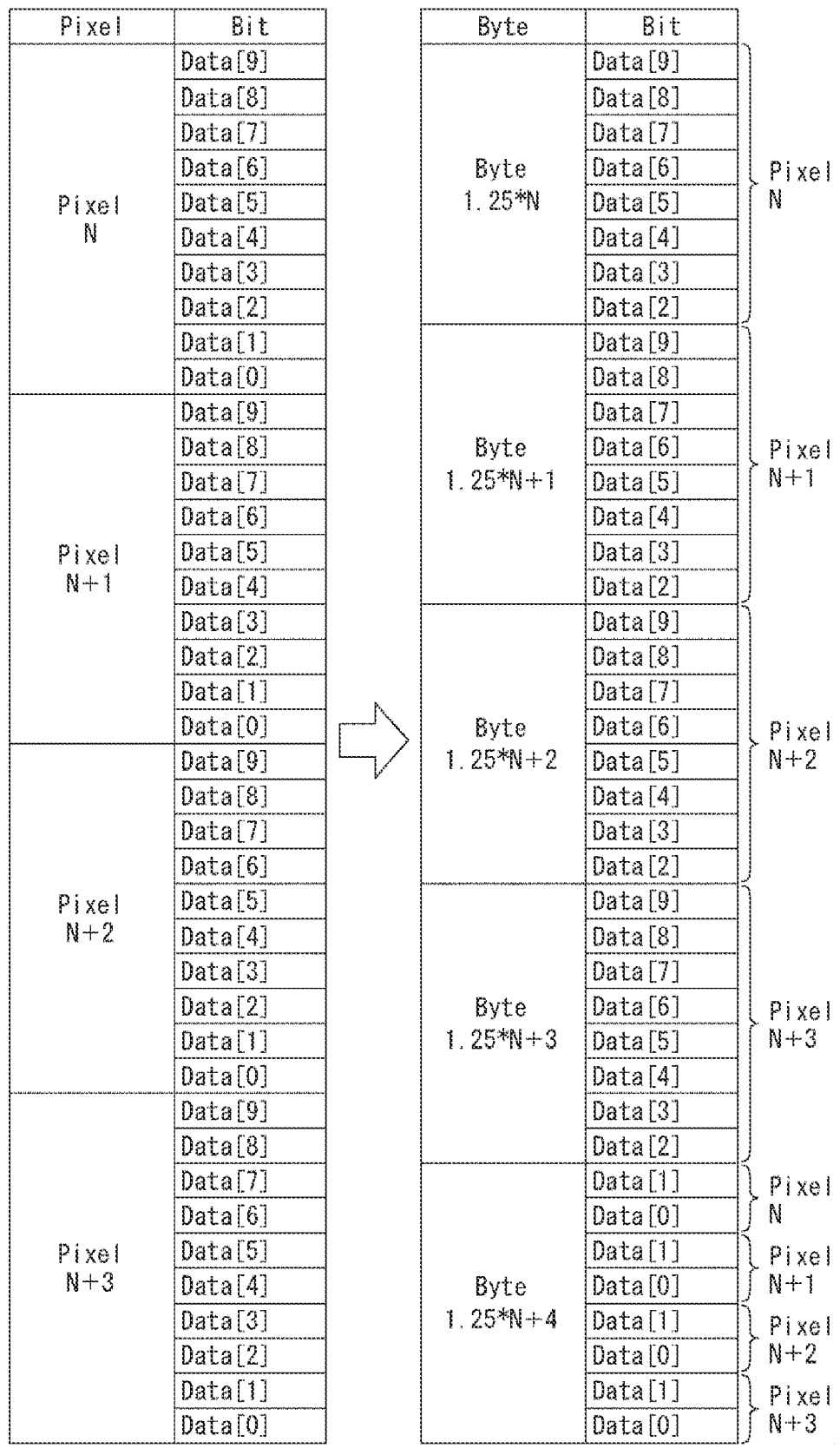
FIG. 10 is a diagram illustrating an example of Pixel to Byte conversion in a case where the pixel value of each pixel is represented by 10 bits.

FIG. 10 is a diagram illustrating an example of the Pixel to Byte conversion in a case where the pixel value of each pixel is represented by 10 bits.

In this case, 10 bits of Data[9] to [0] indicating the pixel value of the pixel N are converted into Byte 1.25*N including Data[9] to [2].

Similarly, regarding pixels N+1 to N+3, 10 bits of Data[9] to [0] indicating the pixel value are converted into Byte 1.25*N+1 to Byte 1.25*N+3 including Data[9] to [2]. Furthermore, Data[1] and Data[0] which are lower bits of the pixels N to N+3 are collected and are converted into Byte 1.25*N+4. In a case where the pixel value of each pixel is represented by 10 bits, the number of pieces of data in byte unit after the Pixel to Byte conversion is 1.25 times of the number of pixels.

Figure 11:
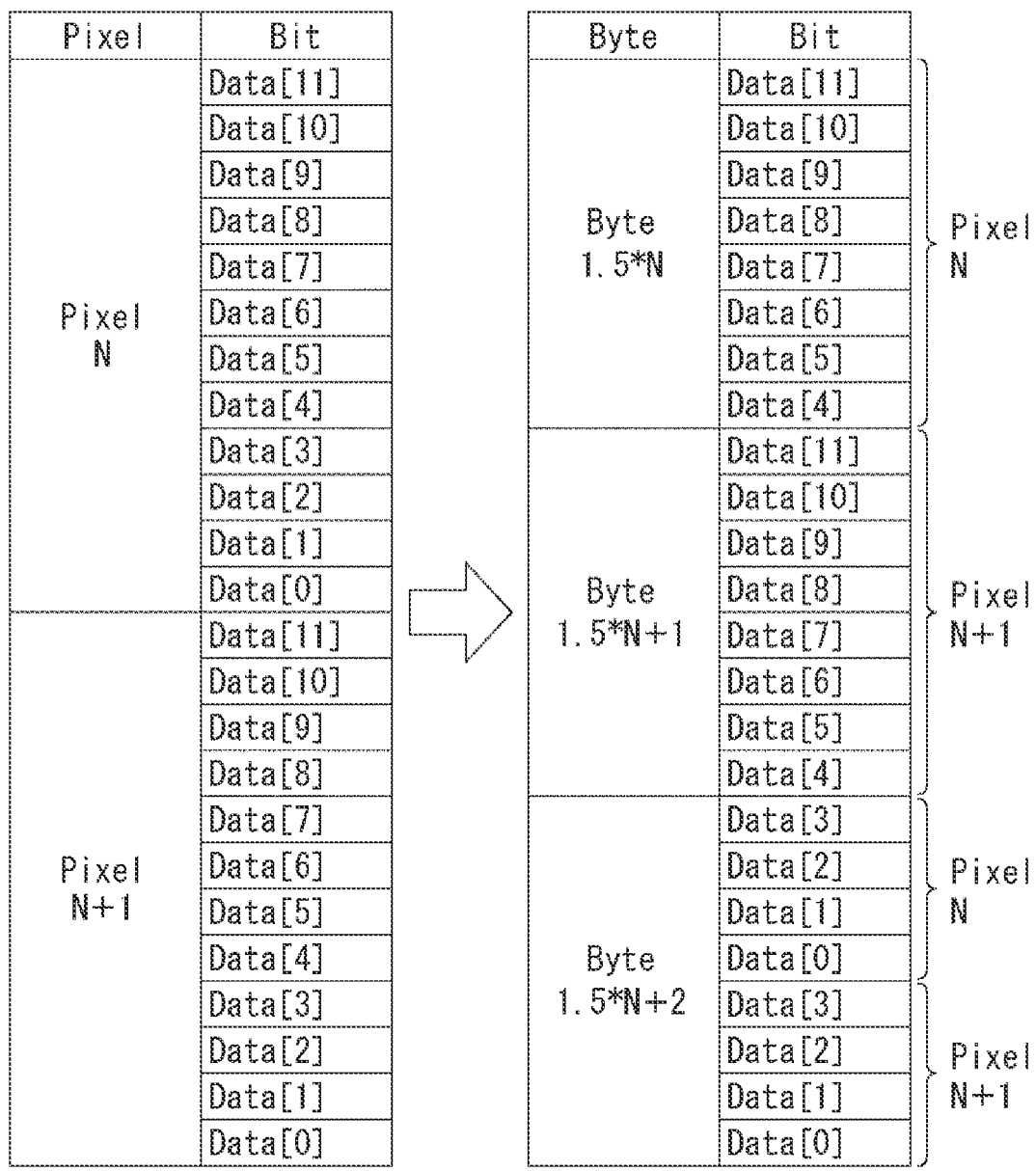
FIG. 11 is a diagram illustrating an example of Pixel to Byte conversion in a case where a pixel value of each pixel is represented by 12 bits.

FIG. 11 is a diagram illustrating an example of the Pixel to Byte conversion in a case where the pixel value of each pixel is represented by 12 bits.

In this case, 12 bits of Data[11] to [0] indicating the pixel value of the pixel N are converted into Byte 1.5*N including Data[11] to [4].

Similarly, regarding the pixel N+1, 12 bits of Data[11] to [0] indicating a pixel value of the pixel N+1 are converted into Byte 1.5*N+1 including Data[11] to [4]. Furthermore, Data[3] to [0] which are lower bits of each of the pixels N and N+1 are collected and are converted into Byte 1.5*N+2. In a case where the pixel value of each pixel is represented by 12 bits, the number of pieces of data in byte unit after the Pixel to Byte conversion is 1.5 times of the number of pixels.

FIG. 12 is a diagram illustrating an example of Pixel to Byte conversion in a case where the pixel value of each pixel is represented by 14 bits.

In this case, 14 bits of Data[13] to [0] indicating the pixel value of the pixel N are converted into Byte 1.75*N including Data[13] to [6].

Similarly, regarding pixels N+1 to N+3, 14 bits of Data [13] to [0] indicating the respective pixel values are converted into Byte 1.75*N+1 to Byte 1.75*N+3 including Data[13] to [6]. Furthermore, remaining bits of the bits of the pixels N to N+3 are collected from the lower bits in order, and for example, Data[5] to [0] that is the bits of the pixel N and Data[5] and [4] that is bits of the pixel N+1 are converted into Byte 1.75*N+4.

Similarly, Data[3] to [0] that is the bits of the pixel N+1 and Data[5] to [2] that is bits of the pixel N+2 are converted into Byte 1.75*N+5, and Data[1] and [0] that is bits of pixel N+2 and Data[5] to [0] that is bits of the pixel N+3 are converted into Byte 1.75*N+6. In a case where the pixel value of each pixel is represented by 14 bits, the number of pieces of data in byte unit after the Pixel to Byte conversion is 1.75 times of the number of pixels.

Figure 13:
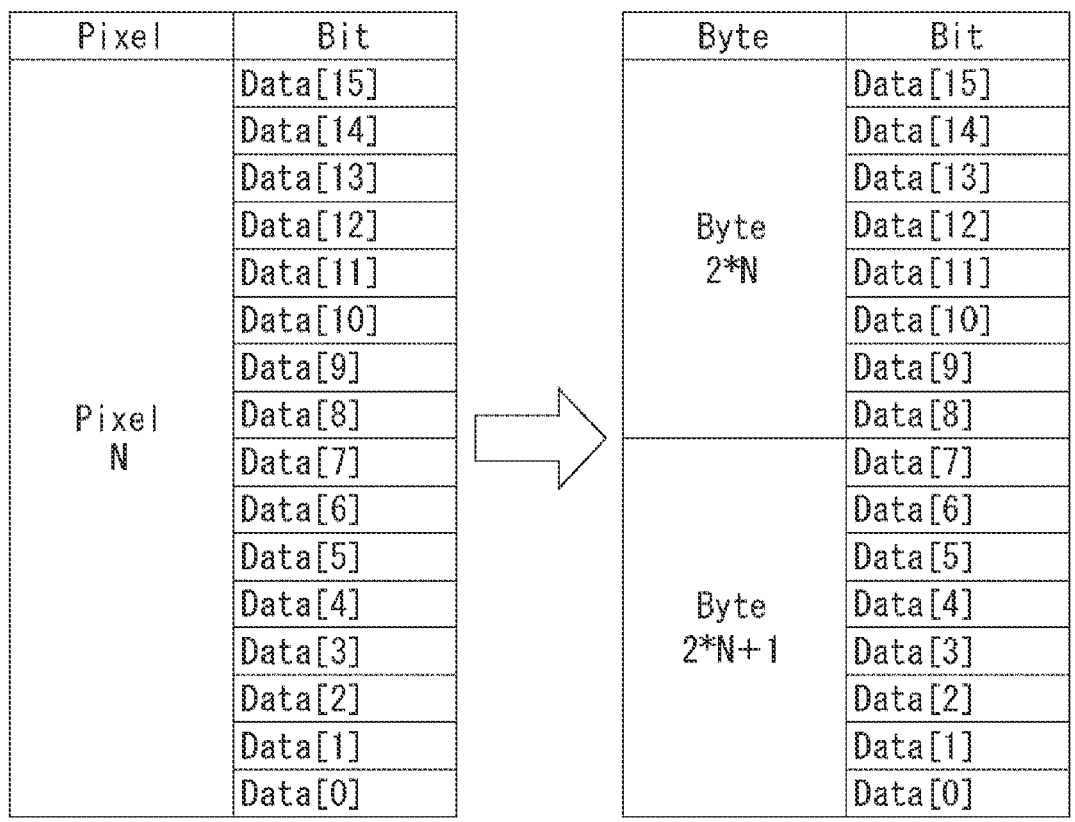
FIG. 13 is a diagram illustrating an example of Pixel to Byte conversion in a case where a pixel value of each pixel is represented by 16 bits.

FIG. 13 is a diagram illustrating an example of Pixel to Byte conversion in a case where the pixel value of each pixel is represented by 16 bits.

In this case, 16 bits of Data[15] to [0] indicating the pixel value of the pixel N are converted into Byte 2*N including Data[15] to [8] and Byte 2*N+1 including Data[7] to [0]. In a case where the pixel value of each pixel is represented by 16 bits, the number of pieces of data in byte unit after the Pixel to Byte conversion is twice of the number of pixels.

The Pixel to Byte converter 62 in FIG. 5 performs such Pixel to Byte conversion on each pixel, for example, in order from the pixel at the left end of the line. Furthermore, the Pixel to Byte converter 62 generates the payload data by adding payload stuffing data supplied from the data insertion unit 73 to the pixel data in byte unit acquired by the Pixel to Byte conversion and outputs the generated data to the payload ECC insertion unit 63.

Figure 14:
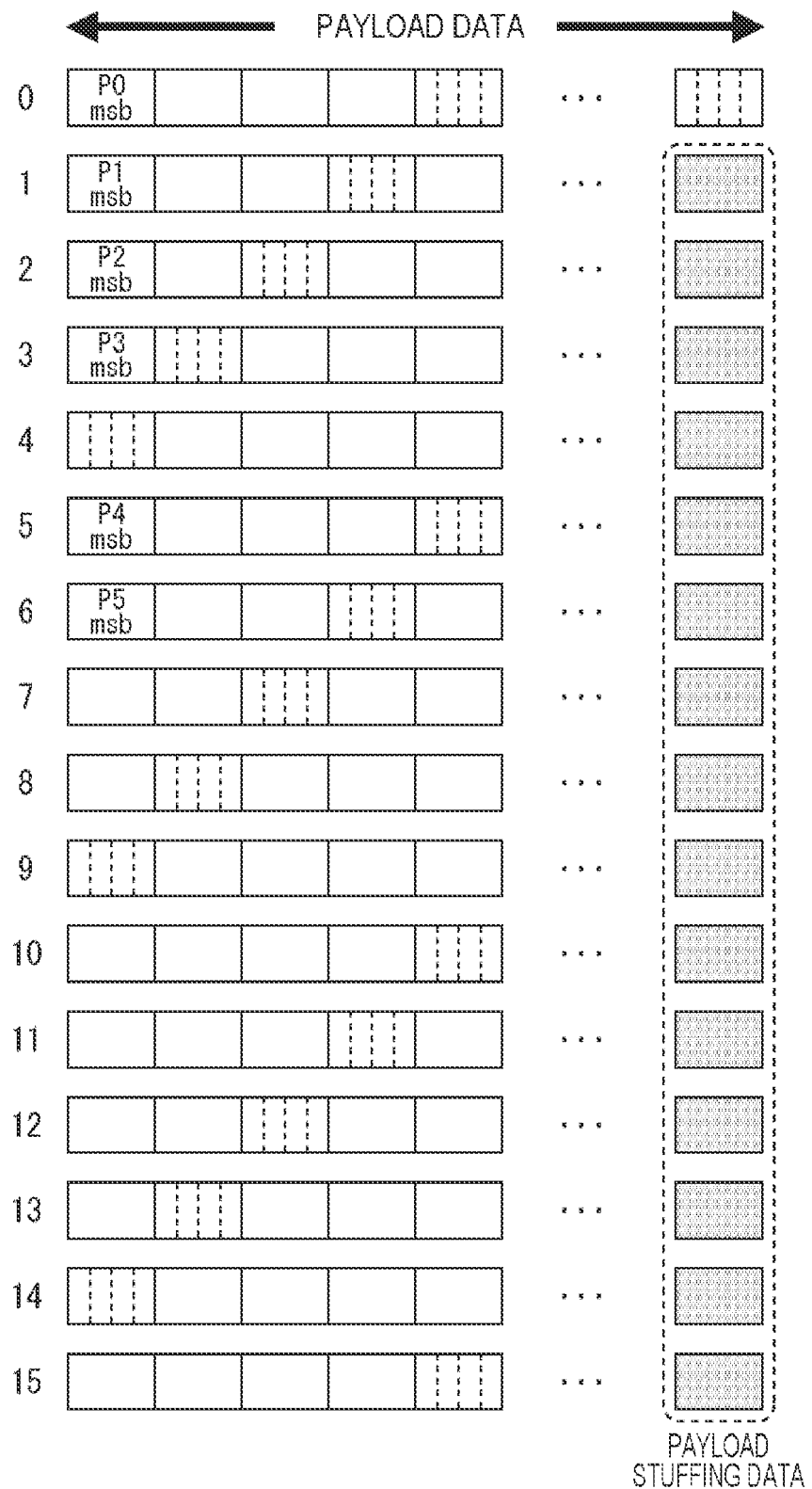
FIG. 14 is a diagram illustrating an example of payload data.

FIG. 14 is a diagram illustrating an example of the payload data.

FIG. 14 illustrates payload data including the pixel data acquired by the Pixel to Byte conversion in a case where the pixel value of each pixel is represented by 10 bits. One block with no color represents the pixel data in byte unit after the Pixel to Byte conversion. Furthermore, each colored block represents the payload stuffing data generated by the data insertion unit 73.

The pixel data after the Pixel to Byte conversion is grouped into a predetermined number of groups in order of acquisition by the conversion. In the example in FIG. 14, each pixel data is grouped into 16 groups including groups 0 to 15. Pixel data including MSB of a pixel P0 is allocated to the group 0, and pixel data including MSB of a pixel P1 is allocated to the group 1. Furthermore, pixel data including MSB of a pixel P2 is allocated to the group 2, pixel data including MSB of a pixel P3 is allocated to the group 3, and pixel data including LSBs of the pixels P0 to P3 is allocated to the group 4.

Pixel data after pixel data including MSB of a pixel P4 is allocated to each of the group 5 and the groups subsequent to the group 5 in order. When a certain piece of the pixel data is allocated to the group 15, subsequent pieces of pixel data are allocated to the group 0 and the groups subsequent to the group 0 in order. Note that a block in which three broken lines are added of blocks indicating the pixel data represents pixel data in byte unit that is generated at the time of the Pixel to Byte conversion so as to include LSBs of the pixels N to N+3.

In the link layer of the transmission unit 22, after grouping is performed in this way, processing is executed on the pixel data provided at the same positions of the respective groups in parallel for each period defined by a clock signal. In other words, in a case where the pixel data is allocated to 16 groups as illustrated in FIG. 14, 16 pieces of the pixel data aligned in each column are processed in the same period so that the pixel data is processed.

As described above, the payload of the single packet includes one line of pixel data. The entire pixel data illustrated in FIG. 14 is the pixel data configuring one line. Here, the processing on the pixel data in the valid pixel region A1 in FIG. 4 is described. However, the pixel data in the other region such as the margin region A2 is processed together with the pixel data in the valid pixel region A1.

After the pixel data for one line is grouped, the payload stuffing data is added so that each of the groups has the same data length. The payload stuffing data is one-byte data.

In the example in FIG. 14, the payload stuffing data is added to the pixel data of the group 0, and one piece of payload stuffing data is added at the end of each pixel data of each of the groups 1 to 15 as illustrated by surrounding by a broken line. A data length (Byte) of the payload data including the pixel data and the stuffing data is expressed by the following formula (3).

[Formula 3]

$$PayloadLength = LineLength \times \frac{BitPix}{8} + PayloadStuffing \quad (3)$$

In the formula (3), LineLength indicates the number of pixels in a line, and BitPix indicates the bit length representing a pixel value of one pixel. PayloadStuffing indicates the number of pieces of payload stuffing data.

As illustrated in FIG. 14, in a case where the pixel data is allocated to 16 groups, the number of pieces of payload stuffing data is expressed by the following formula (4). A symbol % in the formula (4) represents remainder.

[Formula 4]

$$PayloadStuffing = 16 - \left(\left(LineLength \times \frac{BitPix}{8}\right)\%16\right) \quad (4)$$

Figure 15:
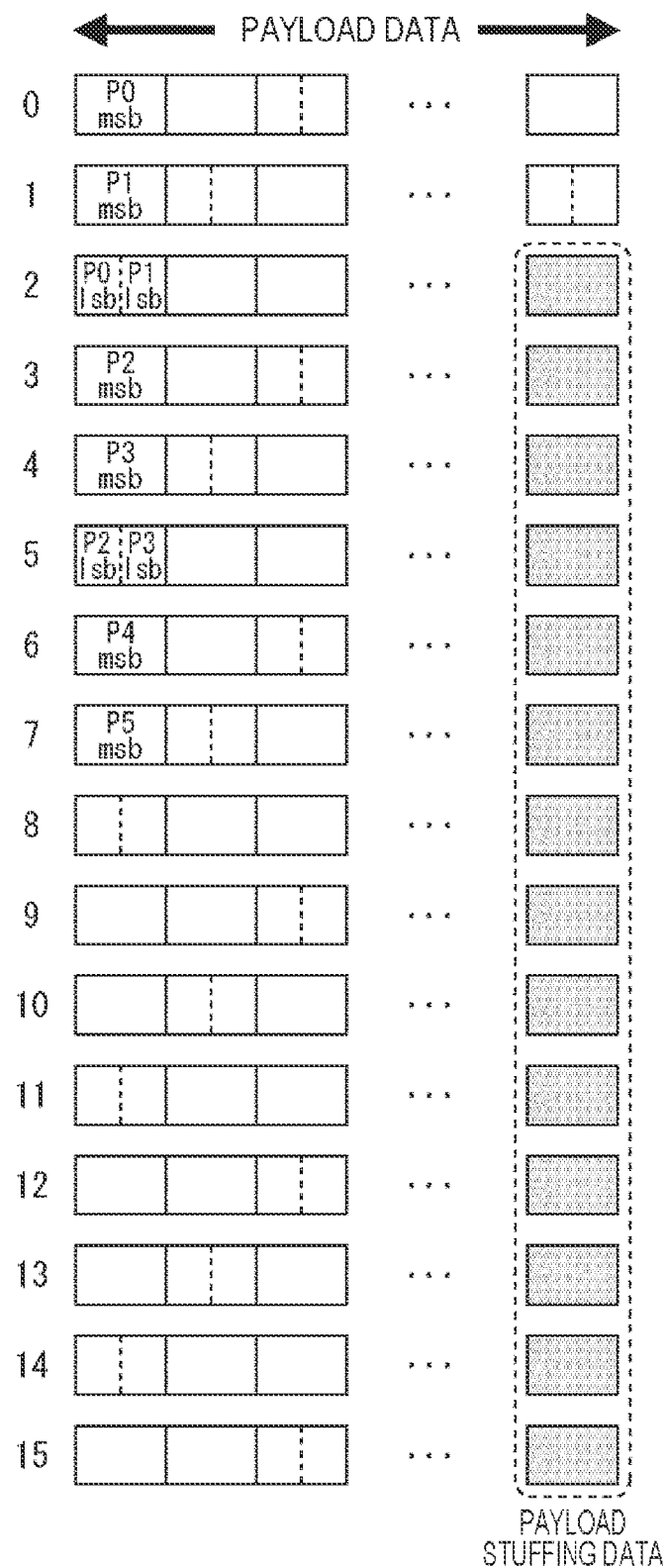
FIG. 15 is a diagram illustrating another example of the payload data.

FIG. 15 is a diagram illustrating another example of the payload data.

FIG. 15 illustrates payload data including the pixel data acquired by the Pixel to Byte conversion in a case where the pixel value of each pixel is represented by 12 bits.

In the example in FIG. 15, the pixel data including the MSB of the pixel P0 is allocated to the group 0, the pixel data including the MSB of the pixel P1 is allocated to the group 1, and the pixel data including the LSBs of the pixels P0 and P1 is allocated to the group 2. The pixel data after the pixel data including the MSB of the pixel P2 is allocated to each of the group 3 and the groups subsequent to the group 3 in order. A block in which a broken line is added of blocks indicating the pixel data represents pixel data in byte unit generated at the time of the Pixel to Byte conversion so as to include the LSBs of the pixels N and N+1.

In the example in FIG. 15, the payload stuffing data is not added to the pixel data of the groups 0 and 1, and one piece of the payload stuffing data is added at the end of the pixel data of each of the groups 2 to 15.

The payload data having such a configuration is supplied from the Pixel to Byte converter 62 to the payload ECC insertion unit 63.

The payload ECC insertion unit 63 calculates an error correction code which is used to correct an error in the payload data on the basis of the payload data supplied from the Pixel to Byte converter 62 and inserts a parity which is the error correction code obtained by the above calculation into the payload data. For example, a Reed-Solomon code is used as the error correction code. Note that, the insertion of the error correction code is optional, and for example, only one of the insertion of the parity by the payload ECC insertion unit 63 and the addition of the footer by the footer generation unit 74 can be performed.

Figure 16:
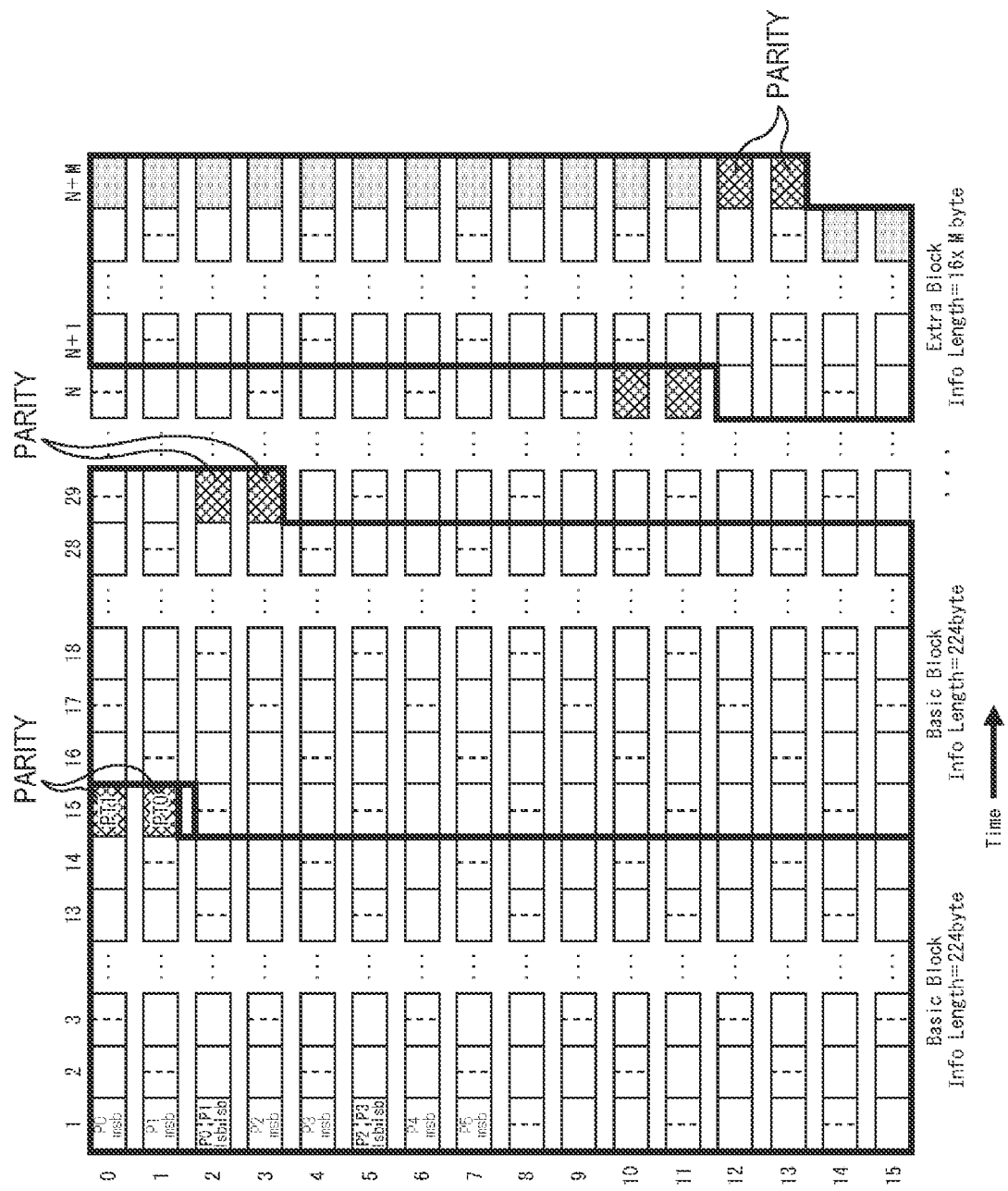
FIG. 16 is a diagram illustrating an example of payload data to which a parity is inserted.

FIG. 16 is a diagram illustrating an example of the payload data to which the parity is inserted.

The payload data illustrated in FIG. 16 is the payload data, described with reference to FIG. 15, including the pixel data acquired by the Pixel to Byte conversion in a case where the pixel value of each pixel is represented by 12 bits. A block in which diagonal lines are illustrated represents a parity.

In the example in FIG. 16, 14 pieces of pixel data are selected in order from the head pixel data in each of the groups 0 to 15, and two-byte parity is obtained on the basis of the selected 224 pieces (224 bytes) of pixel data. The two-byte parity is inserted subsequent to the 224 pieces of pixel data used for the calculation as 15th data of the groups 0 and 1, and the 224 pieces of pixel data and the two-byte parity form a first Basic Block.

In this way, the payload ECC insertion unit 63 basically generates the two-byte parity on the basis of the 224 pieces of pixel data and inserts the two-byte parity subsequent to the 224 pieces of pixel data.

Furthermore, in the example in FIG. 16, the 224 pieces of pixel data subsequent to the first Basic Block is selected from each group in order, and two-byte parity is obtained on the basis of the selected 224 pieces of pixel data. The two-byte parity is inserted subsequent to the 224 pieces of pixel data used for the calculation as 29th data of the groups 2 and 3, and the 224 pieces of pixel data and the two-byte parity form a second Basic Block.

In a case where a number 16×M, which is the number of pieces of pixel data and payload stuffing data subsequent to a certain Basic Block, is less than 224, a two-byte parity is obtained on the basis of remaining 16×M blocks (pixel data and payload stuffing data). Furthermore, the obtained two-byte parity is inserted subsequent to the payload stuffing data, and the 16×M blocks and the two-byte parity form an Extra Block.

The payload ECC insertion unit 63 outputs the payload data to which the parity is inserted to the packet generation unit 64. In a case where the parity is not inserted, the payload data supplied from the Pixel to Byte converter 62 to the payload ECC insertion unit 63 is output to the packet generation unit 64 as it is.

The packet generation unit 64 adds the header generated by the header generation unit 72 to the payload data supplied from the payload ECC insertion unit 63 so as to generate a packet. In a case where the footer generation unit 74 generates a footer, the packet generation unit 64 adds the footer to the payload data.

Figure 17:
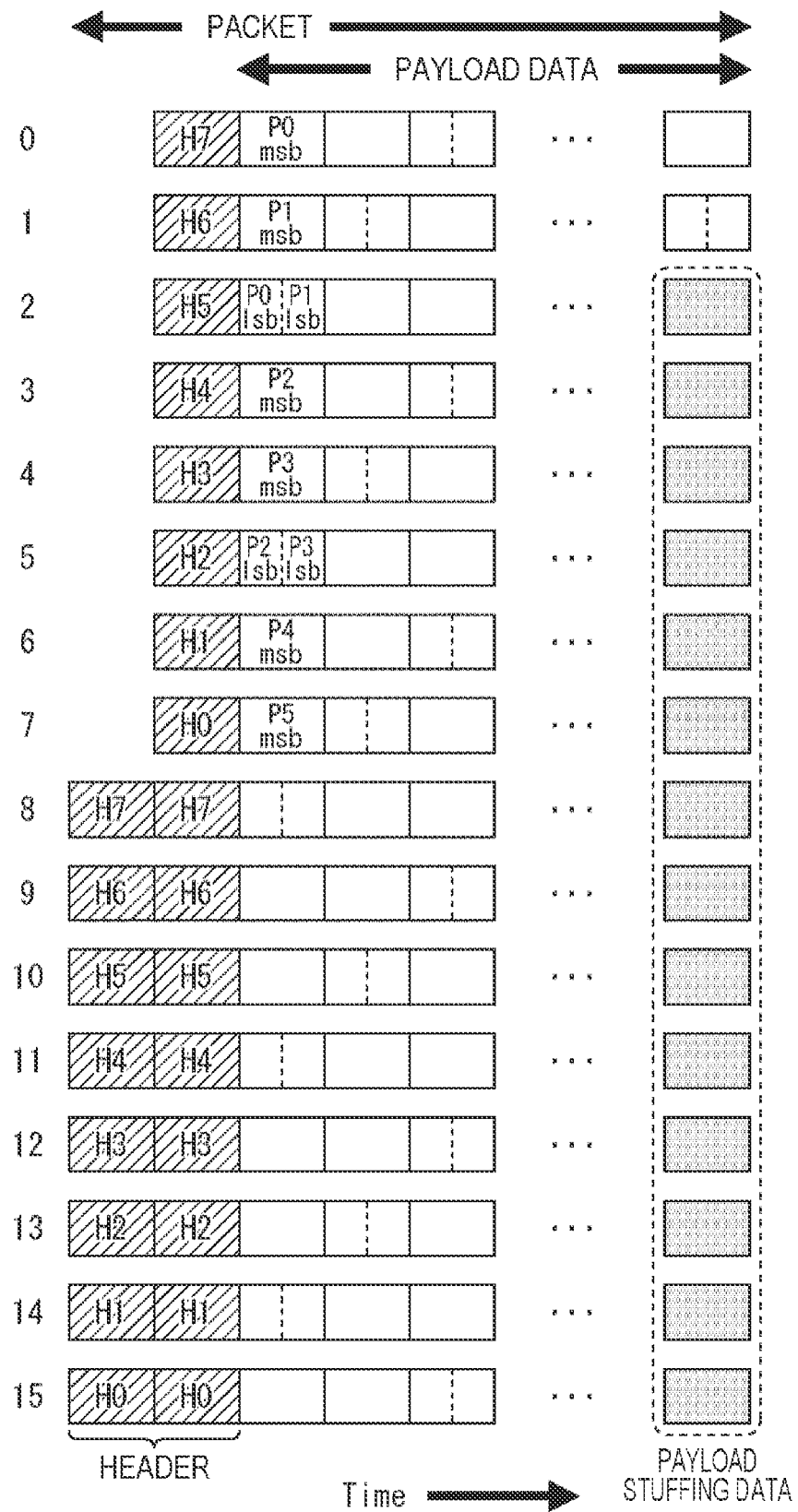
FIG. 17 is a diagram illustrating a state where a header is added to the payload data.

FIG. 17 is a diagram illustrating a state where the header is added to the payload data.

Header data in byte unit that is the header or the CRC code of the header information is represented by 24 blocks indicated with characters of H7 to H0. As described with reference to FIG. 6, the header of the single packet includes three pairs of the header information and the CRC code.

For example, the header data H7 to H2 is the header information (six bytes), and the header data H1 and H0 is the CRC code (two bytes).

In the example in FIG. 17, one piece of the header data H7 is added to the payload data of the group 0, and one piece of the header data H6 is added to the payload data of the group 1. One piece of the header data H5 is added to the payload data of the group 2, and one piece of the header data H4 is added to the payload data of the group 3. One piece of the header data H3 is added to the payload data of the group 4, and one piece of the header data H2 is added to the payload data of the group 5. One piece of the header data H1 is added to the payload data of the group 6, and one piece of the header data H0 is added to the payload data of the group 7.

Furthermore, in the example in FIG. 17, two pieces of the header data H7 are added to the payload data of the group 8, and two pieces of the header data H6 are added to the payload data of the group 9. Two pieces of the header data H5 are added to the payload data of the group 10, and two pieces of the header data H4 are added to the payload data of the group 11. Two pieces of the header data H3 are added to the payload data of the group 12, and two pieces of the header data H2 are added to the payload data of the group 13. Two pieces of the header data H1 are added to the payload data of the group 14, and two pieces of the header data H0 are added to the payload data of the group 15.

Figure 18:
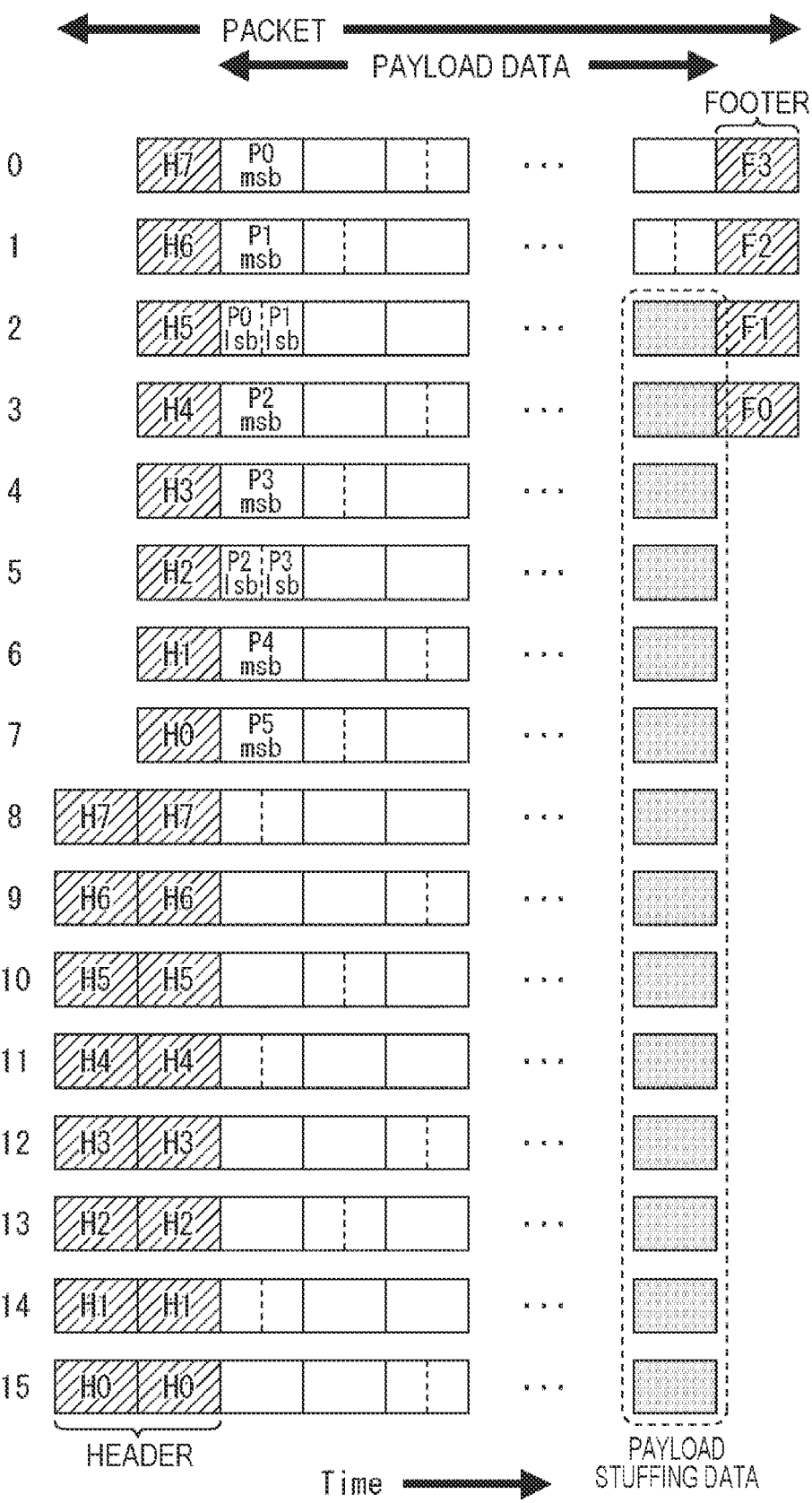
FIG. 18 is a diagram illustrating a state where a header and a footer are added to the payload data.

FIG. 18 is a diagram illustrating a state where the header and the footer are added to the payload data.

Footer data that is a four-byte CRC code generated as a footer is represented by four blocks indicated with characters of F3 to F0. In the example in FIG. 18, pieces of the footer data F3 to F0 are respectively added to the pieces of the payload data of the groups 0 to 3.

Figure 19:
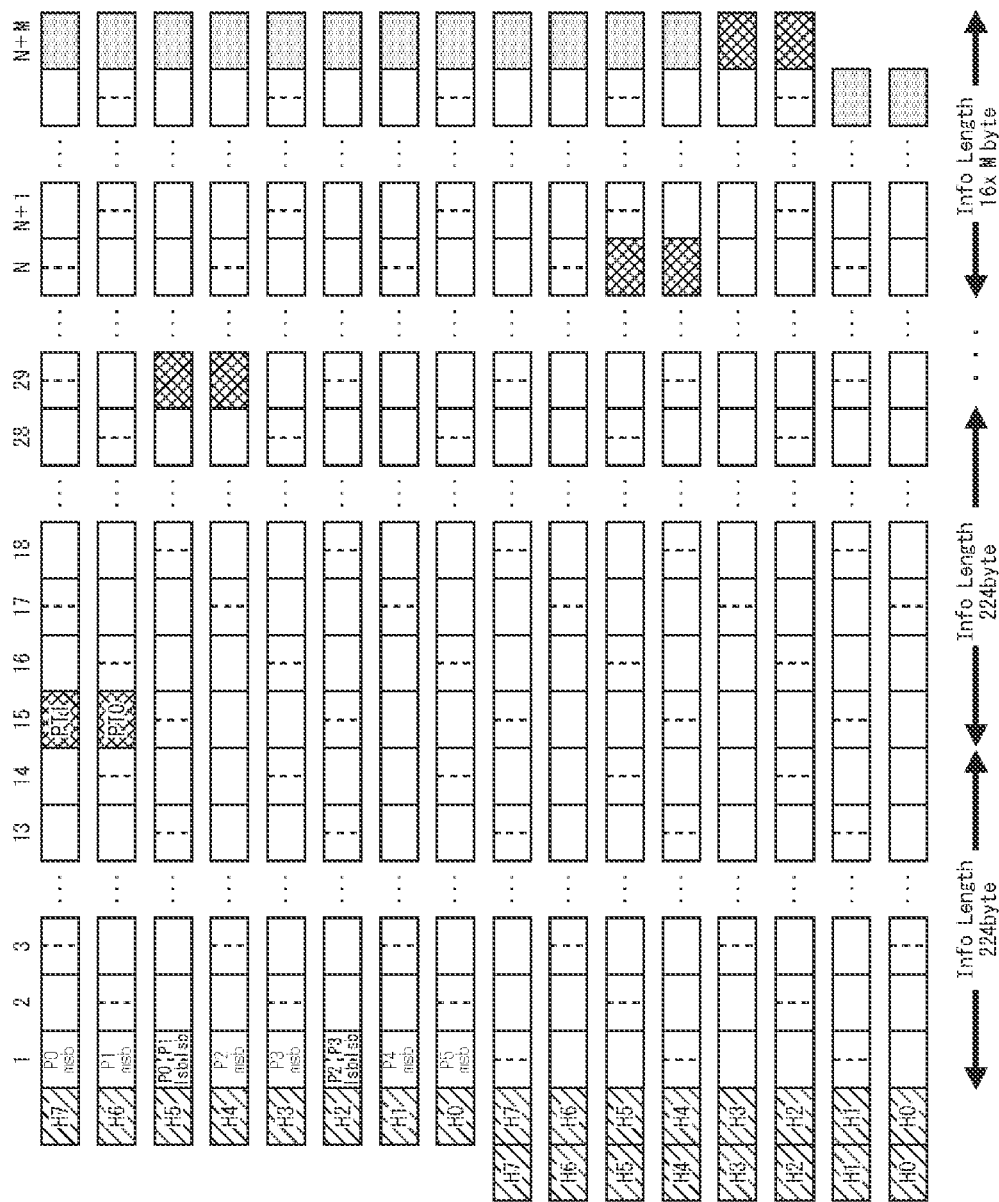
FIG. 19 is a diagram illustrating a state where a header is added to the payload data to which the parity is inserted.

FIG. 19 is a diagram illustrating a state where the header is added to the payload data to which the parity is inserted.

In the example in FIG. 19, as in a case of FIGS. 17 and 18, the header data H7 to H0 is added to the payload data in FIG. 16 to which the parity is inserted.

The packet generation unit 64 outputs packet data that is data constituting one packet generated in this way to the lane distribution unit 65. The packet data including the header data and the payload data, the packet data including the header data, the payload data, and the footer data, or the packet data including the header data and the payload data to which the parity is inserted is supplied to the lane distribution unit 65. The packet structure in FIG. 6 is a logical structure, and data of the packet having the structure in FIG. 6 is processed in byte unit in the link layer and the physical layer.

The lane distribution unit 65 allocates the packet data supplied from the packet generation unit 64 to each lane used for data transmission of Lanes 0 to 7 in order from the head data.

Figure 20:
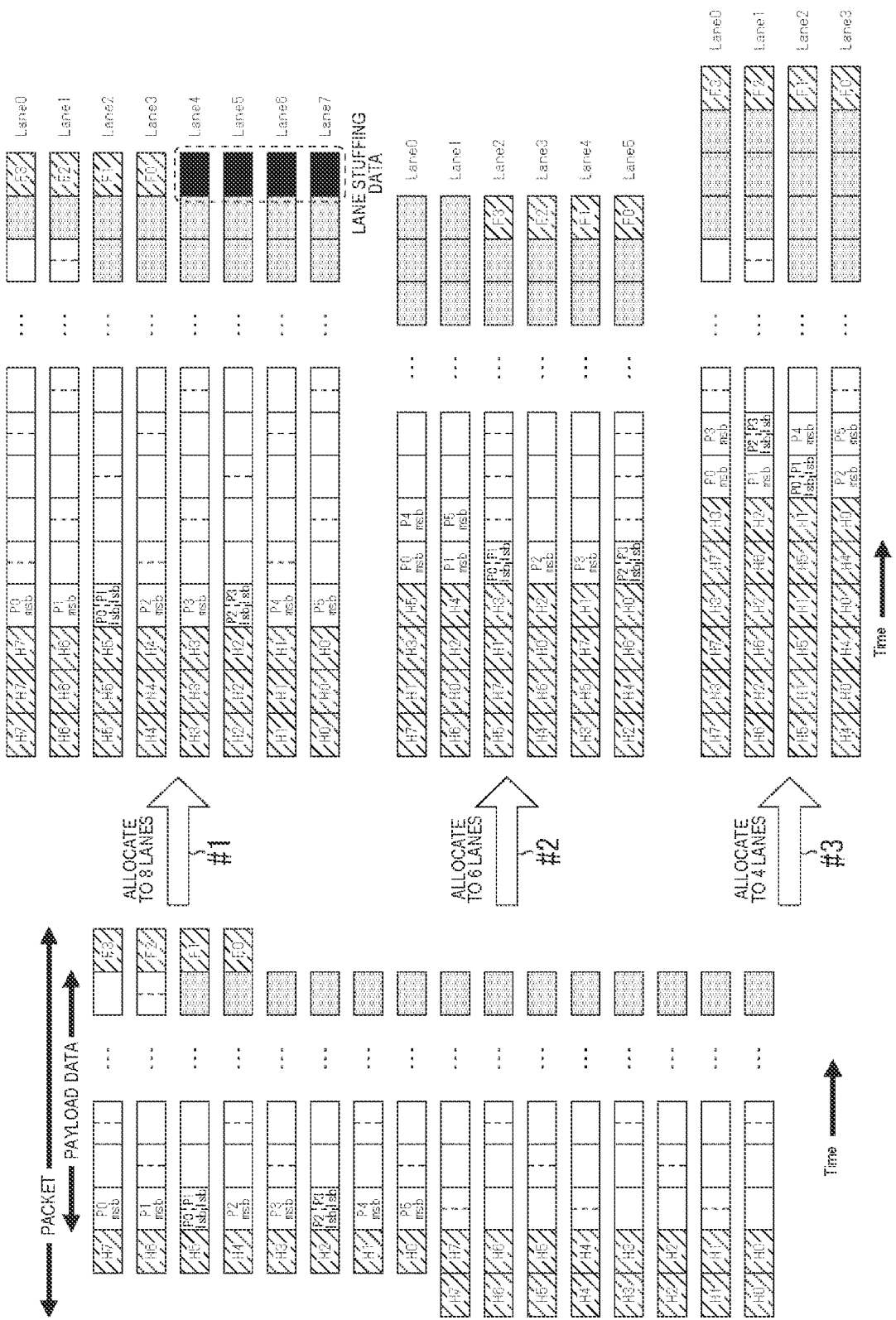
FIG. 20 is a diagram illustrating an example of packet data allocation.

FIG. 20 is a diagram illustrating an example of packet data allocation.

Here, allocation of the packet data including the header data, the payload data, and the footer data (FIG. 18) will be described. An example of packet data allocation in a case where data is transmitted by using eight lanes including Lanes 0 to 7 is illustrated in a portion pointed by an outline arrow #1.

In this case, each piece of the header data including three repetitions of each piece of the header data H7 to H0 is allocated to Lanes 0 to 7 in order from the head header data. When a certain piece of the header data is allocated to Lane 7, the subsequent pieces of the header data are allocated to each lane after Lane 0 in order. Three pieces of the same header data are allocated to each of Lanes 0 to 7.

Furthermore, the payload data is allocated to each of Lanes 0 to 7 in order from the head piece of the payload data. When a certain piece of the payload data is allocated to Lane 7, the subsequent pieces of the payload data are allocated to each lane after Lane 0 in order.

The footer data F3 to F0 is allocated to each lane in order from the head piece of the footer data. In the example in FIG. 20, the final piece of the payload stuffing data included in the payload data is allocated to Lane 7, each piece of the footer data F3 to F0 is allocated to Lanes 0 to 3.

A block colored with black represents lane stuffing data generated by the data insertion unit 73. After the packet data for one packet is allocated to each lane, the lane stuffing data is allocated to a lane having a small number of pieces of data so that the data lengths allocated to the respective lanes are the same. The lane stuffing data is one-byte data. In the example in FIG. 20, one piece of the lane stuffing data is allocated to each of Lanes 4 to 7 of which the number of allocated pieces of data is small.

The number of pieces of the lane stuffing data in a case where the packet data includes the header data, the payload data, and the footer data is expressed by the following formula (5).

[Formula 5]

$$\text{LaneStuffing} = \text{LaneNum} - ((\text{PayloadLength} + \text{FooterLength}) \% \text{LaneNum}) \quad (5)$$

LaneNum in the formula (5) indicates the number of lanes, and PayloadLength indicates the length of the payload data (byte). Furthermore, FooterLength indicates the length of the footer (byte).

Furthermore, the number of pieces of lane stuffing data in a case where the packet data includes the header data and the payload data to which the parity is inserted is expressed by the following formula (6). ParityLength in the following formula (6) indicates the total number of bytes of the parity included in the payload.

[Formula 6]

$$\text{LaneStuffing} = \text{LaneNum} - ((\text{PayloadLength} + \text{ParityLength}) \% \text{LaneNum}) \quad (6)$$

An example of allocation of the packet data in a case where data is transmitted by using six lanes including Lanes 0 to 5 is illustrated in a portion pointed by an outline arrow #2.

In this case, each piece of the header data including three repetitions of each piece of the header data H7 to H0 is allocated to Lanes 0 to 5 in order from the head piece of the header data. When a certain piece of the header data is allocated to Lane 5, the subsequent pieces of header data are allocated to each lane after Lane 0 in order. Four pieces of the same header data are allocated to each of Lanes 0 to 5.

Furthermore, the payload data is allocated to each of Lanes 0 to 5 in order from the head piece of the payload data. When a certain piece of the payload data is allocated to Lane 5, the subsequent pieces of payload data are allocated to each lane after Lane 0 in order.

The footer data F3 to F0 is allocated to each lane in order from the head piece of the footer data. In the example in FIG. 20, the final piece of the payload stuffing data included in the payload data is allocated to Lane 1, each piece of the footer data F3 to F0 is allocated to each of Lanes 2 to 5. Since the numbers of pieces of the packet data in Lanes 0 to 5 are the same, in this case, the lane stuffing data is not used.

An example of allocation of the packet data in a case where data is transmitted by using four lanes including Lanes 0 to 3 is illustrated in a portion pointed by an outline arrow #3.

In this case, each piece of the header data including three repetitions of each piece of the header data H7 to H0 is allocated to Lanes 0 to 3 in order from the head piece of the header data. When a certain piece of the header data is allocated to Lane 3, the subsequent pieces of header data are allocated to each lane after Lane 0 in order. Six pieces of the header data are allocated to each of Lanes 0 to 3.

Furthermore, the payload data is allocated to each of Lanes 0 to 3 in order from the head piece of the payload data. When a certain piece of the payload data is allocated to Lane 3, the subsequent pieces of payload data are allocated to each lane after Lane 0 in order.

The footer data F3 to F0 is allocated to each lane in order from the head piece of the footer data. In the example in FIG. 20, the final piece of the payload stuffing data included in the payload data is allocated to Lane 3, each piece of the footer data F3 to F0 is allocated to each of Lanes 0 to 3. Since the numbers of pieces of the packet data in Lanes 0 to 3 are the same, in this case, the lane stuffing data is not used.

The lane distribution unit 65 outputs the packet data allocated to each lane in this way to the physical layer. Hereinafter, a case where data is transmitted by using eight lanes including Lanes 0 to 7 will be mainly described. However, even in a case where the number of lanes used for data transmission is different, similar processing is executed.

[Configuration of Physical Layer of Transmission Unit 22]

Next, a configuration of the physical layer of the transmission unit 22 will be described.

The transmission unit 22 includes a PHY-TX state control unit 81, a clock generation unit 82, and signal processing units 83-0 to 83-N as the configuration of the physical layer. The signal processing unit 83-0 includes a control code insertion unit 91, an 8B10B symbol encoder 92, a synchronization unit 93, and a transmission unit 94. Packet data that is output from the lane distribution unit 65 and allocated to Lane 0 is input to the signal processing unit 83-0, and packet data allocated to Lane 1 is input to the signal processing unit 83-1. Furthermore, packet data allocated to Lane N is input to the signal processing unit 83-N.

In this way, the signal processing units 83-0 to 83-N as many as the number of lanes are provided in the physical layer of the transmission unit 22, and processing on the packet data transmitted by using each lane is executed by the signal processing units 83-0 to 83-N in parallel. A configuration of the signal processing unit 83-0 will be described. However, the signal processing units 83-1 to 83-N have a similar configuration.

The PHY-TX state control unit 81 controls each of the signal processing units 83-0 to 83-N. For example, a timing of the processing executed by each of the signal processing units 83-0 to 83-N is controlled by the PHY-TX state control unit 81.

The clock generation unit 82 generates a clock signal and outputs the generated clock signal to the synchronization unit 93 of each of the signal processing units 83-0 to 83-N.

The control code insertion unit 91 of the signal processing unit 83-0 adds a control code to the packet data supplied from the lane distribution unit 65. The control code is a code represented by a single symbol selected from among a plurality of kinds of symbols prepared in advance or a combination of the plurality of kinds of symbols. Each symbol inserted by the control code insertion unit 91 is eight-bit data. By performing 8B10B conversion in a post-stage circuit, the single symbol inserted by the control code insertion unit 91 is changed to 10-bit data. On the other hand, in the reception unit 31, 10B8B conversion is performed on reception data as described later. However, each symbol before the 10B8B conversion included in the reception data is 10-bit data, and each symbol after the 10B8B conversion is eight-bit data.

FIG. 21 is a diagram illustrating an example of the control code added by the control code insertion unit 91.

The control codes include Idle Code, Start Code, End Code, Pad Code, Sync Code, Deskew Code, and Standby Code.

Idle Code is a symbol group repeatedly transmitted in a period other than the time when the packet data is transmitted. Idle Code is represented by D00.0(00000000) of D Character which is an 8B10B Code.

Start Code is a symbol group indicating start of a packet. As described above, Start Code is added before the packet. Start Code is represented by four symbols of K28.5, K27.7, K28.2, and K27.7 which are combinations of three kinds of K Characters. Values of K Characters are illustrated in FIG. 22.

End Code is a symbol group indicating end of the packet. As described above, End Code is added after the packet. End Code is represented by four symbols of K28.5, K29.7, K30.7, and K29.7 which are combinations of three kinds of K Characters.

Pad Code is a symbol group that is inserted into the payload data so as to fill a difference between a pixel data band and a PHY transmission band. The pixel data band is a transmission rate of the pixel data that is output from the imaging unit 21 and is input to the transmission unit 22, and the PHY transmission band is a transmission rate of the pixel data that is transmitted from the transmission unit 22 and is input to the reception unit 31. Pad Code is represented by four symbols of K23.7, K28.4, K28.6, and K28.3 which are combinations of four kinds of K Characters.

Figure 23:
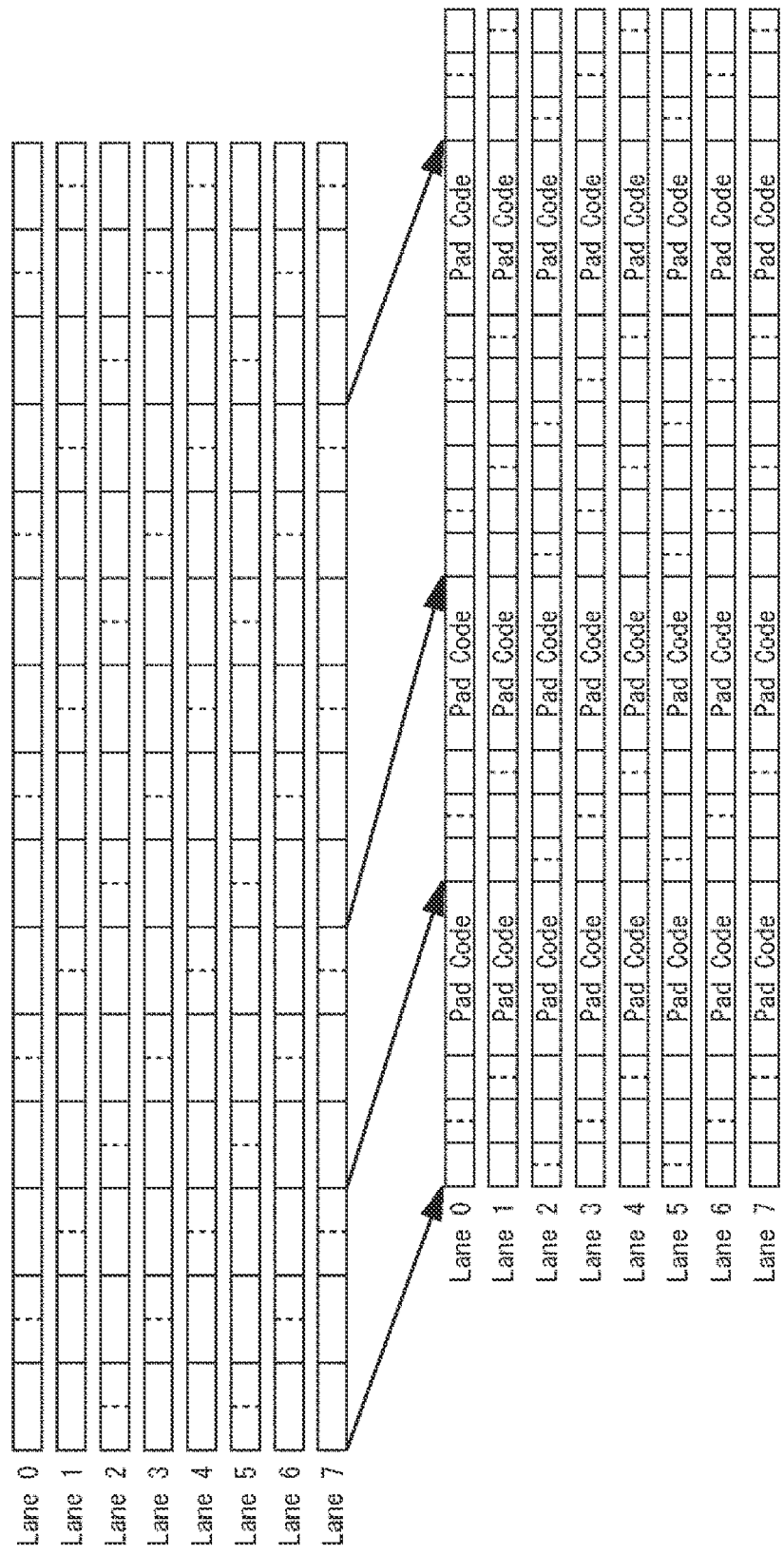
FIG. 23 is a diagram illustrating an example of insertion of Pad Codes.

FIG. 23 is a diagram illustrating an example of insertion of Pad Code.

An upper portion of FIG. 23 illustrates payload data allocated to each lane before Pad Code is inserted, and a lower portion illustrates payload data after Pad Code has been inserted. In the example in FIG. 23, Pad Codes are inserted between third pixel data from the head and fourth pixel data, between sixth pixel data and seventh pixel data, and between 12th pixel data and 13th pixel data. In this way, Pad Code is inserted at the same position of the payload data in each of Lanes 0 to 7.

Pad Code is inserted into the payload data allocated to Lane 0 by the control code insertion unit 91 of the signal processing unit 83-0. Similarly, Pad Codes are respectively inserted into the payload data allocated to the other lanes at the same timing by the signal processing units 83-1 to 83-N. The number of Pad Codes is determined on the basis of the difference between the pixel data band and the PHY transmission band, a frequency of the clock signal generated by the clock generation unit 82, and the like.

In this way, in a case where the pixel data band is narrow and the PHY transmission band is wide, Pad Code is inserted to adjust the difference between the bands. For example, Pad Code is inserted so as to adjust the difference between the pixel data band and the PHY transmission band to be within a certain range.

Returning to the description of FIG. 21, Sync Code is a symbol group used to secure bit synchronization and symbol synchronization between the transmission unit 22 and the reception unit 31. Sync Code is represented by two symbols of K28.5 and Any. Any indicates that any kind of symbol may be used. For example, Sync Code is repeatedly transmitted in a training mode before the transmission of the packet data between the transmission unit 22 and the reception unit 31 is started.

Deskew Code is a symbol group that is used to correct Data Skew between the lanes, in other words, a difference in reception timing of data received in each lane of the reception unit 31. Deskew Code is represented by two symbols of K28.5 and Any**. The correction of Data Skew between the lanes by using Deskew Code will be described later.

Standby Code is a symbol group used to notify the reception unit 31 that a state of an output of the transmission unit 22 becomes High-Z (high impedance) or the like and data is not transmitted. In other words, Standby Code is transmitted to the reception unit 31 when the transmission of the packet data is terminated and Standby state is set. Standby Code is represented by two symbols of K28.5 and Any**.

The control code insertion unit 91 outputs the packet data to which such a control code is added to the 8B10B symbol encoder 92.

Figure 24:
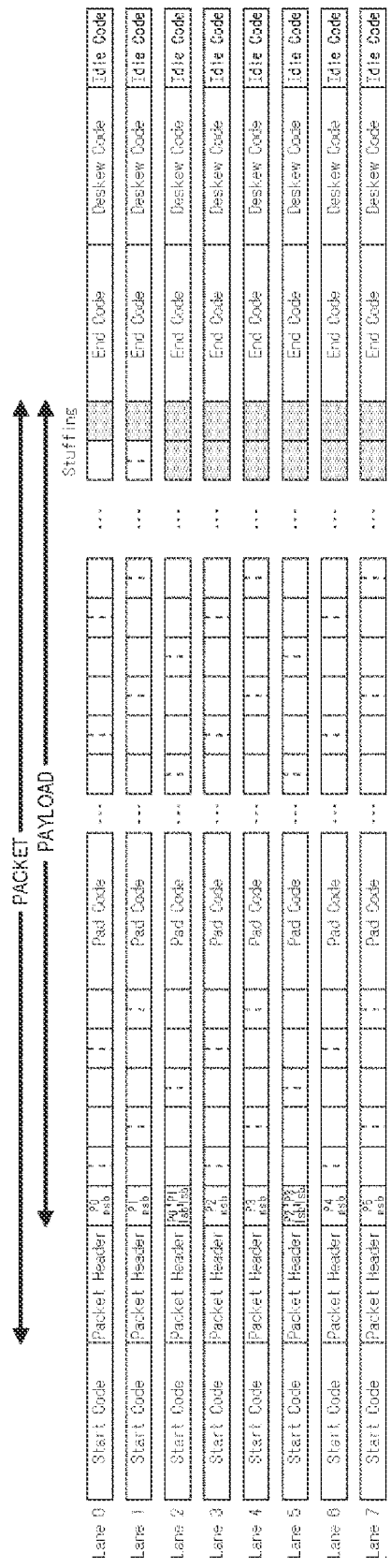
FIG. 24 is a diagram illustrating an example of packet data to which the control code is inserted.

FIG. 24 is a diagram illustrating an example of packet data to which the control code is inserted.

As illustrated in FIG. 24, each of the signal processing units 83-0 to 83-N adds Start Code before the packet data and inserts Pad Code into the payload data. End Code is added after the packet data, and Deskew Code is added after End Code. In the example in FIG. 24, Idle Code is added after Deskew Code.

The 8B10B symbol encoder 92 performs the 8B10B conversion on the packet data supplied from the control code insertion unit 91 (packet data to which control code is added) and outputs the packet data that is converted into data in 10-bit unit to the synchronization unit 93.

The synchronization unit 93 outputs each bit of the packet data supplied from the 8B10B symbol encoder 92 to the transmission unit 94 according to the clock signal generated by the clock generation unit 82. Note that it is not necessary to provide the synchronization unit 93 in the transmission unit 22. In this case, the packet data output from the 8B10B symbol encoder 92 is supplied to the transmission unit 94 as it is.

The transmission unit 94 transmits the packet data supplied from the synchronization unit 93 to the reception unit 31 via a transmission path forming Lane 0. In a case where data is transmitted by using eight lanes, the packet data is transmitted to the reception unit 31 by using transmission paths respectively forming Lanes 1 to 7.

[Configuration of Physical Layer of Reception Unit 31]

Next, a configuration of the physical layer of the reception unit 31 will be described.

The reception unit 31 includes a PHY-RX state control unit 101 and signal processing units 102-0 to 102-N as the configuration of the physical layer. The signal processing unit 102-0 includes a reception unit 111, a clock generation unit 112, a synchronization unit 113, a symbol synchronization unit 114, a 10B8B symbol decoder 115, a skew correction unit 116, and a control code removal unit 117. Packet data transmitted via the transmission path forming Lane 0 is input to the signal processing unit 102-0, and packet data transmitted via the transmission path forming Lane 1 is input to the signal processing unit 102-1. Furthermore, packet data transmitted via the transmission path forming Lane N is input to the signal processing unit 102-N.

In this way, the signal processing units 102-0 to 102-N as many as the number of lanes are provided in the physical layer of the reception unit 31, and processing on the packet data transmitted by using each lane is executed by the signal processing units 102-0 to 102-N in parallel. A configuration of the signal processing unit 102-0 will be described. However, the signal processing units 102-1 to 102-N have a similar configuration.

The reception unit 111 receives a signal indicating the packet data transmitted from the transmission unit 22 via the transmission path forming Lane 0 and outputs the received signal to the clock generation unit 112.

The clock generation unit 112 performs bit synchronization by detecting an edge of the signal supplied from the reception unit 111 and generates a clock signal on the basis of an edge detection period. The clock generation unit 112 outputs the signal supplied from the reception unit 111 and the clock signal to the synchronization unit 113.

The synchronization unit 113 samples the signal received by the reception unit 111 according to the clock signal generated by the clock generation unit 112 and outputs packet data acquired by sampling to the symbol synchronization unit 114. The clock generation unit 112 and the synchronization unit 113 realize a function of Clock Data Recovery (CDR).

The symbol synchronization unit 114 detects the control code included in the packet data or detects some symbols included in the control code so as to perform symbol synchronization. For example, the symbol synchronization unit 114 detects the symbol K28.5 included in each of Start Code, End Code, and Deskew Code and performs the symbol synchronization. The symbol synchronization unit 114 outputs packet data in 10-bit unit representing each symbol to the 10B8B symbol decoder 115.

Furthermore, the symbol synchronization unit 114 performs the symbol synchronization by detecting a symbol boundary included in Sync Code that is repeatedly transmitted from the transmission unit 22 in the training mode before the transmission of the packet data is started.

The 10B8B symbol decoder 115 performs the 10B8B conversion on the packet data in 10-bit unit supplied from the symbol synchronization unit 114 and outputs the packet data converted into data in eight-bit unit to the skew correction unit 116.

The skew correction unit 116 detects Deskew Code from the packet data supplied from the 10B8B symbol decoder 115. Information regarding a detection timing of Deskew Code by the skew correction unit 116 is supplied to the PHY-RX state control unit 101.

Furthermore, the skew correction unit 116 corrects Data Skew between the lanes so as to adjust the timing of Deskew Code to a timing indicated by the information supplied from the PHY-RX state control unit 101. The PHY-RX state control unit 101 supplies information indicating the latest timing among timings of Deskew Code detected by the signal processing units 102-0 to 102-N.

Figure 25:
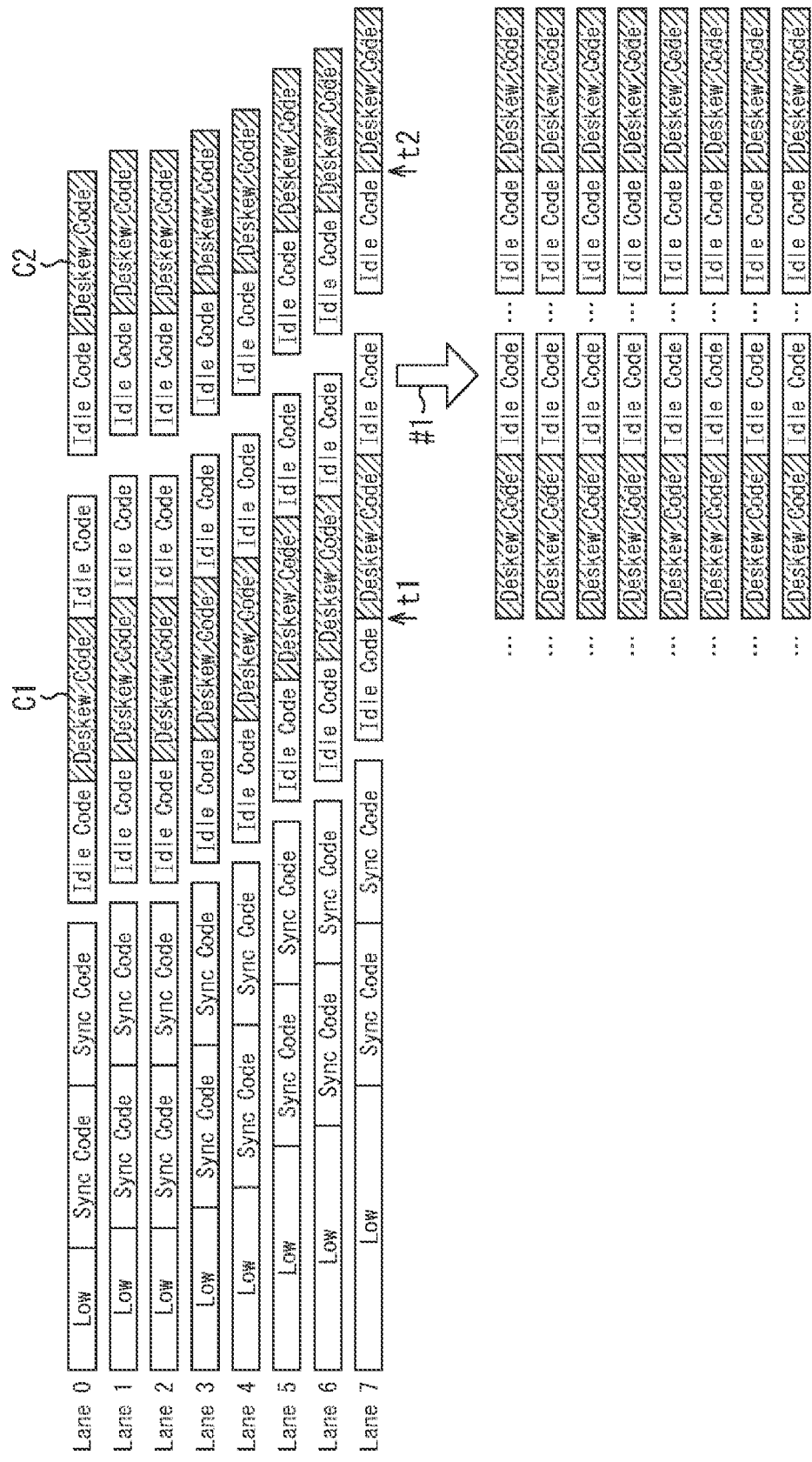
FIG. 25 is a diagram illustrating an example of correction of Data Skew.

FIG. 25 is a diagram illustrating an example of the correction of Data Skew between the lanes by using Deskew Code.

In the example in FIG. 25, Sync Code, Sync Code, . . . , Idle Code, Deskew Code, Idle Code, . . . , Idle Code, and Deskew Code are transmitted in each of Lanes 0 to 7, and the control codes thereof are received by the reception unit 31. Reception timings of the same control code in the lanes are different from each other, and the difference causes Data Skew between the lanes.

In this case, the skew correction unit 116 detects Deskew Code C1 which is a first Deskew Code and corrects a timing of a head of Deskew Code C1 to be a time t1 indicated by the information supplied from the PHY-RX state control unit 101. The PHY-RX state control unit 101 supplies information regarding the time t1 when Deskew Code C1 is detected in Lane 7 at the latest timing among the timings when Deskew Code C1 is detected in respective Lanes 0 to 7.

Furthermore, the skew correction unit 116 detects Deskew Code C2 which is a second Deskew Code and corrects a timing of a head of Deskew Code C2 to be a time t2 indicated by the information supplied from the PHY-RX state control unit 101. The PHY-RX state control unit 101 supplies information regarding the time t2 when Deskew Code C2 is detected in Lane 7 at the latest timing among the timings when Deskew Code C2 is detected in respective Lanes 0 to 7.

By executing the similar processing by the signal processing units 102-1 to 102-N, Data Skew between the lanes is corrected as indicated in a portion pointed by an arrow #1 in FIG. 25.

The skew correction unit 116 outputs the packet data of which Data Skew is corrected to the control code removal unit 117.

The control code removal unit 117 removes the control code added to the packet data and outputs data between Start Code to End Code to the link layer as packet data.

The PHY-RX state control unit 101 controls each of the signal processing units 102-0 to 102-N and causes each signal processing unit to correct Data Skew between the lanes, for example. Furthermore, in a case where a transmission error is caused in a predetermined lane and the control code is lost, the PHY-RX state control unit 101 adds the control code transmitted via the other lane instead of the lost control code so as to correct an error in the control code.

[Configuration of Link Layer of Reception Unit 31]

Next, a configuration of the link layer of the reception unit 31 will be described.

The reception unit 31 includes the LINK-RX protocol management unit 121, a lane integration unit 122, a packet separation unit 123, a payload error correction unit 124, and a Byte to Pixel converter 125 as the configuration of the link layer. The LINK-RX protocol management unit 121 includes a state control unit 131, a header error correction unit 132, a data removal unit 133, and a footer error detection unit 134.

The lane integration unit 122 integrates the packet data supplied from the signal processing units 102-0 to 102-N of the physical layer by rearranging the packet data in order reverse to the distribution order to each lane by the lane distribution unit 65 of the transmission unit 22.

For example, in a case where the lane distribution unit 65 distributes the packet data as illustrated in a portion pointed by the arrow #1 in FIG. 20, packet data on the left side of FIG. 20 is acquired by integrating the packet data in the lanes. At the time when the packet data in the lanes is integrated, the lane integration unit 122 removes the lane stuffing data according to control by the data removal unit 133. The lane integration unit 122 outputs the integrated packet data to the packet separation unit 123.

The packet separation unit 123 separates the packet data for one packet integrated by the lane integration unit 122 into packet data forming the header data and packet data forming the payload data. The packet separation unit 123 outputs the header data to the header error correction unit 132 and outputs the payload data to the payload error correction unit 124.

Furthermore, in a case where the packet includes a footer, the packet separation unit 123 separates data for one packet into the packet data forming the header data, the packet data forming the payload data, and the packet data forming the footer data. The packet separation unit 123 outputs the header data to the header error correction unit 132 and outputs the payload data to the payload error correction unit 124. Furthermore, the packet separation unit 123 outputs the footer data to the footer error detection unit 134.

In a case where the parity is inserted into the payload data supplied from the packet separation unit 123, the payload error correction unit 124 detects an error in the payload data by performing error correction calculation on the basis of the parity and corrects the detected error. For example, in a case where the parity is inserted as illustrated in FIG. 16, the payload error correction unit 124 uses two parities inserted at the end of the first Basic Block so as to correct an error in the 224 pieces of pixel data provided before the parities.

The payload error correction unit 124 outputs the pixel data after the error correction acquired by correcting the error in each of Basic Block and Extra Block to the Byte to Pixel converter 125. In a case where the parity is not inserted into the payload data supplied from the packet separation unit 123, the payload data supplied from the packet separation unit 123 is output to the Byte to Pixel converter 125.

The Byte to Pixel converter 125 removes the payload stuffing data included in the payload data supplied from the payload error correction unit 124 according to the control by the data removal unit 133.

Furthermore, the Byte to Pixel converter 125 performs Byte to Pixel conversion for converting data of each pixel in byte unit acquired by removing the payload stuffing data into pixel data in eight-bit, 10-bit, 12-bit, 14-bit, or 16-bit units. The Byte to Pixel converter 125 performs the conversion reverse to the Pixel to Byte conversion by the Pixel to Byte converter 62 of the transmission unit 22 described with reference to FIGS. 9 to 13.

The Byte to Pixel converter 125 outputs the pixel data in eight-bit, 10-bit, 12-bit, 14-bit, or 16-bit units acquired by the Byte to Pixel conversion to the frame data output unit 141. In the frame data output unit 141, for example, each line of the valid pixel specified by Line Valid of the header information is generated on the basis of the pixel data acquired by the Byte to Pixel converter 125, a one-frame image is generated by arranging each line according to Line Number of the header information.

The state control unit 131 of the LINK-RX protocol management unit 121 manages a state of the link layer of the reception unit 31.

The header error correction unit 132 acquires three pairs of the header information and the CRC code on the basis of the header data supplied from the packet separation unit 123. The header error correction unit 132 performs error detection calculation that is calculation for detecting an error in the header information for each of the pairs of the header information and the CRC code by using the CRC code in the same pair as the header information.

Furthermore, the header error correction unit 132 estimates correct header information on the basis of at least one of the error detection result of the header information of each pair or the comparison result of data acquired by the error detection calculation and outputs the header information that has been estimated as correct header information and a decoding result. The data acquired by the error detection calculation is a value acquired by applying the generator polynomial of the CRC to the header information. Furthermore, the decoding result is information indicating successful decoding or failed decoding.

The three pairs of the header information and the CRC code are referred to as a pair 1, a pair 2, and a pair 3. In this case, the header error correction unit 132 acquires whether or not header information of the pair 1 includes an error (error detection result) by the error detection calculation on the pair 1 and data 1 that is data acquired by the error detection calculation. Furthermore, the header error correction unit 132 acquires whether or not header information of the pair 2 includes an error by the error detection calculation on the pair 2 and data 2 that is data acquired by the error detection calculation. The header error correction unit 132 acquires whether or not header information of the pair 3 includes an error by the error detection calculation on the pair 3 and data 3 that is data acquired by the error detection calculation.

Furthermore, the header error correction unit 132 determines whether or not the data 1 coincides with the data 2, whether or not the data 2 coincides with the data 3, and whether or not the data 3 coincides with the data 1.

For example, in a case where an error is not detected by the error detection calculation on any one of the pairs 1, 2, and 3 and the comparison results of the data acquired by the error detection calculation coincide, the header error correction unit 132 selects information indicating the successful decoding as the decoding result. Furthermore, the header error correction unit 132 estimates that all the pieces of the header information are correct and selects any one of the header information of the pair 1, the header information of the pair 2, and the header information of the pair 3 as output information.

On the other hand, in a case where an error is not detected only in the error detection calculation on the pair 1, the header error correction unit 132 selects the information indicating the successful decoding as the decoding result, estimates that the header information of the pair 1 is correct, and selects the header information of the pair 1 as the output information.

Furthermore, in a case where an error is not detected only in the error detection calculation on the pair 2, the header error correction unit 132 selects the information indicating the successful decoding as the decoding result, estimates that the header information of the pair 2 is correct, and selects the header information of the pair 2 as the output information.

In a case where an error is not detected only in the error detection calculation on the pair 3, the header error correction unit 132 selects the information indicating the successful decoding as the decoding result, estimates that the header information of the pair 3 is correct, and selects the header information of the pair 3 as the output information.

The header error correction unit 132 outputs the decoding result and the output information selected as described above to the register 142 and causes the register 142 to store the output information. In this way, the header error correction unit 132 corrects an error in the header information by detecting header information with no error by using the CRC code from among the plurality of pieces of header information and outputting the detected header information.

The data removal unit 133 removes the lane stuffing data by controlling the lane integration unit 122 and removes the payload stuffing data by controlling the Byte to Pixel converter 125.

The footer error detection unit 134 acquires the CRC code stored in the footer on the basis of the footer data supplied from the packet separation unit 123. The footer error detection unit 134 performs the error detection calculation by using the acquired CRC code and detects an error in the payload data. The footer error detection unit 134 outputs the error detection result and causes the register 142 to store the output result.

[Operation of Image Sensor 11 and DSP 12]

Next, a series of processing of the transmission unit 22 and the reception unit 31 having the above configuration will be described.

Figure 26:
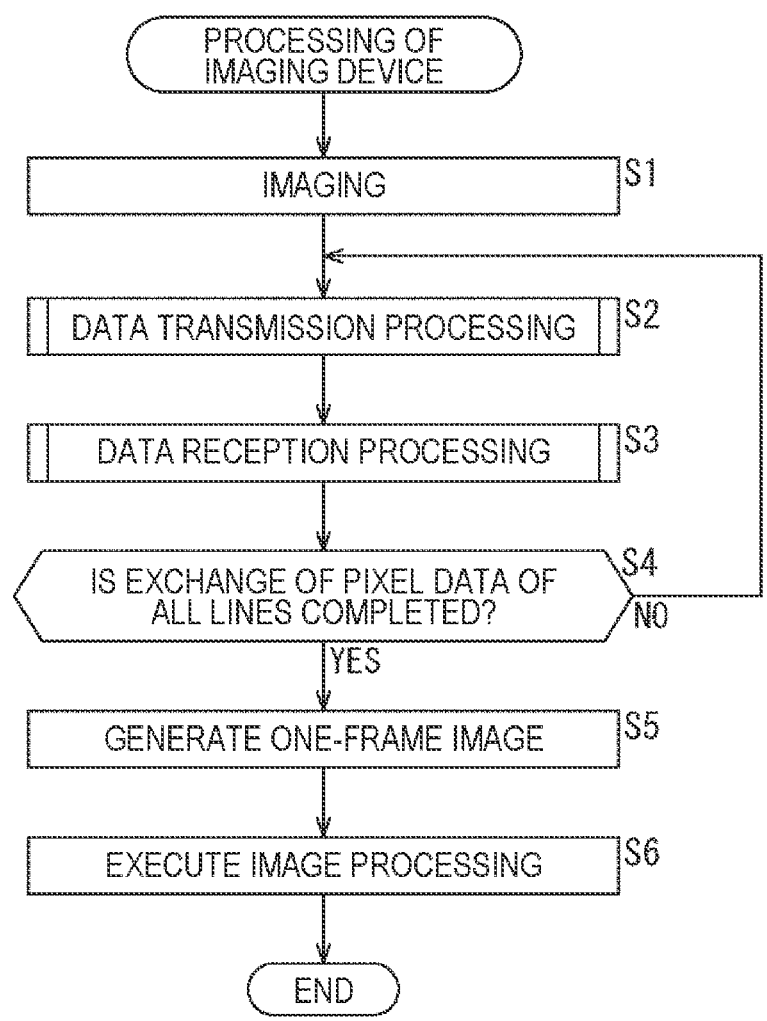
FIG. 26 is a flowchart for explaining processing of an imaging device.

First, an operation of an imaging device including the transmission system 1 will be described with reference to the flowchart in FIG. 26. Processing in FIG. 26 is started when an instruction to start imaging is issued, for example, by pressing a shutter button provided in the imaging device.

In step S1, the imaging unit 21 of the image sensor 11 performs imaging. The frame data input unit 52 (FIG. 5) of the imaging unit 21 sequentially outputs pixel data of the one-frame image acquired by imaging by one-pixel data.

In step S2, the transmission unit 22 executes data transmission processing. According to the data transmission processing, a packet in which pixel data for one line is stored in a payload is generated, and packet data forming the packet is transmitted to the reception unit 31. The data transmission processing will be described later with reference to the flowchart in FIG. 27.

In step S3, the reception unit 31 executes data reception processing. According to the data reception processing, the packet data transmitted from the transmission unit 22 is received, and the pixel data stored in the payload is output to the image processing unit 32. The data reception processing will be described later with reference to the flowchart in FIG. 28.

The data transmission processing executed by the transmission unit 22 in step S2 and the data reception processing executed by the reception unit 31 in step S3 are alternately executed on the pixel data for one line. In other words, when pixel data for one line is transmitted by the data transmission processing, the data reception processing is executed, and when the pixel data for one line is received by the data reception processing, the data transmission processing is executed on pixel data for next one line. The data transmission processing by the transmission unit 22 and the data reception processing by the reception unit 31 may be appropriately executed in parallel in time. In step S4, the frame data output unit 141 of the image processing unit 32 determines whether or not exchange of the pixel data of all the lines included in the one-frame image is terminated. In a case where it is determined that the exchange of the pixel data is not terminated, the frame data output unit 141 repeatedly executes the processing in and after step S2.

In a case where it is determined in step S4 that the exchange of the pixel data of all the lines included in the one-frame image is terminated, the frame data output unit 141 of the image processing unit 32 generates a one-frame image on the basis of the pixel data supplied from the reception unit 31 in step S5.

In step S6, the image processing unit 32 executes image processing by using the one-frame image and terminates the processing.

Figure 27:
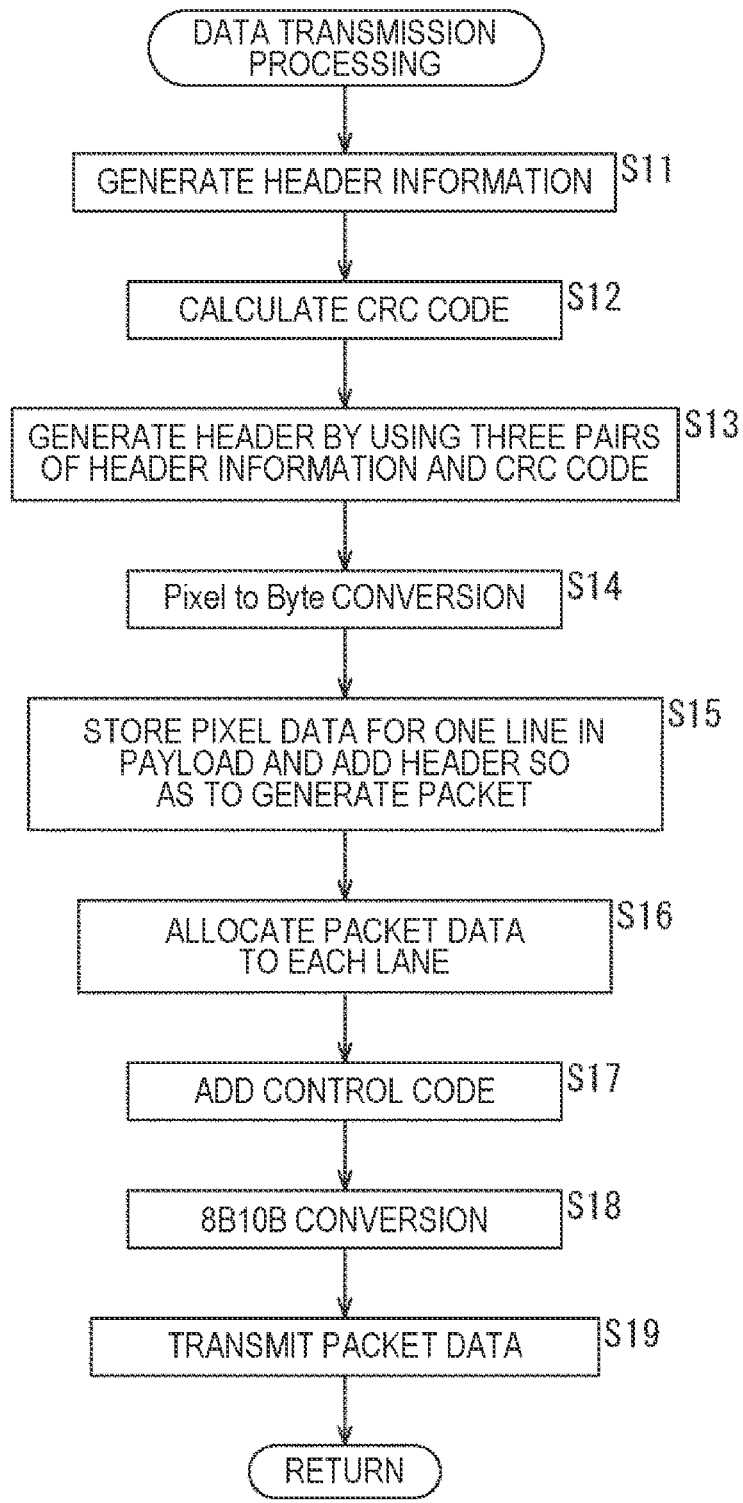
FIG. 27 is a flowchart for explaining data transmission processing executed in step S2 in FIG. 26.

Next, the data transmission processing executed in step S2 in FIG. 26 will be described with reference to the flowchart in FIG. 27.

In step S11, the header generation unit 72 generates header information including Frame Start, Frame End, Line Valid, Line Number, and Reserved.

In step S12, the header generation unit 72 calculates a CRC code by applying the header information to the generator polynomial.

In step S13, the header generation unit 72 generates a pair of the header information and the CRC code by adding the CRC code to the header information and generates a header by repeatedly arranging the three same pairs of the header information and the CRC code.

In step S14, the Pixel to Byte converter 62 acquires the pixel data supplied from the frame data input unit 52 and performs the Pixel to Byte conversion. The Pixel to Byte converter 62 outputs the generated payload data by grouping the pixel data in byte unit acquired by the Pixel to Byte conversion, adding the payload stuffing data, and the like. The payload ECC insertion unit 63 appropriately inserts the parity into the payload data.

In step S15, the packet generation unit 64 generates a packet on the basis of the payload data including the pixel data for one line and the header generated by the header generation unit 72 and outputs packet data constituting one packet.

In step S16, the lane distribution unit 65 allocates the packet data supplied from the packet generation unit 64 to the plurality of lanes used for data transmission.

In step S17, the control code insertion unit 91 adds the control code to the packet data supplied from the lane distribution unit 65.

In step S18, the 8B10B symbol encoder 92 performs the 8B10B conversion on the packet data to which the control code is added and outputs the packet data converted into data in 10-bit unit.

In step S19, the synchronization unit 93 outputs the packet data supplied from the 8B10B symbol encoder 92 according to the clock signal generated by the clock generation unit 82 and makes the transmission unit 94 transmit the packet data. The processing in steps S17 to S19 is executed by the signal processing units 83-0 to 83-N in parallel. When the transmission of the pixel data for one line is completed, the procedure returns to step S2 in FIG. 26, and the subsequent processing is executed.

Figure 28:
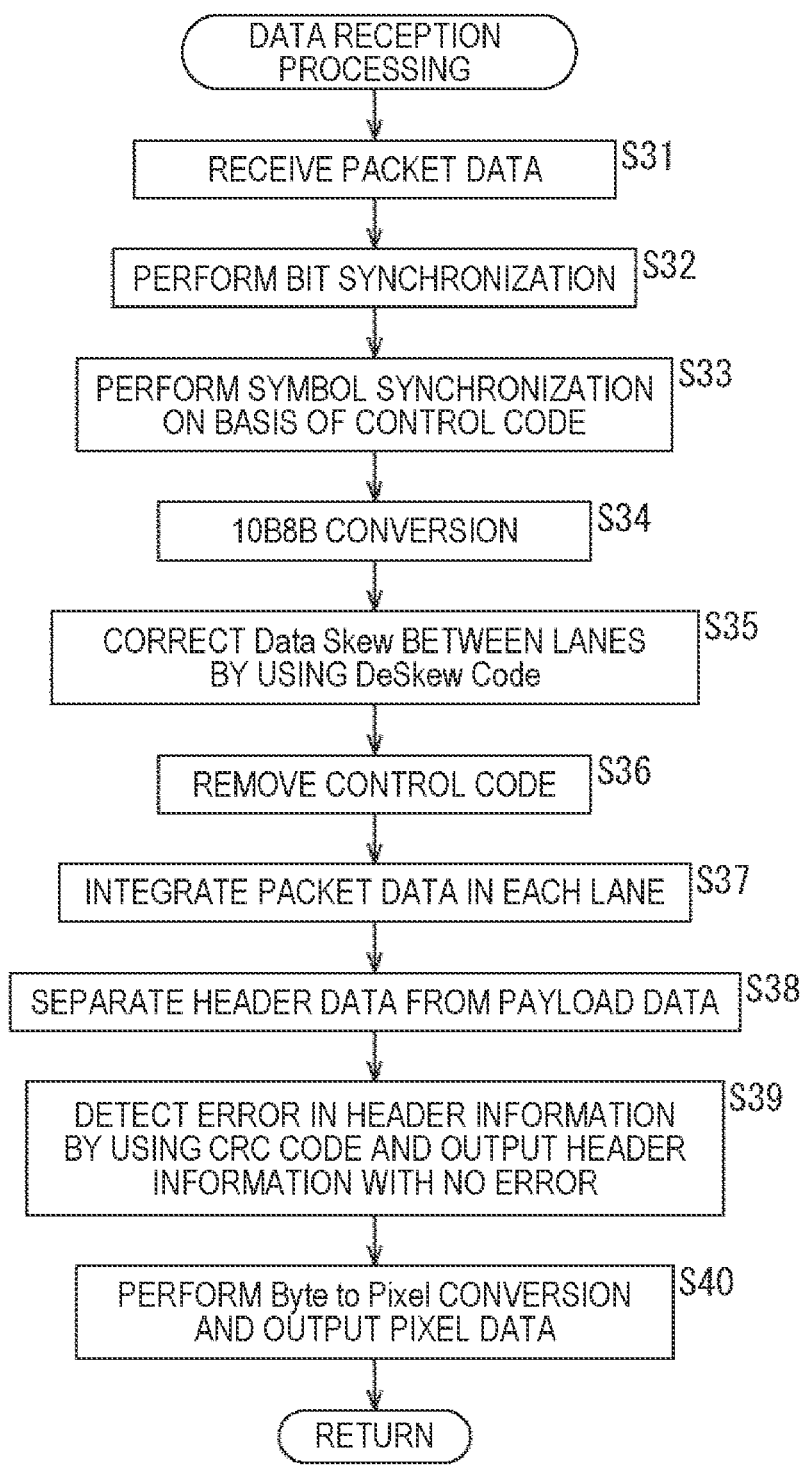
FIG. 28 is a flowchart for explaining data reception processing executed in step S3 in FIG. 26.

Next, the data reception processing executed in step S3 in FIG. 26 will be described with reference to the flowchart in FIG. 28.

In step S31, the reception unit 111 receives a signal indicating the packet data transmitted from the transmission unit 22. The processing in steps S31 to S36 is executed by the signal processing units 102-0 to 102-N in parallel.

In step S32, the clock generation unit 112 performs bit synchronization by detecting the edge of the signal supplied from the reception unit 111. The synchronization unit 113 samples the signal received by the reception unit 111 and outputs the packet data to the symbol synchronization unit 114.

In step S33, the symbol synchronization unit 114 performs symbol synchronization, for example, by detecting the control code included in the packet data.

In step S34, the 10B8B symbol decoder 115 performs the 10B8B conversion on the packet data on which the symbol synchronization has been performed, and outputs the packet data converted into data in eight-bit unit.

In step S35, the skew correction unit 116 detects Deskew Code and corrects Data Skew between the lanes so as to adjust the timing of Deskew Code to a timing indicated by the information supplied from the PHY-RX state control unit 101 as described above.

In step S36, the control code removal unit 117 removes the control code added to the packet data.

In step S37, the lane integration unit 122 integrates the packet data supplied from the signal processing units 102-0 to 102-N.

In step S38, the packet separation unit 123 separates the packet data integrated by the lane integration unit 122 into the packet data forming the header data and the packet data forming the payload data.

In step S39, the header error correction unit 132 performs error detection calculation by using the CRC code on each pair of the header information and the CRC code included in the header data separated by the packet separation unit 123. Furthermore, the header error correction unit 132 selects the header information with no error on the basis of the error detection result of each pair and the comparison result of the data acquired by the error detection calculation and outputs the selected information.

In step S40, the Byte to Pixel converter 125 performs the Byte to Pixel conversion on the payload data and outputs pixel data in eight-bit, 10-bit, 12-bit, 14-bit, or 16-bit units. The payload error correction unit 124 appropriately corrects an error in the payload data, on which the Byte to Pixel conversion is performed, by using the parity.

When the processing on the pixel data for one line is completed, the procedure returns to step S3 in FIG. 26, and the subsequent processing is executed.

Data is transmitted between the image sensor 11 and the DSP 12 by using a packet format in which one line in one frame corresponds to one packet as described above.

It can be said that the packet format used for data transmission between the image sensor 11 and the DSP 12 is a format that minimizes the transmission of the header information and the control codes indicating the packet boundaries such as Start Code, End Code, and the like, and it is possible to prevent a decrease in a transmission efficiency. If a packet format in which the pixel data stored in the payload of one packet is less than one line is adopted, it is necessary to transmit more packets in order to transmit the pixel data for an entire frame. As the numbers of pieces of header information and control codes to be transmitted are increased, the transmission efficiency decreases.

Furthermore, it is possible to suppress transmission latency by preventing the decrease in the transmission efficiency, an interface with a high pixel and a high frame rate that needs to transmit a large amount of image data at high speed can be realized.

By adopting the packet format on the premise of that reliability and redundancy of the transmission are enhanced and the reception unit 31 corrects an error, it is possible to secure countermeasures against a header information transmission error. Since synchronization information of Frame/Line (V/H) and the like is transmitted by using the header information, if the header information was lost due to a transmission error, there is a possibility that this causes a large defect in a system. However, such a problem can be prevented.

Furthermore, it is possible to suppress an increase in mounting cost and power consumption to secure the countermeasures against the header information transmission error. In other words, the CRC code is added to the packet format used for the data transmission between the image sensor 11 and the DSP 12 so that the DSP 12 can detect whether or not the header information includes a transmission error. Furthermore, by transmitting the three pairs of the header information and the CRC code, the DSP 12 can correct the header information to correct header information in a case where the header information includes a transmission error.

In a case where the error correction code is used as the countermeasure against the header information transmission error, it is necessary to prepare a circuit that calculates the error correction code in the transmission unit 22 and a circuit that performs the error correction calculation in the reception unit 31. Since the CRC code that is an error detection code is added to the header information, a circuit size and power consumption can be reduced than a case where the circuit that performs calculation regarding error correction is prepared. Furthermore, in a case where the error in the header information is detected, the reception unit 31 does not request the transmission unit 22 to retransmit the header information. Therefore, it is not necessary to prepare a reverse transmission path used to request retransmission.

By increasing the redundancy and configuring the control code by combining a plurality of K Characters of an 8B10B code, an error probability of the control code can be reduced.

With this reduction, it is possible to secure countermeasures against the transmission error in the control code by a relatively simple circuit.

Specifically, four symbols including three kinds of K Characters are used in combination for Start Code. However, if at least symbols other than K28.5 can be detected, the reception unit 31 can specify Start Code, and it can be said that a transmission error resistance is high. The same applies to End Code.

Furthermore, four kinds of K Characters are used in combination for Pad Code. However, by allocating more kinds of K Characters than other control codes, the error resistance can be more increased than the other control codes. In other words, if one of the four kinds of symbols can be detected, the reception unit 31 can specify Pad Code. Since a transmission frequency of Pad Code is higher than Start Code, End Code, and the like, Pad Code has a structure that can more increase the error resistance.

Moreover, by transmitting the same control code at the same timing in each lane, even in a case where a transmission error is caused in one lane and the control code is lost, the control code with an error can be reproduced by using the control code in the other lane.

Furthermore, the number of K Characters is limited. Therefore, minimum K Characters are combined to form each control code. For example, Sync Code, Deskew Code, and Standby Code that can relatively allow transmission errors by repeatedly transmitting the codes have a data structure that does not need to additionally allocate K Character.

Since the control code necessary for resynchronization is allocated for each packet (each line), in a case where bit synchronization is lost due to disturbance such as static electricity, noise, or the like, resynchronization can be quickly made. Furthermore, an effect of the transmission error caused by the lost synchronization can be minimized.

Specifically, bit synchronization can be performed by detecting a transition/edge of 8B10B converted bit data by the CDR realized by the clock generation unit 112 and the synchronization unit 113. If the transmission unit 22 continuously transmitted data, bit synchronization can be performed within a period assumed as a CDR lock time.

Furthermore, even in a case where the symbol synchronization is lost, a specific K Character (K28.5) is detected by the symbol synchronization unit 114 so as to quickly perform resynchronization. Since K28.5 is used for each of Start Code, End Code, and Deskew Code, symbol synchronization can be performed at three positions during a transmission period of packet data for one packet.

Furthermore, Data Skew between the lanes can be corrected by using Deskew Code so that the lanes can be synchronized.

In the link layer, pieces of packet data in group unit, for example, 16 pieces (in case of example in FIG. 14, 16-bit unit) are processed in parallel. With this operation, it is possible to reduce the circuit size and a memory amount than a case where a single piece of packet data is processed in one clock period. In terms of mounting, the circuit size and the like can be reduced in a case where the pieces of the packet data in a predetermined unit is collectively processed than that in a case where the pieces of packet data are processed one by one. By reducing the circuit size, it is possible to reduce the power consumption.

Furthermore, at the time of lane allocation, the error resistance can be increased by allocating continuous pieces of packet data to different lanes. Even in a case where errors occur across continuous packet data in a certain lane and the number of pieces of the packet data exceeds an error correction capability of the parity, by combining the lanes by the reception unit 31, the positions of the packet data where the errors occur are dispersed, and there may be a case where the error can be corrected by using the parity. The error correction capability of the parity is determined by a length of the parity.

Moreover, when it is assumed that a lane closer to the physical layer is a lower level, ECC processing is executed in an upper level than lane distribution and lane integration so that it is possible to reduce the circuit sizes of the transmission unit 22 and the reception unit 31. For example, in the transmission unit 22, in a case where the parity of the ECC is inserted into the payload after the packet data is allocated to each lane, it is necessary to prepare the payload ECC insertion unit for each lane, and the circuit size is increased. However, such a problem can be prevented.

In the physical layer, the parallel processing on the packet data is executed by the plurality of circuits. However, by sharing the PHY-TX state control unit 81 and the clock generation unit 82, a circuit can be simplified than a case where these circuits are prepared for each lane. Furthermore, by using a protocol that does not transmit different control codes for respective lanes, a circuit that processes the packet data in each lane can be simplified.

[Switching the Number of Lanes]

The same control codes are transmitted at the same timing in the respective lanes not only when normal data is transmitted but also, for example, in a case where the number of lanes is switched. Even in a case where the number of lanes is switched, states of all active lanes (lanes used for data transmission) are the same.

Figure 29:
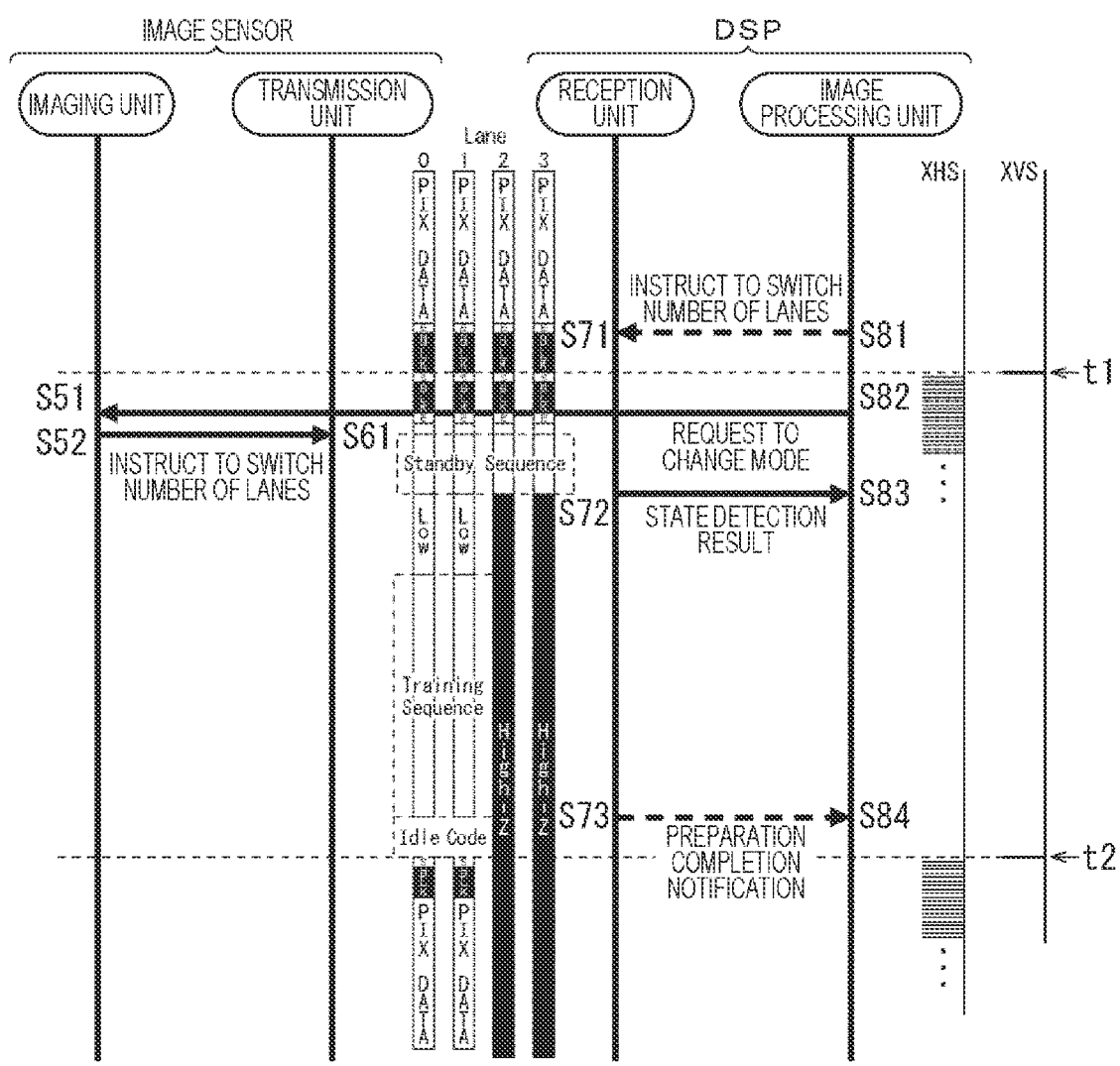
FIG. 29 is a diagram illustrating a control sequence in a case where the number of lanes is switched.

FIG. 29 is a diagram illustrating a control sequence in a case where the number of lanes is switched.

On the right side in FIG. 29, timings of a vertical synchronization signal (XVS) and a horizontal synchronization signal (XHS) are illustrated. A case will be described where the pixel data of each line forming a one-frame image is transmitted according to the horizontal synchronization signal before a time t1 when the vertical synchronization signal is detected and the number of active lanes is changed from four to two at the timing of the time t1 Before the time t1 data is transmitted by using four lanes.

Approximately at the center of FIG. 29, a state of each lane is vertically illustrated. "PIX DATA" represents that the pixel data is transmitted in a lane to which the characters of PIX DATA are added. "E", "BLK", and "S" subsequent to "PIX DATA" respectively represent Frame End, a blanking interval, and Frame Start.

In a case where the transmission of the pixel data of the frame to be transmitted is completed in one frame period before the time t1 the image processing unit 32 instructs the reception unit 31 to switch the number of lanes from four to two in step S81. The instruction from the image processing unit 32 is received by the reception unit 31 in step S71.

At the time t1, in step S82, the image processing unit 32 requests the imaging unit 21 of the image sensor 11 to change a mode. The mode change request to be transmitted to the imaging unit 21 includes information indicating switching the number of lanes from four to two. Although not illustrated in FIG. 1 and the like, between the imaging unit 21 and the image processing unit 32, a transmission path used to transmit information regarding a setting value with respect to imaging such as a shutter speed, a gain, and the like by the image processing unit 32 to the imaging unit 21 is provided. The mode change request is transmitted to the imaging unit 21 via this transmission path.

In step S51, the imaging unit 21 receives the mode change request from the image processing unit 32, and in step S52, the imaging unit 21 instructs the transmission unit 22 to switch the number of lanes from four to two. The instruction by the imaging unit 21 is received by the transmission unit 22 in step S61.

Standby Sequence is performed between the transmission unit 22 and the reception unit 31, and Standby Code is repeatedly transmitted from the transmission unit 22 to the reception unit 31 by using Lanes 0 to 3. When Standby Sequence ends, a detection result of a state is output from the reception unit 31 in step S72 and is received by the image processing unit 32 in step S83. Furthermore, states of Lanes 0 and 1 that maintain an active state become Low, and states of Lanes 2 and 3 in which data transmission is terminated become High-Z.

Training Sequence is performed between the transmission unit 22 and the reception unit 31, and Sync Code is repeatedly transmitted from the transmission unit 22 to the reception unit 31 by using Lanes 0 and 1. In the reception unit 31, the bit synchronization is secured, and the symbol synchronization is secured by detecting Sync Code.

When Training Sequence ends, the reception unit 31 notifies the image processing unit 32 that preparation is completed in step S73. The notification made by the reception unit 31 is received by the image processing unit 32 in step S84, and the series of control sequence in a case where the number of lanes is switched is terminated.

In this way, in the control sequence for switching the number of lanes, Standby Code is transmitted in Lanes 2 and 3, in which the data transmission is terminated, at the time of Standby Sequence so as to be in the state same as those of Lanes 0 and 1 that are continuously used for data transmission. For example, it is considered that the states of Lanes 2 and 3 are maintained to be High-Z without transmitting Standby Code. However, the states of Lanes 2 and 3 are different from the state of lane that is continuously used for data transmission, and complicated control is needed.

[Modification of Frame Format]

Figure 30:
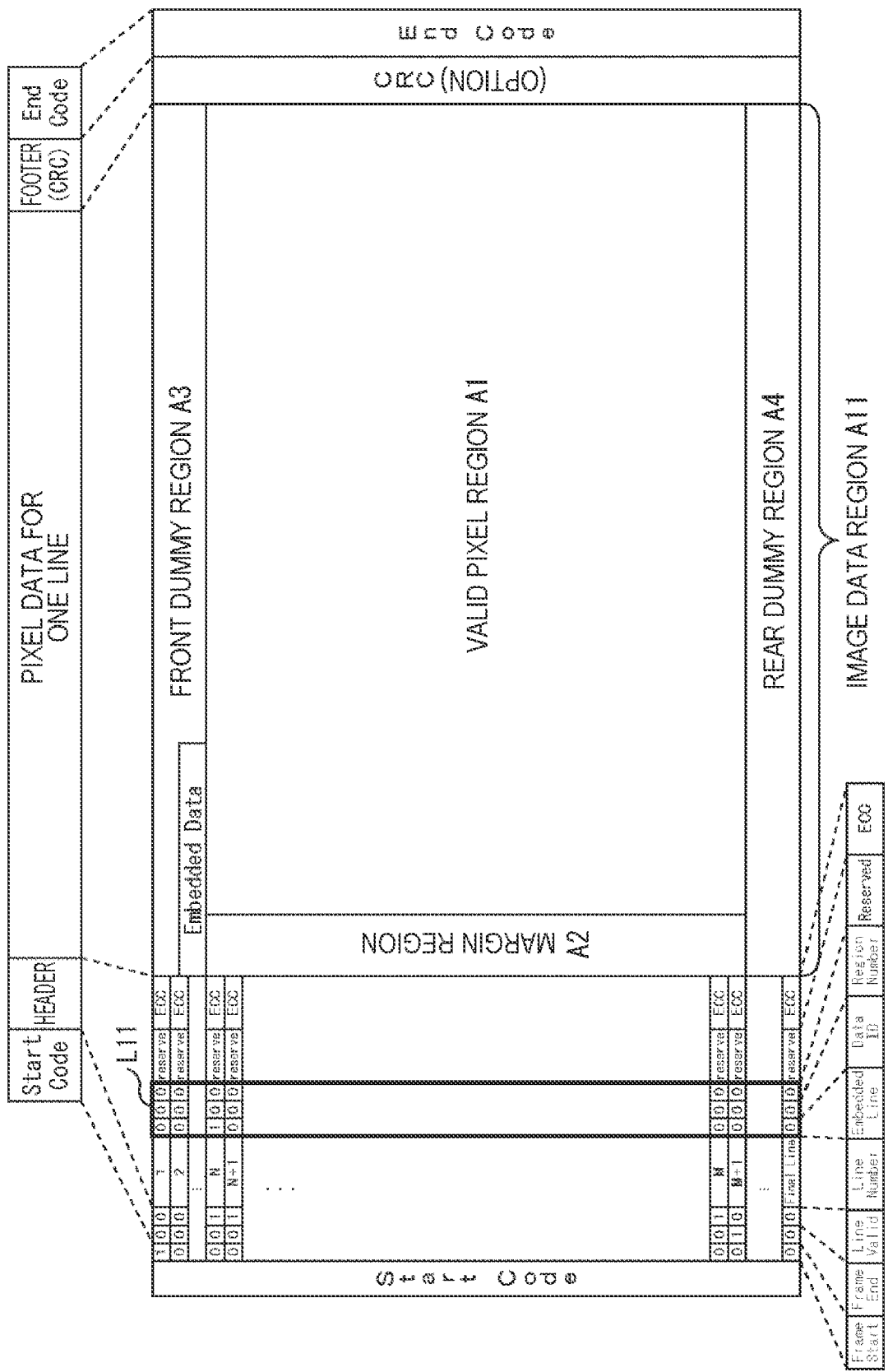
FIG. 30 is a diagram illustrating another example of the frame format.

FIG. 30 is a diagram illustrating another example of a frame format used to transmit data between the image sensor 11 and the DSP 12. The description overlapping with the above description will be omitted as appropriate.

The frame format illustrated in FIG. 30 is different from the format in FIG. 4 in that three pieces of data including Embedded Line, Data ID, and Region Number surrounded by a thick line L11 are added to the header which is added to the image data of each line. These pieces of information are generated by the header generation unit 72 in FIG. 5 and are added to the header.

Figure 31:
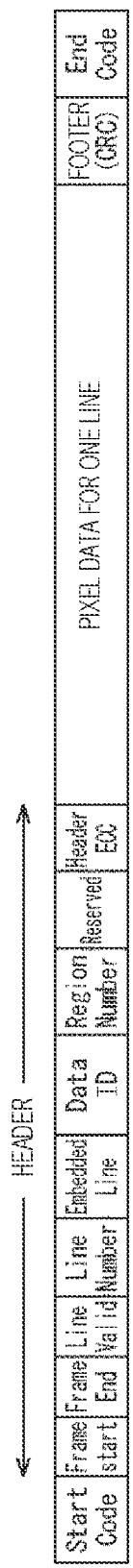
FIG. 31 is an enlarged view illustrating one packet in the frame format in FIG. 30.

FIG. 31 is an enlarged view illustrating one packet in the frame format in FIG. 30. The one packet includes a header and payload data that is pixel data for one line. A footer may be added to the packet. Start Code is added to the head of each packet, and End Code is added after the packet.

Header information includes Embedded Line as line information, Data ID as data identification, and Region Number as region information in addition to Frame Start, Frame End, Line Valid, and Line Number described above. Content of each piece of information is illustrated in FIG. 32.

Embedded Line is one-bit information indicating whether or not the packet is a packet used for transmission of a line into which Embedded Data is inserted. For example, a value of one is set to Embedded Line of a header of a packet used for transmission of a line including Embedded Data, and a value of zero is set to Embedded Line of a header of a packet used for transmission of another line. As described above, the information regarding the setting value with respect to imaging is inserted into a predetermined line in the front dummy region A3 and the rear dummy region A4 as Embedded Data.

Data ID is P-bit information indicating a data ID and a data type in multi-stream transmission. The P bit represents a predetermined number of bits equal to or more than one bit. The multi-stream transmission is data transmission performed by using a plurality of pairs of one transmission unit and one reception unit.

Region Number is one-bit information indicating data in which region of the imaging unit 21 is the pixel data stored in the payload. Reserved becomes 30-P bits by adding three pieces of data.

2. Regarding Mode Change

Here, Mode Change will be described. Mode Change is performed when a parameter such as the number of lanes, that defines contents of a data transmission mode, is changed.

[(1) Normal Mode Change]

Figure 33:
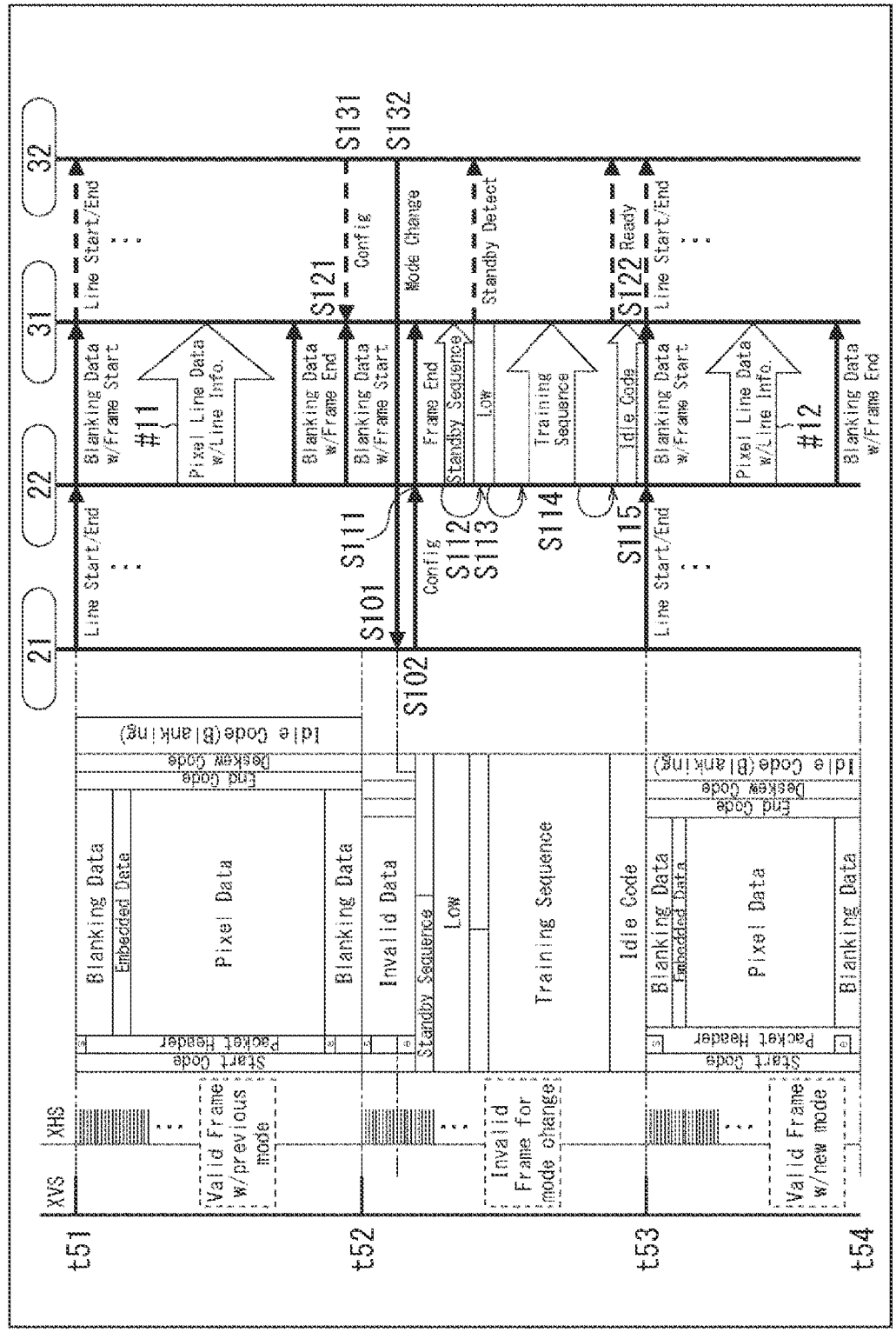
FIG. 33 is a diagram illustrating an example of a sequence of Mode Change.

Mode Change FIG. 33 is a diagram illustrating an example of a sequence of Mode Change.

Three frames vertically aligned on the left side in FIG. 33 indicate a frame format of data transmitted at the time of Mode Change. The vertical direction in FIG. 33 indicates a time direction. Of operations performed at the time of Mode Change, main operations of the image sensor 11 and the DSP 12 will be described.

Each of periods between times t51 and t52, t52 and t53, and t53 and t54 defined by the vertical synchronization signal (XVS) illustrated at the left end corresponds to a transmission period of each frame. Each line included in each frame is transmitted by using one packet according to the timing of the horizontal synchronization signal (XHS).

Figure 34:
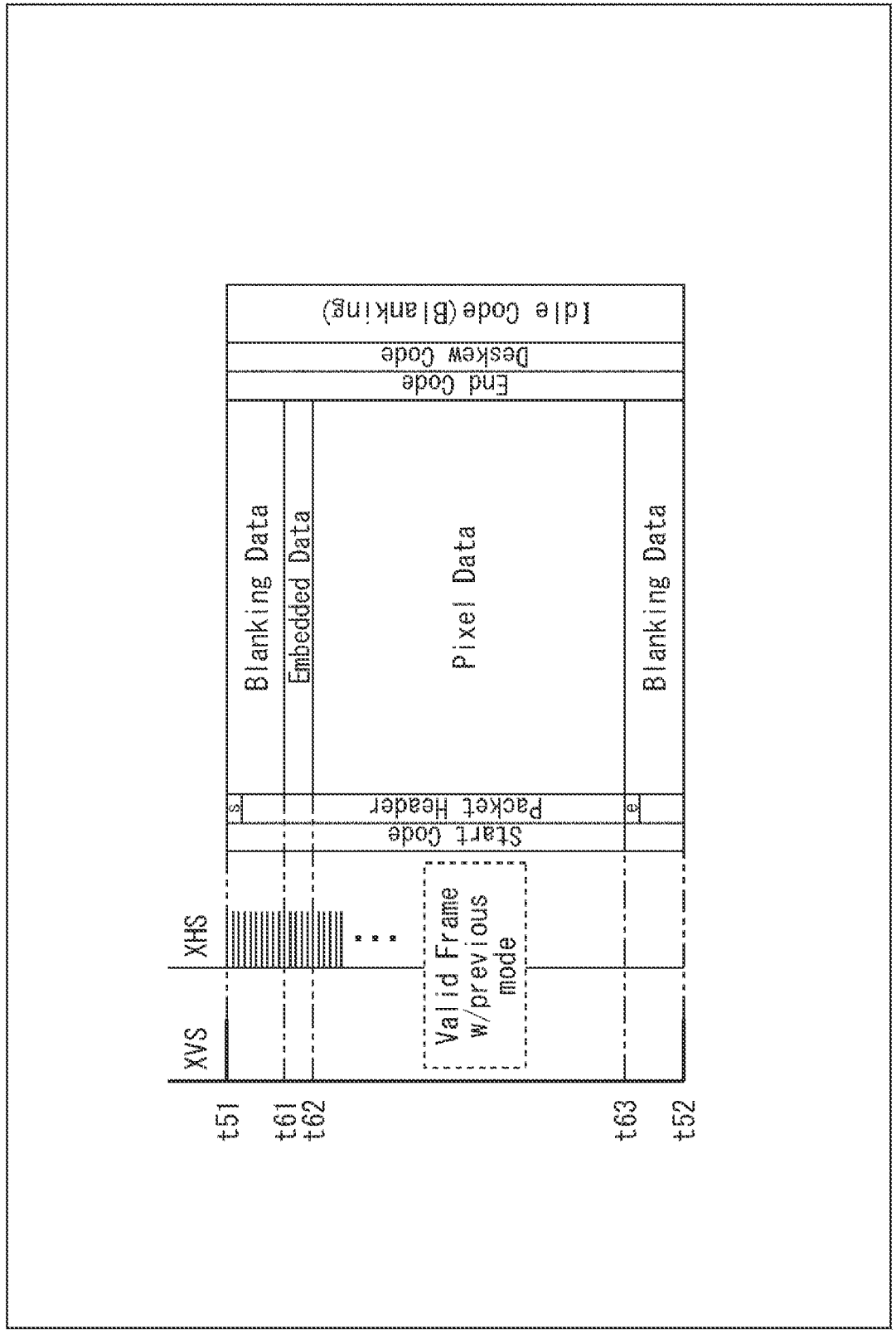
FIG. 34 is an enlarged diagram of a first frame in FIG. 33.

FIG. 34 is an enlarged diagram of a first frame in FIG. 33.

In the example in FIG. 34, between a time t51 and a time t61, a packet that stores Blanking Data corresponding to the data in the front dummy region A3 in FIG. 4 in a payload is transmitted.

Furthermore, between the time t61 and a time t62, a packet that stores Embedded Data in a payload is transmitted, and between the time t62 and a time t63, a packet that stores pixel data of each line in a payload is transmitted. Between the time t63 and the time t52, a packet that stores Blanking Data corresponding to the data in the rear dummy region A4 in FIG. 4 in a payload is transmitted.

Each packet is configured by adding a header in front of the payload. Start Code is added before each packet, and End Code is added at the end. Deskew Code and Idle Code are added after End Code.

An outline arrow #11 in the sequence diagram on the right side in FIG. 33 indicates that such data in a first frame is exchanged between the transmission unit 22 and the reception unit 31. Regarding a second frame and a third frame, data is transmitted in each line from the upper line.

In step S131 at the timing of the time t52 when transmission of a final line of the first frame is completed, the image processing unit 32 of the DSP 12 outputs Config to the reception unit 31. Config is a control signal that requests to reflect a parameter set to the register in a reception operation. Various control signals used between the imaging unit 21 and the transmission unit 22 and between the reception unit 31 and the image processing unit 32 will be described later in detail.

Before the output of Config, communication is performed between the imaging unit 21 of the image sensor 11 and the image processing unit 32 of the DSP 12 via a predetermined interface (transmission path (not illustrated) between imaging unit 21 and image processing unit 32), and the parameter is changed. In the imaging unit 21, the changed parameter is set to the register 53 (FIG. 5), and in the image processing unit 32, the changed parameter is set to the register 142.

In step S121, the reception unit 31 receives Config output from the image processing unit 32 and reads the changed parameter set to the register 142 and reflects the parameter in the reception operation. Subsequent data is received with contents defined by the changed parameters.

In step S132, the image processing unit 32 issues Mode Change to the imaging unit 21 of the image sensor 11. The issuance of Mode Change means to transmit the control signal for requesting a change in the transmission mode. Mode Change is issued by using an interface which is not illustrated.

The imaging unit 21 that has received the issued Mode Change in step S101 outputs Config to the transmission unit 22 in step S102.

In step S111, the transmission unit 22 receives Config output from the imaging unit 21 and reads the changed parameter set to the register 53 and reflects the parameter in a data transmission operation. Subsequent data is transmitted with the contents defined by the changed parameters.

In step S112, the transmission unit 22 performs Standby Sequence with the reception unit 31. As described above, in Standby Sequence, the transmission unit 22 repeatedly transmits Standby Code to the reception unit 31.

When Standby Sequence is completed, each lane between the transmission unit 22 and the reception unit 31 becomes Low (Low impedance), and data transmission is stopped.

In step S114, the transmission unit 22 performs Training Sequence with the reception unit 31. Training Sequence is processing executed to reproduce a clock by performing CDR by the reception unit 31, establish synchronization, and correct Data Skew between the lanes.

Figure 35:
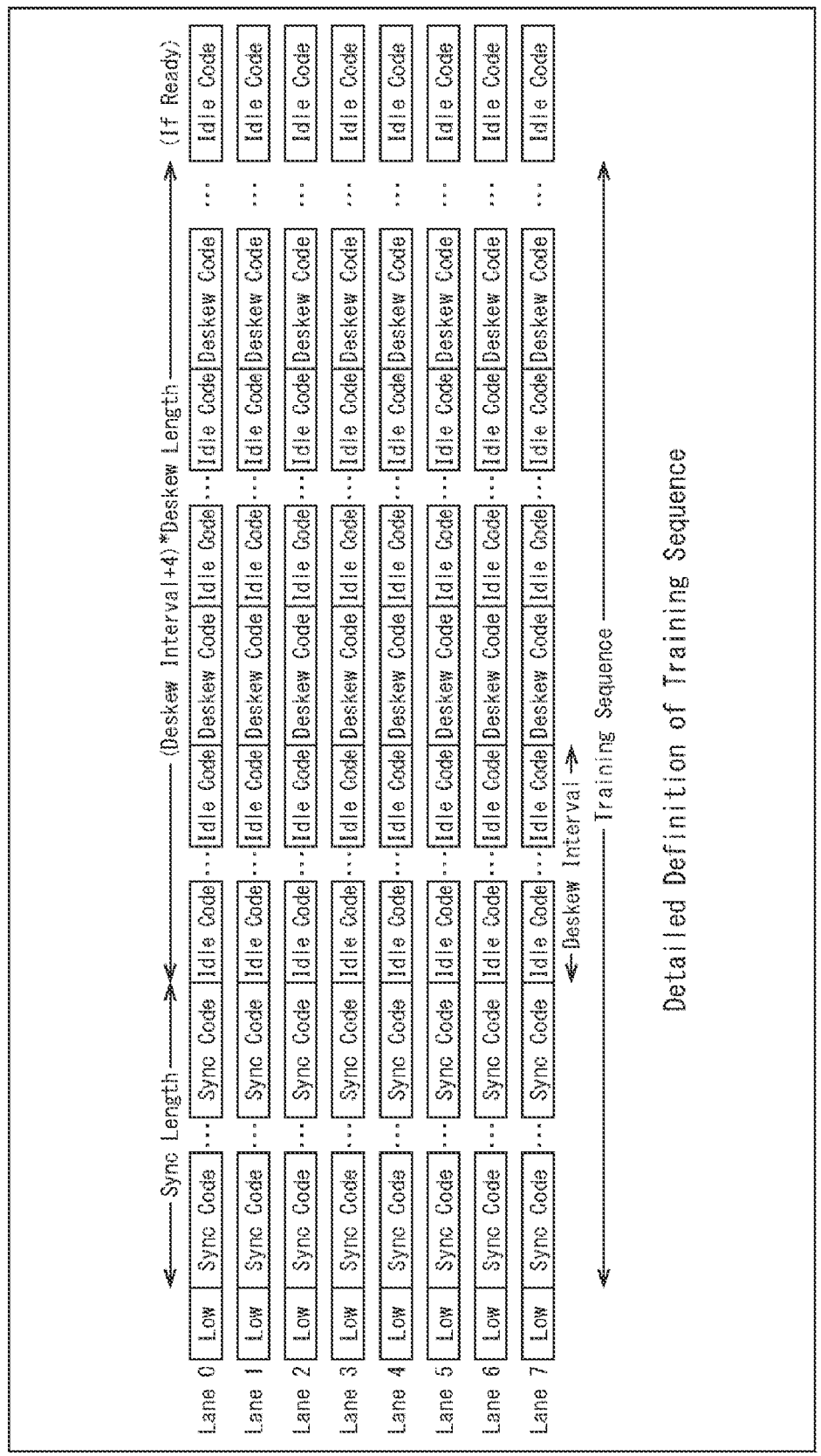
FIG. 35 is a diagram illustrating an example of a control code used in Training Sequence.

FIG. 35 is a diagram illustrating an example of a control code used in Training Sequence.

In FIG. 35, the vertical direction indicates a lane, and the horizontal direction indicates a time direction. In Training Sequence, Sync Code is repeatedly transmitted, and thereafter, a pair of repetition of Idle Code and one Deskew Code is repeatedly transmitted. The reception unit 31 reproduces the clock by using Sync Code and establishes the synchronization, and corrects Data Skew between the lanes by using Deskew Code as described with reference to FIG. 25.

After Training Sequence, the transmission unit 22 transmits Idle Code in step S115 in FIG. 33.

In step S122, the reception unit 31 receives Idle Code transmitted from the transmission unit 22. By performing such Training Sequence, the reception unit 31 can receive data transmitted from the transmission unit 22 according to the changed parameters.

Transmission in each line in the third frame is performed by the transmission unit 22 with contents defined by the changed parameters. An outline arrow #12 indicates that data in the third frame is exchanged between the transmission unit 22 and the reception unit 31 by using the changed parameters.

Mode Change as described above is performed at the time when the parameter is changed.

FIG. 36 is a diagram illustrating an example of a parameter set to a register.

Lane Num is information representing the number of lanes used for data stream transmission. For example, any one of values 1, 2, 4, 6, and 8 is set as Lane Num.

Pixel Bit is information representing the bit length of each pixel included in image data. For example, any one of values 8, 10, 12, 14, and 16 is set as Pixel Bit.

Line Length is information representing the number of pixels in one line. A predetermined value equal to or more than four is set as Line Length.

ECC Option is information representing a type of an error correction code used to correct an error in payload data forming a packet. Any one of values 0, 1, and 2 is set as ECC Option.

CRC Option is information that is included in a footer forming the packet and represents a type of the error detection code used to detect the error in the payload data. Either one of On/Off is set as CRC Option. A state in which CRC Option is set to ON indicates that the error detection code is included, and a state in which CRC Option is set to Off indicates that the error detection code is not included.

Baud Grade is information representing a type of a transmission rate of each lane. Either one of Grade1/Grade2 is set as Baud Grade.

The same value is set as the value of each parameter described above in the image sensor 11 and the DSP 12. The parameter set to the register 53 of the image sensor 11 is read by the transmission unit 22 in response to the output of Config from the imaging unit 21 and is reflected in the transmission operation. On the other hand, the parameter set to the register 142 of the DSP 12 is read by the reception unit 31 in response to the output of Config from the image processing unit 32 and is reflected in the reception operation.

Note that the type of parameter is not limited to those illustrated in FIG. 36, and other parameter may be used.

Mode Change with Standby

In Mode Change, Mode Change with Standby is defined in addition to Mode Change in FIG. 33. In Mode Change in FIG. 33, each lane becomes Low when the data transmission is stopped. Whereas, in Mode Change with Standby, each lane becomes H-Z (High impedance) when the data transmission is stopped.

Figure 37:
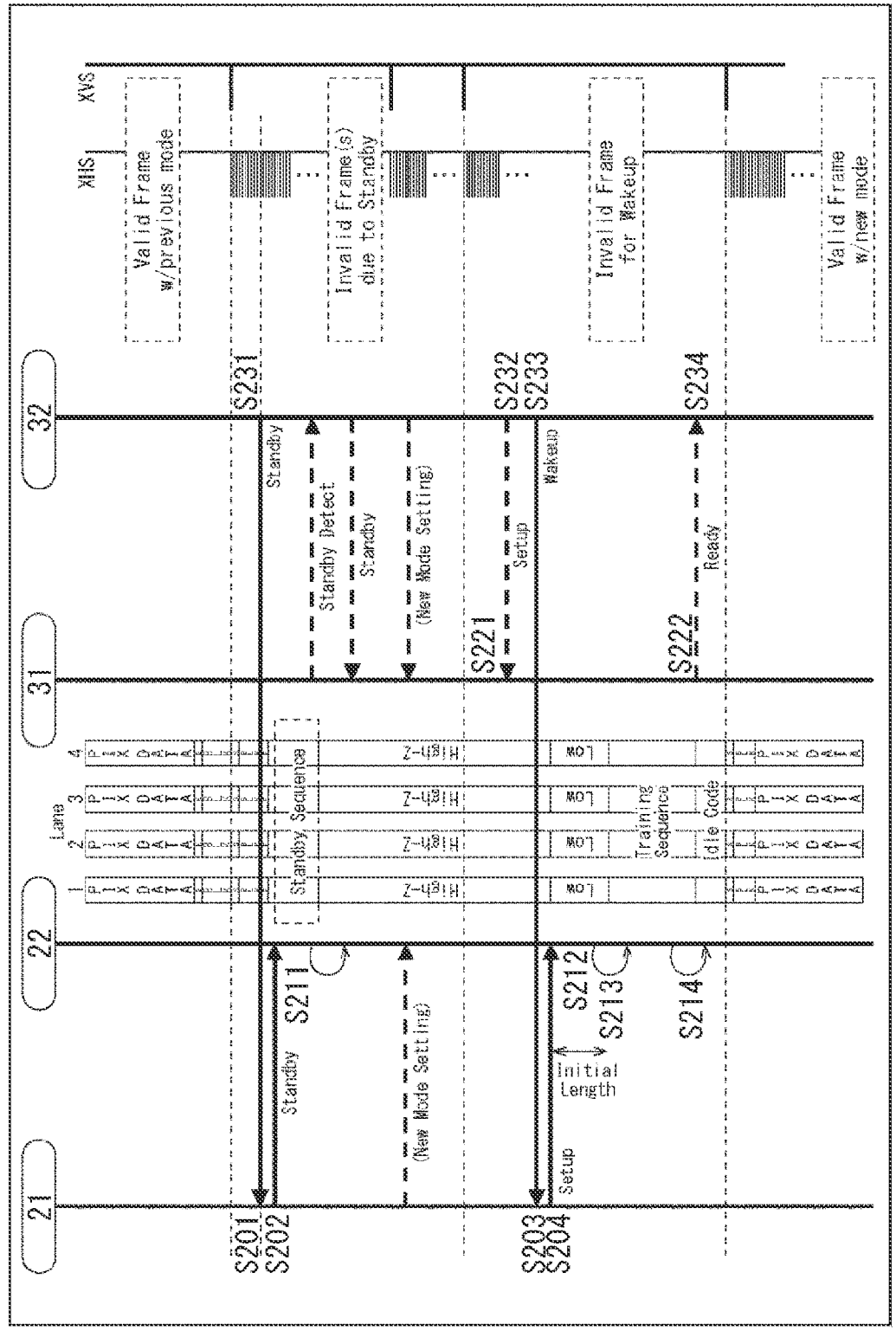
FIG. 37 is a diagram illustrating an example of a sequence of Mode Change with Standby.

FIG. 37 is a diagram illustrating an example of a sequence of Mode Change with Standby. Main operations of the image sensor 11 and the DSP 12 will be described.

As illustrated on the right side in FIG. 37, in step S231 after transmission of image data in a predetermined frame is completed, the image processing unit 32 of the DSP 12 transmits Standby to the imaging unit 21 of the image sensor 11.

The imaging unit 21 of the image sensor 11 that has received Standby in step S201 outputs Standby to the transmission unit 22 in step S202.

In step S211, the reception unit 31 receives Standby output from the image processing unit 32 and performs Standby Sequence with the reception unit 31.

When Standby Sequence is terminated, the states of the transmission unit 22 and the reception unit 31 are the state of Standby mode. Each lane between the transmission unit 22 and the reception unit 31 becomes High-Z, and the data transmission is stopped.

For example, while the state is in Standby mode, communication is performed between the imaging unit 21 of the image sensor 11 and the image processing unit 32 of the DSP 12 via a predetermined interface, and a parameter is changed. In the imaging unit 21, the changed parameter is set to the register 53, and in the image processing unit 32, the changed parameter is set to the register 142.

In step S232, the image processing unit 32 outputs Setup to the reception unit 31.

In step S221, the reception unit 31 receives Setup output from the image processing unit 32 and activates from Standby mode. The reception unit 31 appropriately reads the parameter set to the register 142 and reflects the parameter in the reception operation.

In step S233, the image processing unit 32 of the DSP 12 transmits Wakeup to the imaging unit 21 of the image sensor 11.

The imaging unit 21 of the image sensor 11 that has received Wakeup in step S203 outputs Setup to the transmission unit 22 in step S204.

In step S212, the transmission unit 22 receives Setup output from the imaging unit 21 and activates from Standby mode. The transmission unit 22 appropriately reads the parameter set to the register 53 and reflects the parameter in the transmission operation. Each lane between the transmission unit 22 and the reception unit 31 is Low.

In step S213, the transmission unit 22 performs Training Sequence with the reception unit 31. The reception unit 31 reproduces the clock by using Sync Code and establishes the synchronization, and corrects Data Skew between the lanes by using Deskew Code.

After Training Sequence, the transmission unit 22 transmits Idle Code in step S214.

In step S222, the reception unit 31 that has completed Training Sequence transmits Ready to the image processing unit 32 and notifies that data reception preparation is completed.

In step S234, the image processing unit 32 receives Ready output from the reception unit 31. Thereafter, the image processing unit 32 acquires image data transmitted from the transmission unit 22 and received by the reception unit 31 and executes processing.

Mode Change with Standby is performed as described above. In a case where it is not necessary to distinguish Mode Change described with reference to FIG. 33 from Mode Change with Standby, both are simply referred to as Mode Change.

State Transition of Transmission Unit 22

Figure 38:
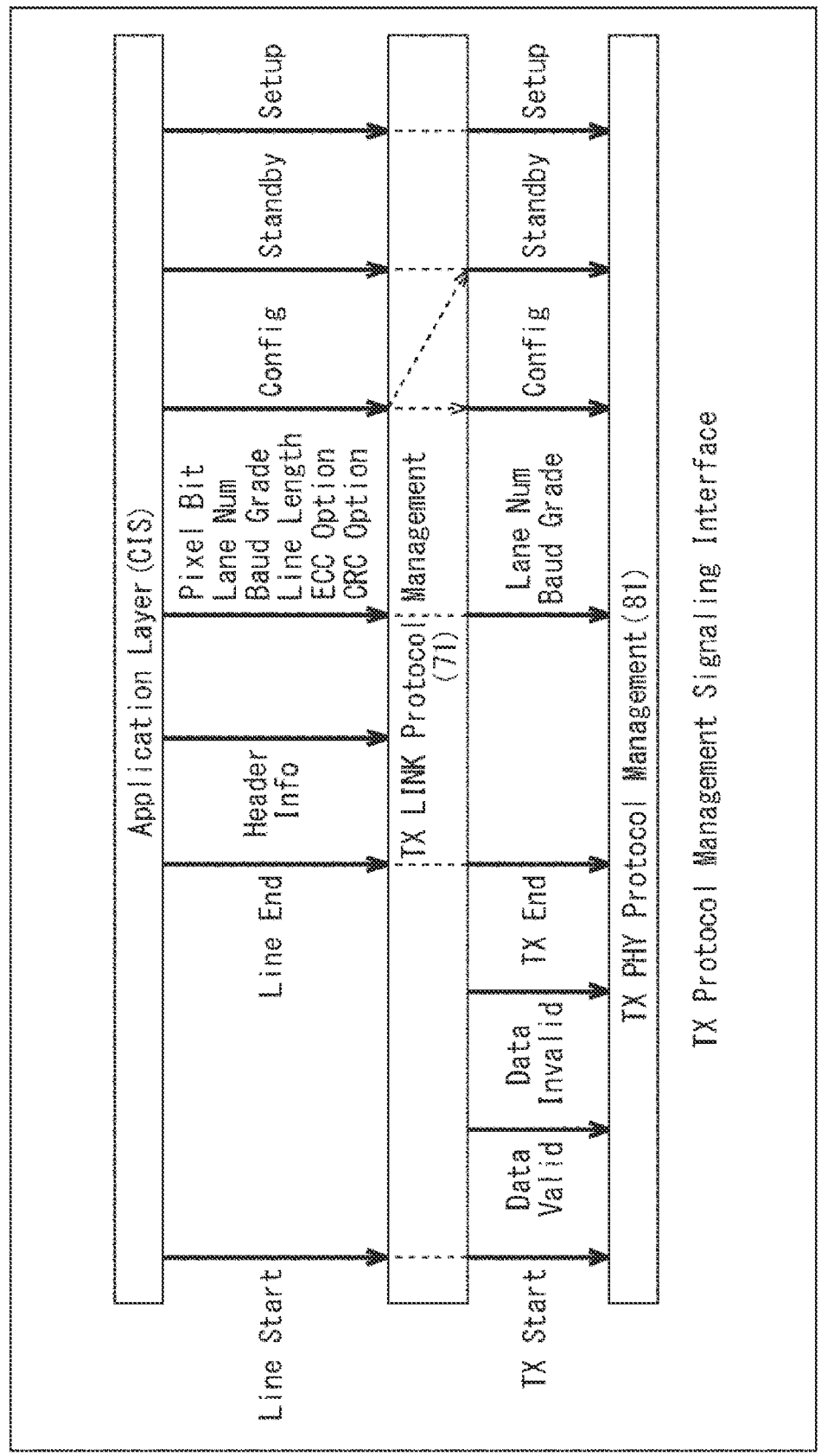
FIG. 38 is a diagram illustrating an example of a control signal used between layers of an image sensor.

FIG. 38 is a diagram illustrating an example of a control signal used between layers of the image sensor 11 that is the transmission side.

The application layer (imaging unit 21) outputs Line Start/Line End representing start and end of the line and Pixel Bit, Lane Num, Baud Grade, Line Length, ECC Option, and CRC Option representing parameters set to the register 53 to the link layer.

Furthermore, the application layer outputs Config, Standby, and Setup to the link layer. Config is a signal that requests to reflect the parameter set to the register 53 in the transmission operation. Standby is a signal that requests to start Standby Sequence. Setup is a signal that requests to activate from Standby mode.

Such control signals are output from the system control unit 51 of the application layer. The state control unit 71 of the LINK-TX protocol management unit 61 controls a state of each unit in the link layer in response to reception of the control signal output from the application layer.

The link layer outputs TX Start/TX End for requesting to start and end of transmission of the control code and Data Valid/Data Invalid representing whether or not the data output from the link layer is valid data to the physical layer.

Furthermore, the link layer outputs Lane Num and Baud Grade related to the processing in the physical layer from among six types of parameters set to the register 53 to the physical layer. The parameters other than Lane Num and Baud Grade are parameters related to the processing in the link layer.

Moreover, the link layer outputs Config, Standby, and Setup to the physical layer. Config is a signal that requests to set the state of each lane to Low after Standby mode. Standby is a signal that requests to start Standby Sequence. Setup is a signal that requests to start Training Sequence.

Such control signals are output from the state control unit 71 of the link layer. The PHY-TX state control unit 81 controls a state of each unit in the physical layer in response to reception of the control signal output from the link layer.

Figure 39:
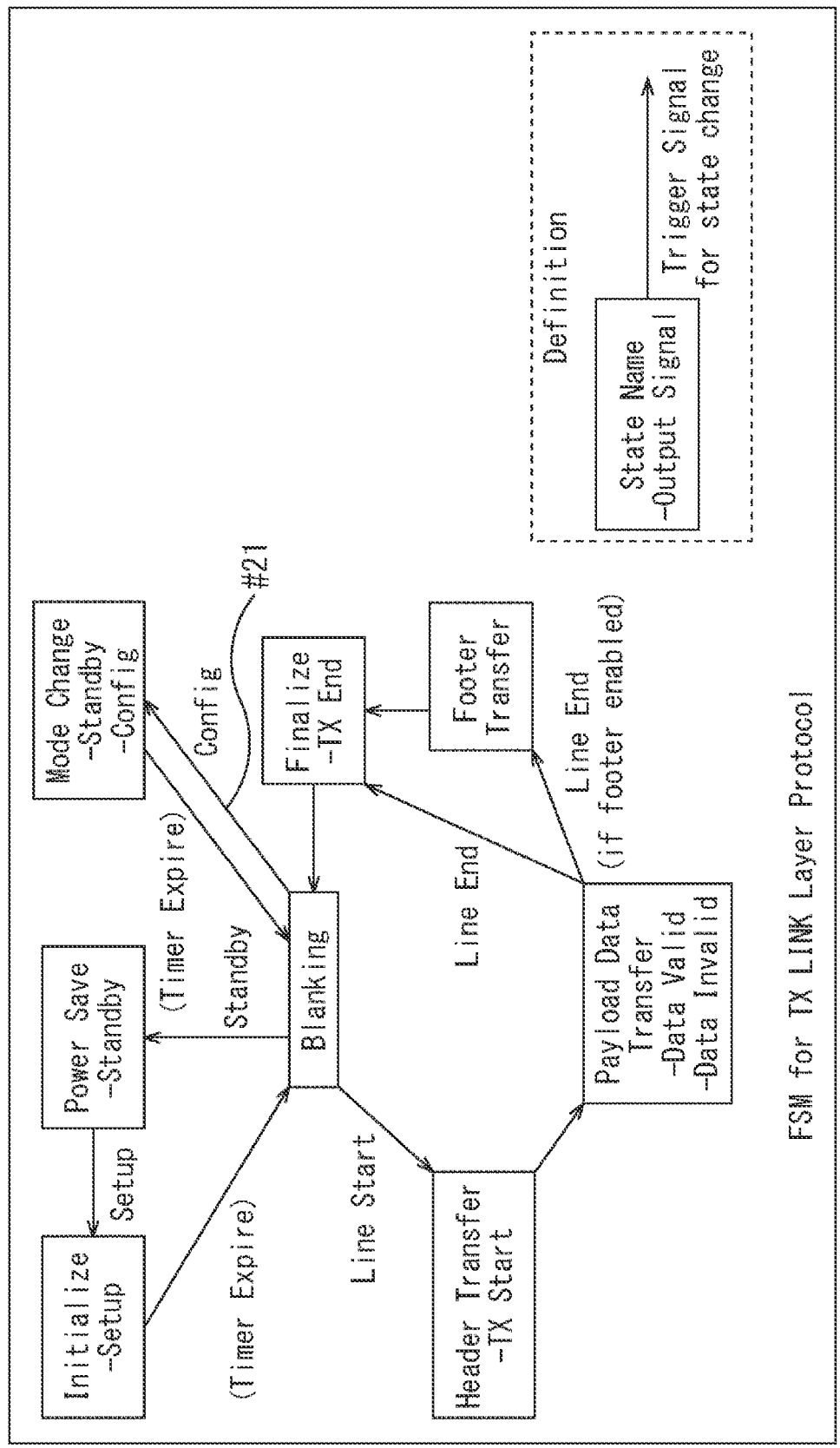
FIG. 39 is a diagram illustrating an example of a state transition of a link layer of the transmission unit.

FIG. 39 is a diagram illustrating an example of a state transition of the link layer of the transmission unit 22. A main transition will be described.

In FIG. 39, each block represents the state of the link layer. An arrow directed from a certain state to another arrow represents a state transition generated when a control signal near each arrow is output from the application layer. The same applies to FIGS. 40, 42, 43, and the like as described later.

For example, in a case where Config is output from the application layer in a state of Blanking illustrated at the center, the state control unit 71 makes the state of the link layer transition to the state of Mode Change as indicated by a portion pointed by an arrow #21. At this time, for example, Mode Change described with reference to FIG. 33 is performed.

In a case of the state of Mode Change, the state control unit 71 outputs Standby or Config to the physical layer. A control signal illustrated in each block indicates the signal output to the physical layer in that state.

The state control unit 71 controls the state of the link layer according to a transition diagram as illustrated in FIG. 39.

Figure 40:
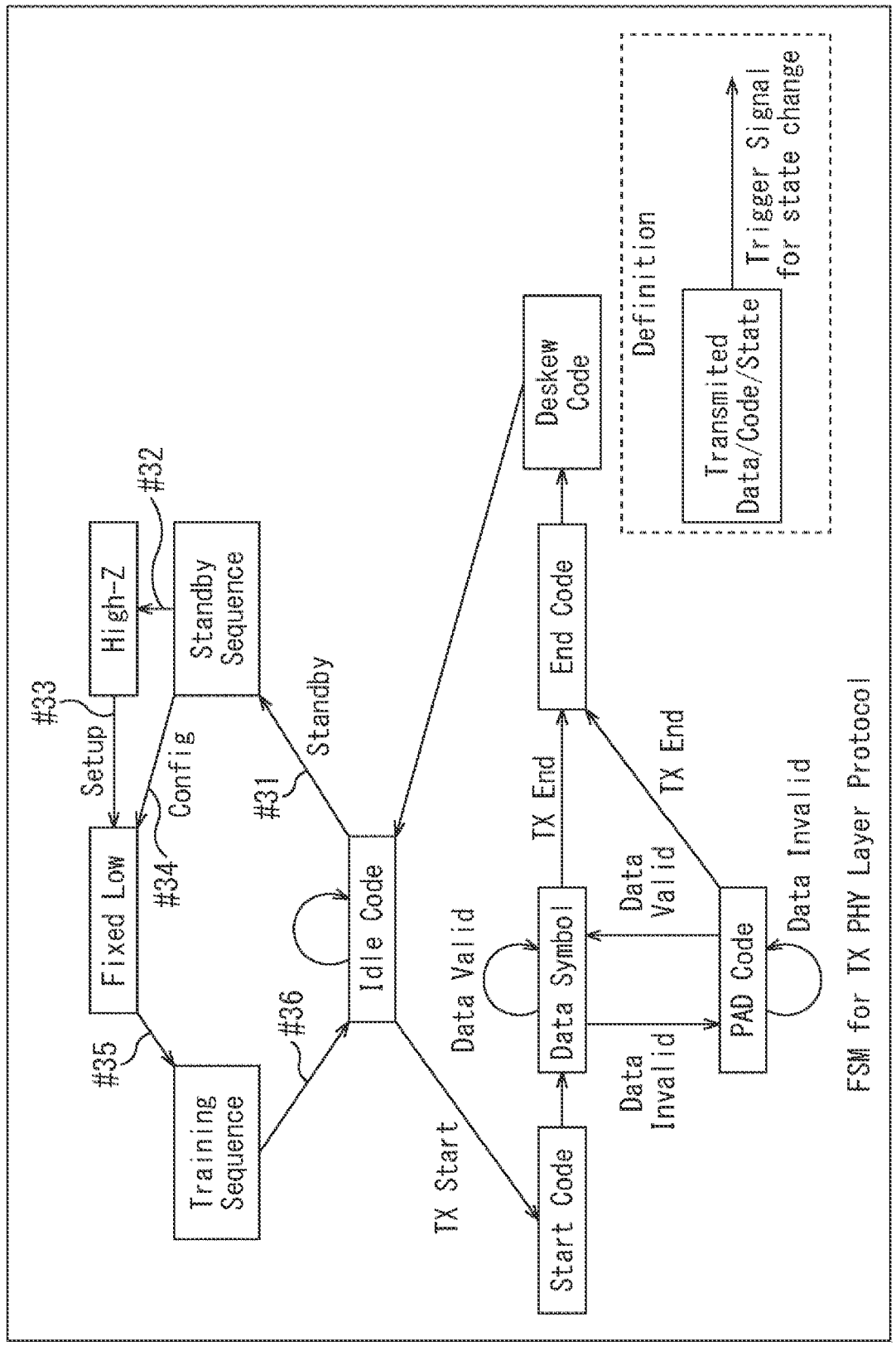
FIG. 40 is a diagram illustrating an example of a state transition of a physical layer of the transmission unit.

FIG. 40 is a diagram illustrating an example of a state transition of the physical layer of the transmission unit 22. A main transition will be described.

For example, in a case where the link layer outputs Standby in a state where Idle Code is transmitted illustrated at the center, the PHY-TX state control unit 81 makes the state of the physical layer transition to the state of Standby Sequence as indicated by a portion pointed by an arrow #31.

In a case where Standby Sequence is completed, the PHY-TX state control unit 81 sets each lane to High-Z as indicated by a portion pointed by an arrow #32. In a case where the link layer outputs Setup when each lane is set to High-Z, the PHY-TX state control unit 81 sets each lane to Low as indicated by a portion pointed by an arrow #33. Similarly, in a case where Config is output in Standby Sequence, the PHY-TX state control unit 81 sets each lane to Low as indicated by a portion pointed by an arrow #34.

After setting each lane to Low, the PHY-TX state control unit 81 sets the state of the physical layer to Training Sequence as indicated by a portion pointed by an arrow 35, and in a case where Training Sequence is completed, Idle Code is transmitted as indicated by a portion pointed by an arrow #36.

The PHY-TX state control unit 81 controls the state of the physical layer according to the transition diagram as illustrated in FIG. 40.

State Transition of Reception Unit 31

Figure 41:
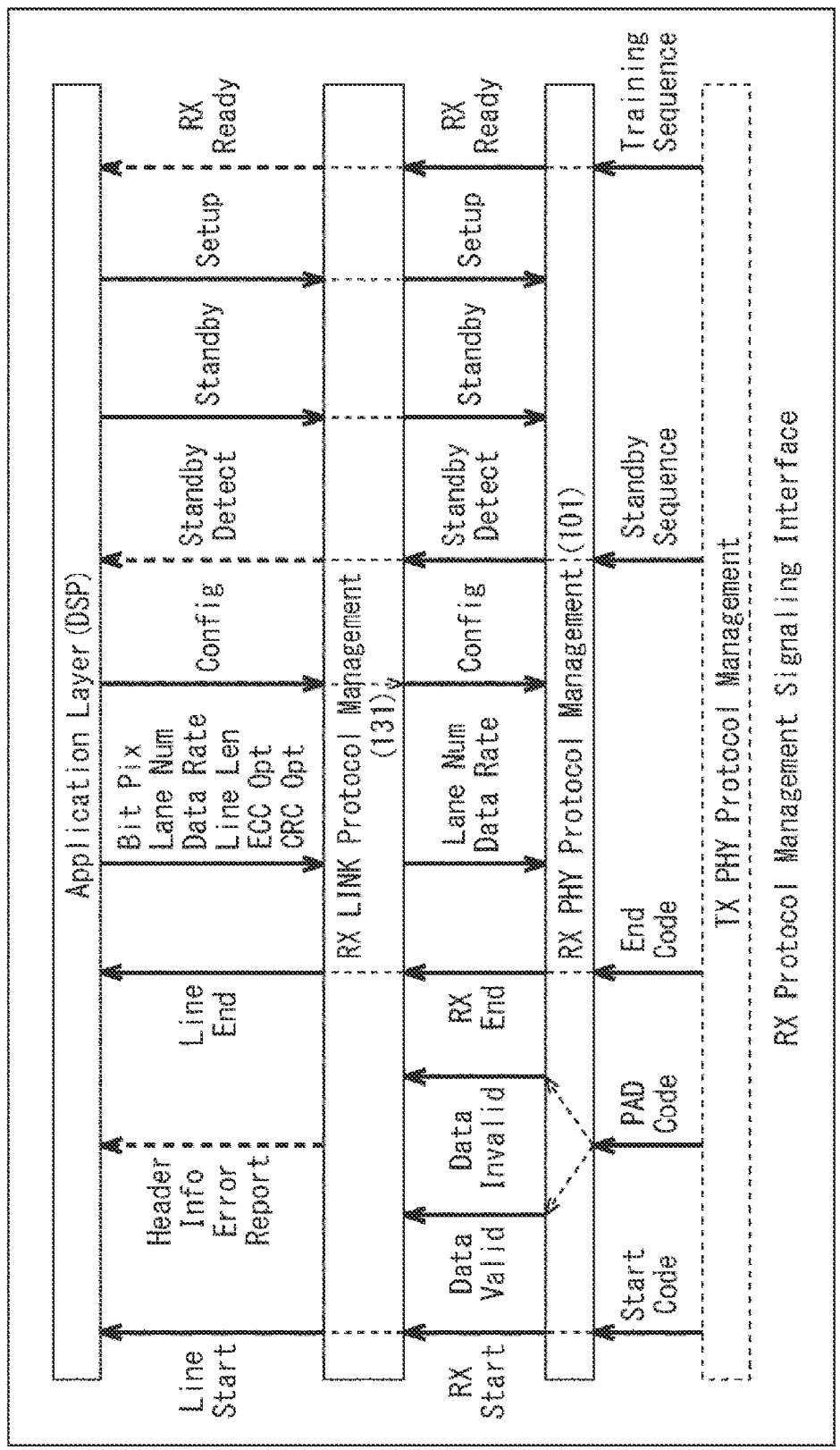
FIG. 41 is a diagram illustrating an example of a control signal used between layers of a DSP.

FIG. 41 is a diagram illustrating an example of a control signal used between the layers of the DSP 12 that is the reception side.

In a case where the Start Code/End Code is supplied from the transmission unit 22, RX Start/RX End that requests to start/end the reception is output from the physical layer to the link layer. At this time, the link layer outputs Line Start/Line End to the application layer (image processing unit 32).

Furthermore, in a case where Pad Code is supplied from the transmission unit 22, the physical layer outputs Data Valid/Data Invalid indicating whether or not the data output from the physical layer is valid data to the link layer. At this time, the link layer outputs Header Info representing a header analysis result and the like to the application layer.

In a case where Standby Sequence is started, the physical layer outputs Standby Detect to the link layer. At this time, the link layer outputs Standby Detect to the application layer.

In a case where Training Sequence is started, the physical layer outputs RX Ready to the link layer. At this time, the link layer outputs RX Ready to the application layer.

The application layer outputs Pixel Bit, Lane Num, Baud Grade (Data Rate), Line Length, ECC Option, and CRC Option representing the parameters set to the register 142 to the link layer. Since ECC Option and CRC Option are optional, it is possible not to output ECC Option and CRC Option. The link layer outputs Lane Num and Baud Grade related to the processing in the physical layer from among six types of parameters set to the register 142 to the physical layer.

Furthermore, the application layer outputs Config, Standby, and Setup to the link layer. Config is a signal that requests to reflect the parameter set to the register 142 in the reception operation. Standby is a signal that requests to start Standby Sequence. Setup is a signal that requests to activate from Standby mode. Config, Standby, and Setup are output from the link layer to the physical layer.

The PHY-RX state control unit 101 controls the state of each unit in the physical layer in response to the reception of the control code transmitted from the transmission unit 22 or the reception of the control signal output from the link layer.

Furthermore, the state control unit 131 of the LINK-RX protocol management unit 121 controls the state of each unit of the link layer in response to the reception of the control signal output from the link layer or the reception of the control signal output from the application layer.

Figure 42:
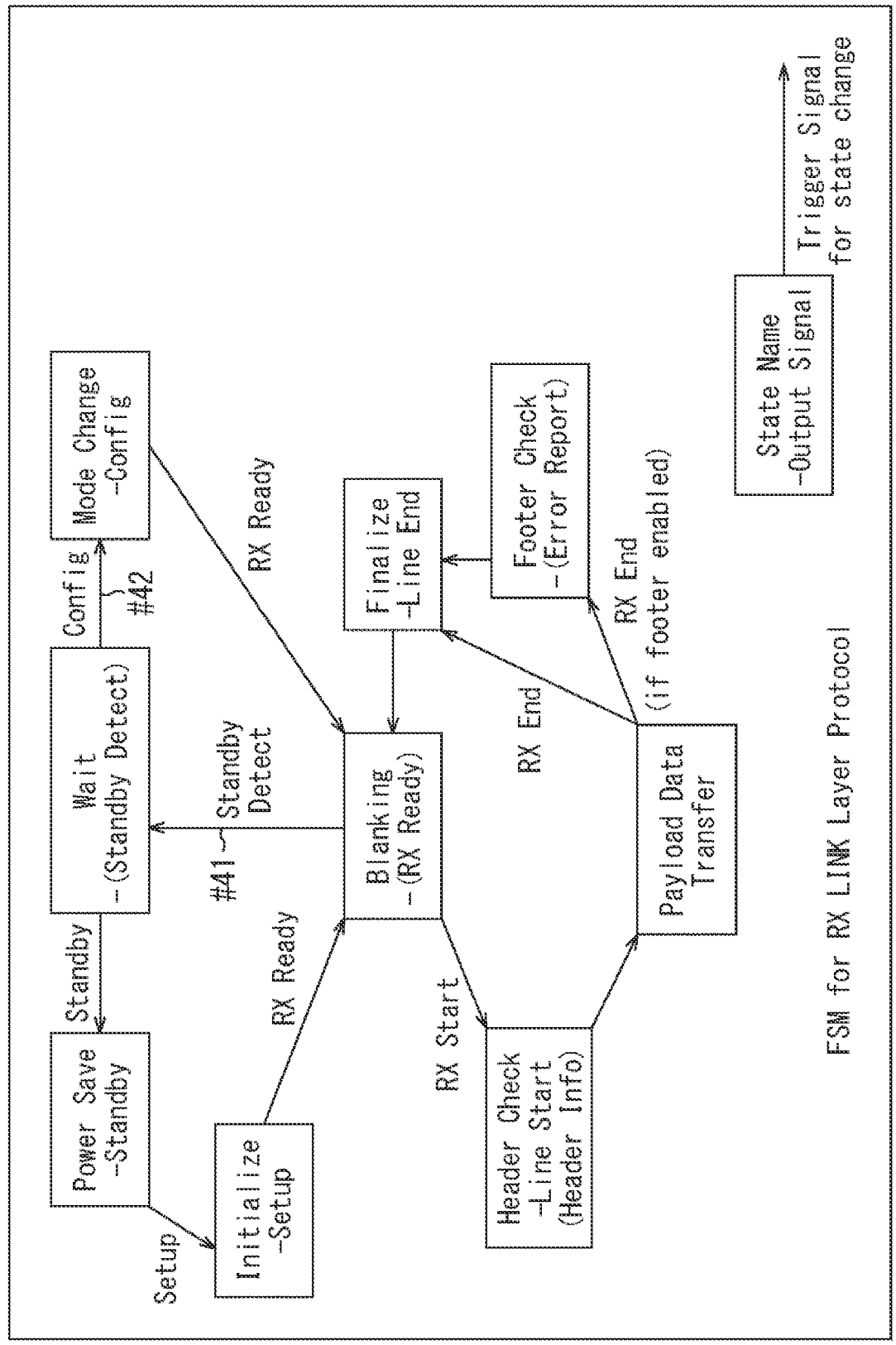
FIG. 42 is a diagram illustrating an example of a state transition of a link layer of the reception unit.

FIG. 42 is a diagram illustrating an example of a state transition of the link layer of the reception unit 31. A main transition will be described.

For example, in a case where the physical layer outputs Standby Detect in a state of Blanking illustrated at the center, the state control unit 131 makes the state of the link layer transition to a state of Wait as indicated by a portion pointed by an arrow #41.

In a case where Config is output from the application layer in the state of Wait, the state control unit 131 makes the state of the link layer transition to the state of Mode Change as indicated by a portion pointed by an arrow 42.

The state control unit 131 controls the state of the link layer according to a transition diagram as illustrated in FIG. 42.

Figure 43:
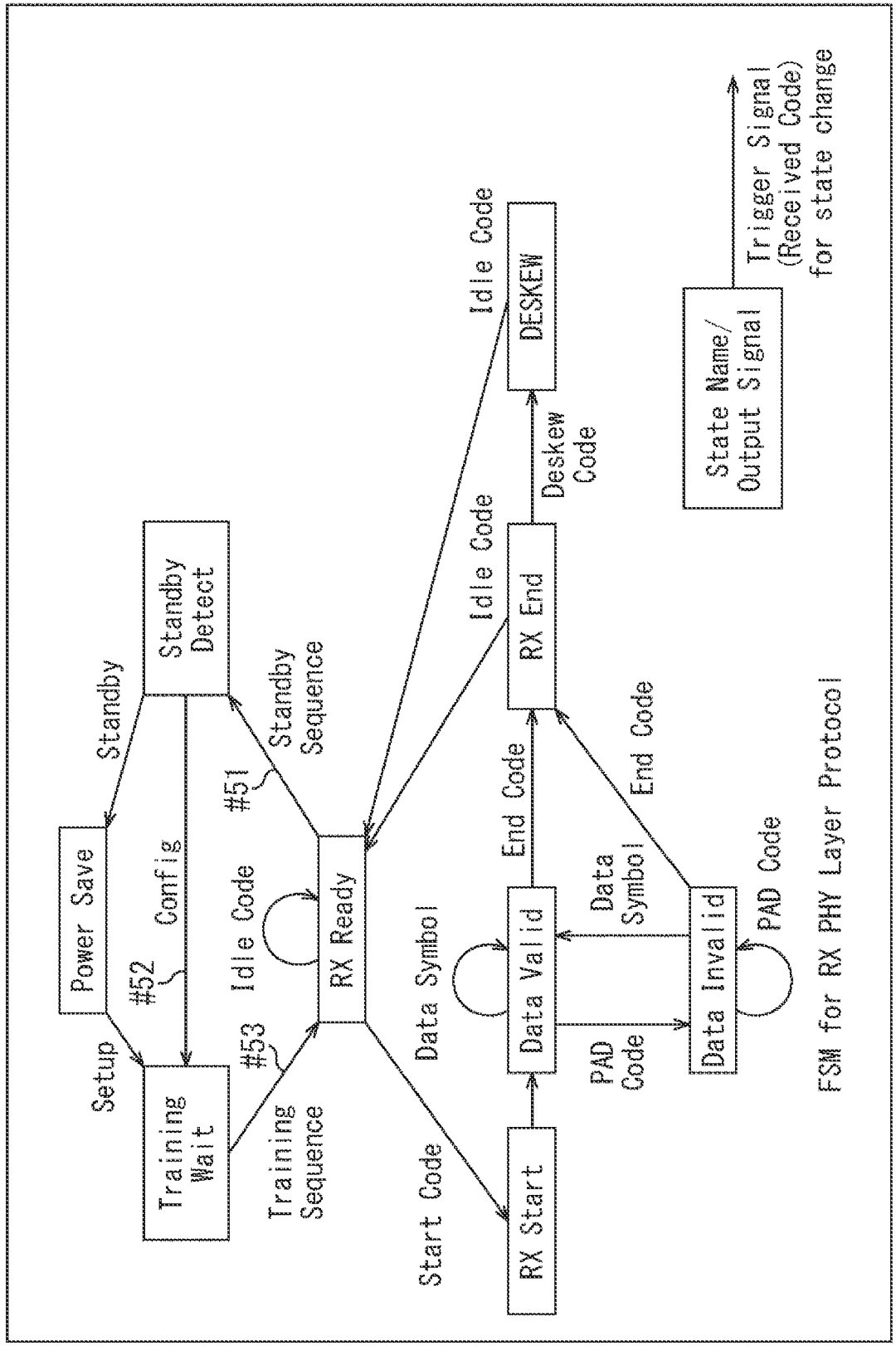
FIG. 43 is a diagram illustrating an example of a state transition of a physical layer of the reception unit.

FIG. 43 is a diagram illustrating an example of a state transition of the physical layer of the reception unit 31. A main transition will be described.

For example, in a case where Standby Sequence is started in a state where RX Ready is output illustrated at the center, the PHY-RX state control unit 101 makes the state of the physical layer transition to the state where Standby Detect is output as indicated by a portion pointed by an arrow #51.

In a case where the link layer outputs Config in a state where Standby Detect is output, the PHY-RX state control unit 101 makes the state of the physical layer transition to the state of Training Wait as indicated by a portion pointed by an arrow #52.

In a case where Training Sequence is started in a state of Training Wait, the PHY-RX state control unit 101 makes the state of the physical layer transition to the state where RX Ready is output as indicated by a portion pointed by an arrow #53.

The PHY-RX state control unit 101 controls the state of the physical layer according to the transition diagram as illustrated in FIG. 43.

[(2) Mode Change in which Training Sequence is Omitted]

As described above, the data transmission mode is defined by the six types of parameters. When the parameter is changed, Training Sequence is performed in Mode Change, and the data transmission is stopped once.

By the way, the parameters other than Lane Num and Baud Grade of the six types of parameters are parameters that do not need to establish synchronization and correct Data Skew between the lanes again even when the parameter is changed, in other words, parameters that do not need Training Sequence.

Lane Num and Baud Grade are parameters related to the processing of the physical layer, and in a case where the above parameters are changed, the synchronization is lost and the amount of Data Skew between the lanes is changed. Therefore, Training Sequence is required. On the other hand, the parameter other than Lane Num and Baud Grade is a parameter related to the processing in the link layer, and amounts of synchronization shift and Data Skew between the lanes are not changed before and after the change.

As a method of Mode Change, Mode Change in which Training Sequence is omitted is defined, in addition to Mode Change with Training Sequence described above. Mode Change with Training Sequence and Mode Change in which Training Sequence is omitted are switched according to the type of the parameter to be changed.

Figure 44:
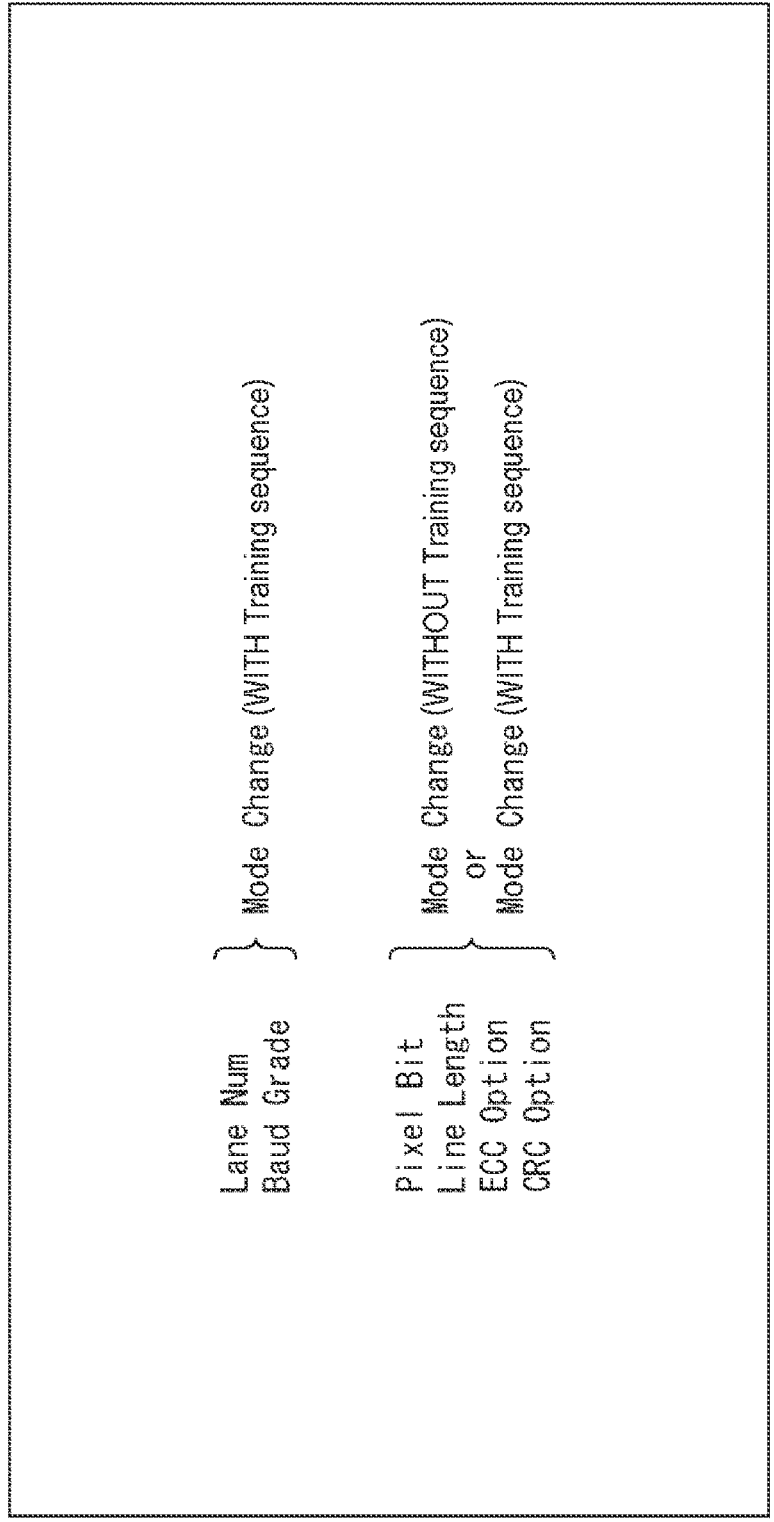
FIG. 44 is a diagram illustrating an example of Mode Change.

FIG. 44 is a diagram illustrating an example of Mode Change.

As illustrated in an upper portion of FIG. 44, in a case where a parameter to be changed is Lane Num or Baud Grade, Mode Change with Training Sequence is performed.

On the other hand, as illustrated in a lower portion of FIG. 44, in a case where the parameter to be changed is a parameter other than Lane Num and Baud Grade, Mode Change in which Training Sequence is omitted or Mode Change with Training Sequence is performed.

In this way, by appropriately omitting Training Sequence according to the type of the parameter to be changed, Mode Change can be simplified.

Furthermore, in a case where the synchronization is established and Data Skew is corrected again although it is not necessary to perform the establishment and the correction, unnecessary power consumption occurs in the reception side. However, by appropriately omitting Training Sequence, the power consumption can be reduced.

Hereinafter, Mode Change in which Training Sequence is omitted is referred to as simplified Mode Change as appropriate.

Figure 45:
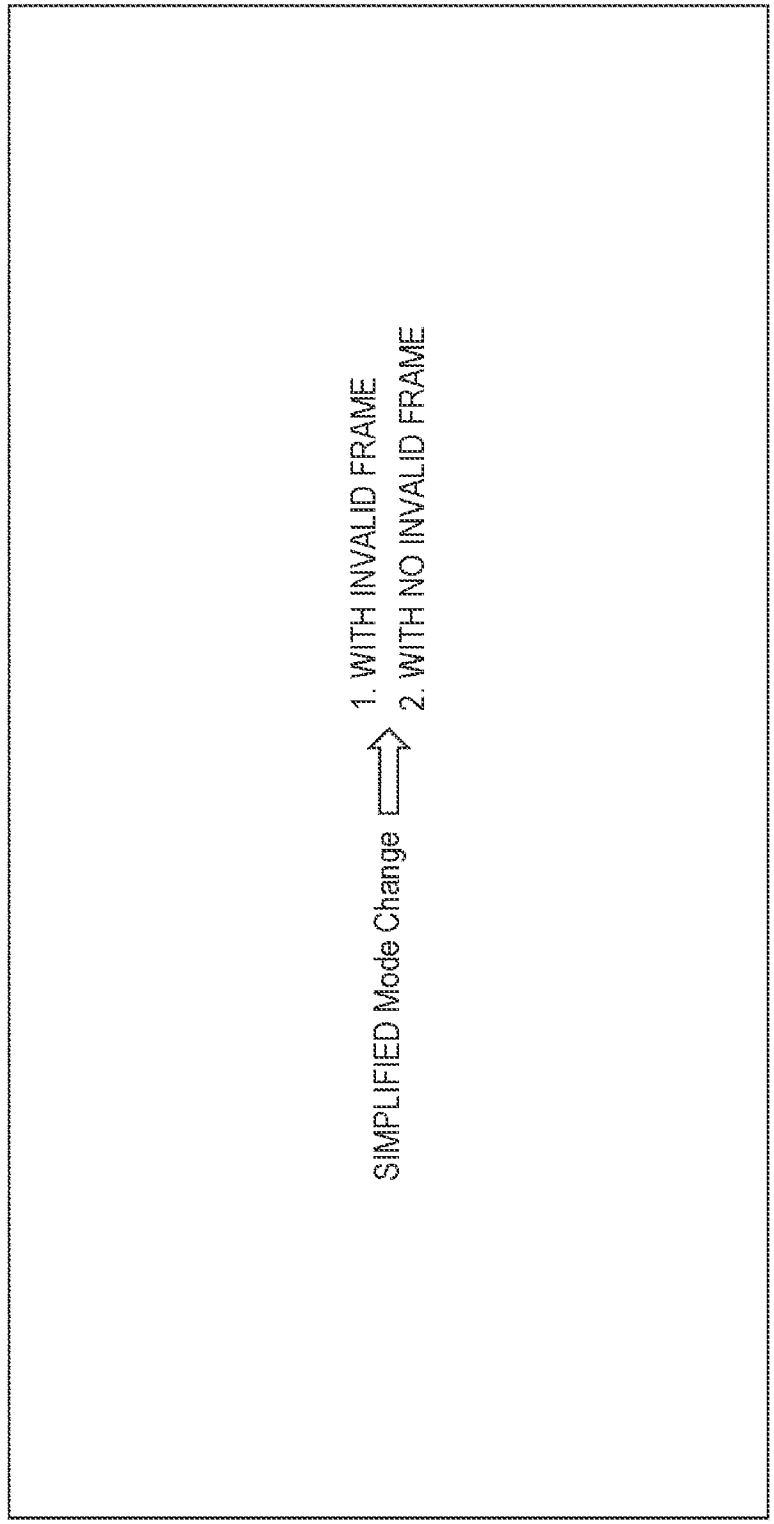
FIG. 45 is a diagram illustrating an example of simplified Mode Change.

As illustrated in FIG. 45, as the simplified Mode Change, two types of simplified Mode Change, i.e., simplified Mode Change in which an invalid frame is transmitted and simplified Mode Change in which no invalid frame is transmitted are defined.

Sequence of Simplified Mode Change in which Invalid Frame is Transmitted

Figure 46:
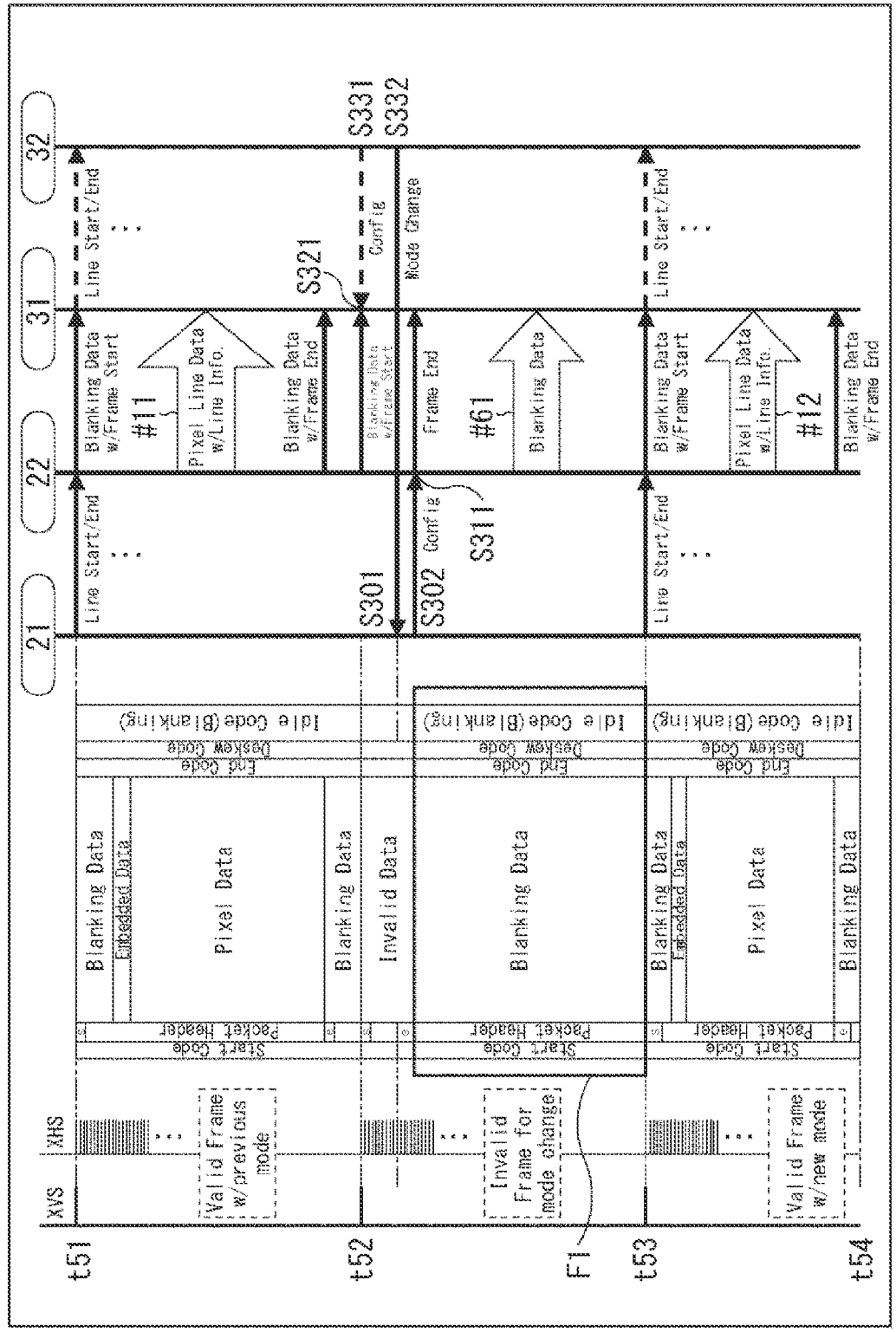
FIG. 46 is a diagram illustrating an example of a sequence of simplified Mode Change in which an invalid frame is transmitted.

FIG. 46 is a diagram illustrating an example of a sequence of the simplified Mode Change in which an invalid frame is transmitted. The description overlapping with the description in FIG. 33 will be omitted as appropriate.

As illustrated at the right end of FIG. 46, in step S331 when transmission of the final line of the first frame is completed, the image processing unit 32 of the DSP 12 outputs Config to the reception unit 31.

Before the output of Config, communication is performed between the imaging unit 21 of the image sensor 11 and the image processing unit 32 of the DSP 12 via a predetermined interface, and the parameter is changed. It is assumed that the parameters other than Lane Num and Baud Grade such as Pixel Bit and the like be changed. In the imaging unit 21, the changed parameter is set to the register 53, and in the image processing unit 32, the changed parameter is set to the register 142.

In step S321, the reception unit 31 receives Config output from the image processing unit 32 and reads the changed parameter set to the register 142 and reflects the parameter in the reception operation. Subsequent data is received with contents defined by the changed parameters.

In step S332, the image processing unit 32 issues Mode Change to the imaging unit 21 of the image sensor 11.

The imaging unit 21 of the image sensor 11 that has received the issued Mode Change in step S301 outputs Config to the transmission unit 22 in step S302.

In step S311, the transmission unit 22 receives Config output from the imaging unit 21 and reads the changed parameter set to the register 53 and reflects the parameter in a data transmission operation. Subsequent data is transmitted with the contents defined by the changed parameters.

After the change in the parameter is reflected in both of the transmission unit 22 and the reception unit 31, transmission of Blanking Data is started as indicated by an outline arrow #61. The transmission of Blanking Data is continued before the time t53 that is a timing when the transmission of the second frame including time required for Training Sequence is completed.

In other words, Training Sequence and the like are omitted, and data transmission is continued even though the data is invalid.

Blanking Data transmitted here is data forming an invalid frame as indicated by surrounding the data by a left frame F1.

Blanking Data is transmitted by using one packet for each line. Each packet is configured by adding a header before a payload that stores Blanking Data. Start Code is added before each packet, and End Code is added at the end. Deskew Code and Idle Code are added after End Code.

At the time t53 when transmission of an invalid frame is completed, transmission of the third frame is started. Transmission in each line in the third frame is performed by the transmission unit 22 with contents defined by the changed parameters. Furthermore, each line of the third frame received by the reception unit 31 with contents defined by the changed parameters.

In this way, at the time when the simplified Mode Change is performed, the transmission unit 22 immediately reflects the change in the parameter in the transmission operation and transmits an invalid frame without temporarily stopping the data transmission.

Figure 47:
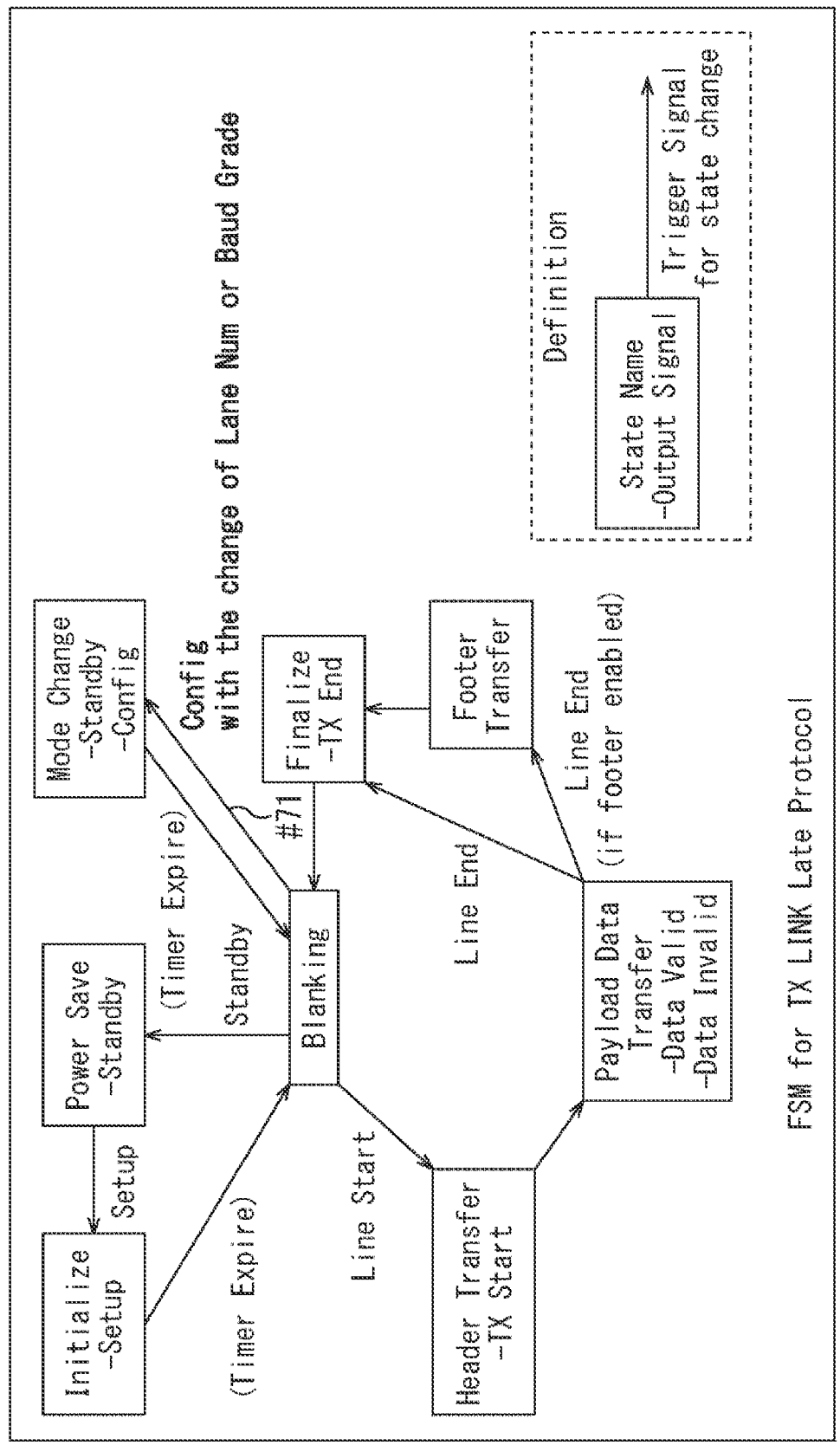
FIG. 47 is a diagram illustrating an example of the state transition of the link layer of the transmission unit in a case where the simplified Mode Change is used.

FIG. 47 is a diagram illustrating an example of the state transition of the link layer of the transmission unit 22 in a case where the simplified Mode Change is used.

As illustrated in FIG. 47, the state of Blanking illustrated at the center is transitioned to the state of Mode Change in a case where Config is output from the application layer and the changed parameter is Lane Num or Baud Grade. The state control unit 71 controls the state of the link layer according to a transition diagram as illustrated in FIG. 47.

Figure 48:
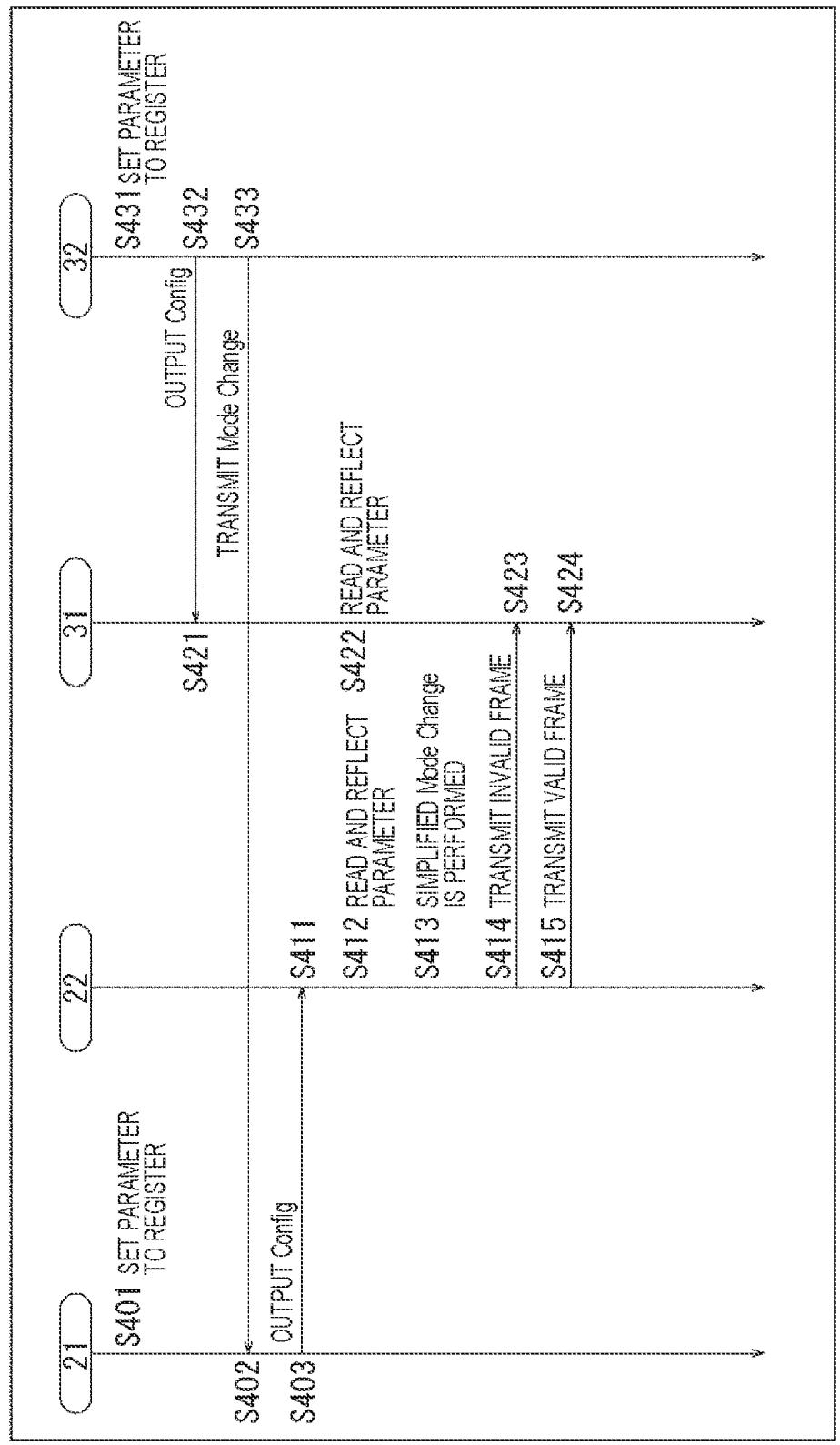
FIG. 48 is a sequence diagram for explaining processing of each unit at the time of the simplified Mode Change.

Here, processing of each unit at the time of the simplified Mode Change will be described in detail with reference to the sequence diagram in FIG. 48. The processing illustrated in FIG. 48 is basically similar to the processing described with reference to FIG. 46.

After the parameter is changed between the imaging unit 21 and the image processing unit 32, the imaging unit 21 sets the changed parameter to the register 53 in step S401.

On the other hand, the image processing unit 32 sets the changed parameter to the register 142 in step S431.

In step S432, the image processing unit 32 outputs Config to the reception unit 31.

In step S421, the reception unit 31 receives Config output from the image processing unit 32.

In step S422, the reception unit 31 reads the parameter from the register 142 and reflects the parameter in the data reception operation. The state control unit 131 controls each unit of the link layer and makes each unit execute processing according to a newly set parameter.

In step S433 in which transmission of a final line of a valid frame that is a frame including pixel data is completed, the image processing unit 32 issues Mode Change to the imaging unit 21 in step S433.

In step S402, the imaging unit 21 receives the issuance of Mode Change.

In step S403, the imaging unit 21 outputs Config to the transmission unit 22.

In step S411, the transmission unit 22 receives Config output from the imaging unit 21.

In step S412, the transmission unit 22 reads the parameter from the register 53 and reflects the parameter in the data transmission operation. The state control unit 71 controls each unit of the link layer and makes each unit execute processing according to a newly set parameter.

In a case where the changed parameter is any one of Pixel Bit, Line Length, ECC Option, and CRC Option, the state control unit 71 changes the state of the link layer to the state where the simplified Mode Change is performed in step S413.

In step S414, the transmission unit 22 transmits an invalid frame including Blanking Data. The invalid frame is transmitted according to a parameter that is newly set.

In a case where the transmission of the invalid frame is completed, the transmission unit 22 transmits a valid frame including pixel data in step S415.

On the other hand, in step S423, the reception unit 31 receives the invalid frame transmitted from the transmission unit 22. The invalid frame is received according to the parameter that is newly set.

In a case where the reception of the invalid frame is completed, in step S424, the reception unit 31 receives the valid frame transmitted from the transmission unit 22. Thereafter, the exchange of the valid frame is continued between the transmission unit 22 and the reception unit 31.

In this way, the simplified Mode Change is performed as omitting Training Sequence that is not required depending on the parameter to be changed.

With this operation, the sequence on the transmission side at the time of Mode Change can be simplified.

Furthermore, since resynchronization or the like by the CDR is not needed, the power consumption on the reception side can be reduced.

Note that the plurality of types of parameters may be changed at a time. In this case, when at least one of Lane Num or Baud Grade is changed, Mode Change with Training Sequence is performed. Furthermore, when at least one of Pixel Bit, Line Length, ECC Option, or CRC Option is changed, the simplified Mode Change is performed.

[(3) Simplified Mode Change in which No Invalid Frame is Transmitted]

Next, the simplified Mode Change in which no invalid frame is transmitted will be described.

Figure 49:
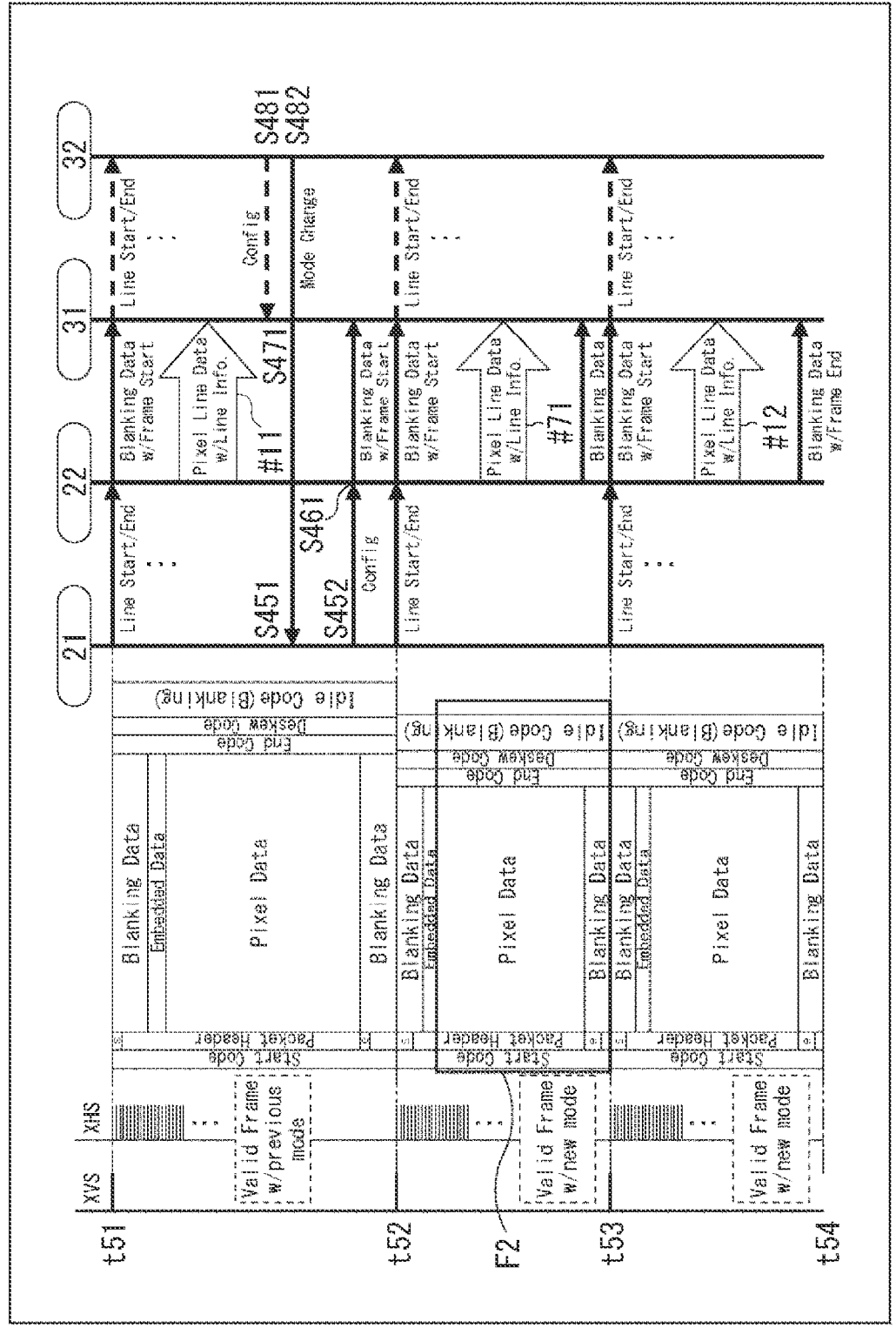
FIG. 49 is a diagram illustrating an example of a sequence of simplified Mode Change in which no invalid frame is transmitted.

(3-1) Sequence FIG. 49 is a diagram illustrating an example of a sequence of the simplified Mode Change in which no invalid frame is transmitted.

The sequence illustrated in FIG. 49 is different from the sequence described with reference to FIG. 46 in that a valid frame is transmitted as illustrated by being surrounding by a frame F2 without transmitting an invalid frame after the parameter is changed.

As illustrated at the right end of FIG. 49, in step S481, the image processing unit 32 of the DSP 12 outputs Config to the reception unit 31. Config is output to the reception unit 31, for example, while a predetermined line of the first frame is transmitted. Before the output of Config, communication is performed between the imaging unit 21 of the image sensor 11 and the image processing unit 32 of the DSP 12 via a predetermined interface, and the parameter is changed.

In step S471, the reception unit 31 receives Config output from the image processing unit 32 and reads the changed parameter set to the register 142 and reflects the parameter in the reception operation at a predetermined timing. The parameter reflection timing will be described later.

In step S482, the image processing unit 32 issues Mode Change to the imaging unit 21 of the image sensor 11. Mode Change is issued while the predetermined line of the first frame is transmitted.

The imaging unit 21 of the image sensor 11 that has received the issued Mode Change in step S451 outputs Config to the transmission unit 22 in step S452. Config is output to the transmission unit 22 while the predetermined line of the first frame is transmitted.

In step S461, the transmission unit 22 receives Config output from the imaging unit 21 and reads the changed parameter set to the register 53 and reflects the parameter to the data transmission operation at a predetermined timing.

After the time t52 after the change in the parameter is reflected in both of the transmission unit 22 and the reception unit 31, a second frame that is a valid frame is transmitted. An outline arrow #71 indicates that such data in the second frame is exchanged between the transmission unit 22 and the reception unit 31. Thereafter, the exchange of the valid frame is continued between the transmission unit 22 and the reception unit 31.

In this way, it is possible to perform the simplified Mode Change without transmitting an invalid frame.

Here, in order not to transmit the invalid frame, it is necessary to issue Mode Change and reflect the parameter according to Config before a start timing of a next frame (next frame of frame transmitted by using parameter before being changed). The reflection of the parameter according to Config includes the output of Config.

Predetermined restrictions are set for the issuance of Mode Change and the parameter reflection timing according to Config.

In a case where the parameter to be changed is any one of Pixel Bit, Line Length, ECC Option, and CRC Option, for example, following restrictions are set for the issuance of Mode Change and the parameter reflection timing according to Config.

Example 1

Transmission side: until output of TX Start (FIG. 38) representing the head of the next frame Reception side: until output of RX Start (FIG. 41) representing the head of the next frame In this case, in the transmission unit 22, it is necessary to issue Mode Change and reflect the parameter according to Config before the link layer (state control unit 71) outputs TX Start to the physical layer (PHY-TX state control unit 81). Furthermore, in the reception unit 31, it is necessary to issue Mode Change and reflect the parameter according to Config before the physical layer (PHY-RX state control unit 101) outputs RX Start to the link layer (state control unit 131).

Example 2

Transmission side: until output of TX End representing the end of the frame being transmitted Reception side: until output of RX End representing the end of the frame being transmitted In this case, in the transmission unit 22, it is necessary to issue Mode Change and reflect the parameter according to Config before the link layer outputs TX End to the physical layer. Furthermore, in the reception unit 31, it is necessary to issue Mode Change and reflect the parameter according to Config before the physical layer outputs RX End to the link layer.

As a timing that satisfies the restrictions in the examples 1 and 2, the issuance of Mode Change and the reflection of the parameter according to Config may be performed during a vertical blanking interval of the frame being transmitted. For example, a period of Blanking Data corresponding to the data in the rear dummy region A4 in the first frame in FIG. 49 corresponds to the vertical blanking interval.

With this operation, the parameter can be changed by the simplified Mode Change, in which no invalid frame is transmitted, in frame unit.

Furthermore, the issuance of Mode Change and the reflection of the parameter according to Config may be performed during a horizontal blanking interval of a line being transmitted. For example, a period of Idle Code added at the end of the predetermined line of the first frame in FIG. 49 corresponds to the horizontal blanking interval.

With this operation, the parameter can be changed by the simplified Mode Change, in which no invalid frame is transmitted, in line unit.

As described above, by not transmitting the invalid frame, a decrease in the data transmission efficiency can be prevented.

(3-2) Example in which Setting Change Flag is Transmitted by Using Packet Header In the simplified Mode Change in which no invalid frame is transmitted, the change in the parameter may be notified from the transmission side to the reception side by using a setting change flag stored in the header.

The reception unit 31 analyzes the header and detects whether or not the parameter is changed on the basis of the setting change flag. In a case where the change in the parameter is detected, processing for reading the changed parameter set to the register 142 and reflecting the parameter in the data reception operation is executed.

As will be described in detail later, the sequence in this case is basically similar to the sequence described with reference to FIG. 49 except that the processing executed according to the output of Config is different.

FIG. 50 is a diagram illustrating an example of information stored in the header.

Each piece of information illustrated in FIG. 50 is different from the information illustrated in FIG. 32 in that the information does not include the region information. In the example in FIG. 50, data information indicating data identification is defined as four bits. Reserved includes 27 bits. The setting change flag is set by using a 27-bit reserve region (Reserved).

FIG. 51 is a diagram illustrating an example of allocation of 27 bits ([26:0]) in the reserve region.

As illustrated in FIG. 51, upper three bits ([26:24]) of 27 bits in the reserve region are allocated as Information Type.

A value of Information Type ([2:0]) is 000(3'd0), and this indicates that the reserve region is not used to set the setting change flag. For example, in a case where the value of the setting change flag cannot be interpreted by the reception side, 000 is set as the value of Information Type. This makes it possible to secure compatibility due to a difference in performance of the reception side.

A value of Information Type is 001(3'd1), and this indicates that the reserve region is used to set Parameter Change Indicator as the setting change flag.

Of the 27 bits in the reserve region, 24 bits after the upper four bits ([23:0]) are allocated as Additional Information.

FIG. 52 is a diagram illustrating an example of Additional Information in a case where the value of Information Type is 001.

The most significant bit ([23]) of 24 bits allocated as Additional Information is allocated to Parameter Change Indicator.

The value of Parameter Change Indicator is 1(1'b1), and this indicates that the parameter is changed.

In a case where the simplified Mode Change in which no invalid frame is transmitted is performed, in other words, in a case where any one of the parameters Pixel Bit, Line Length, ECC Option, and CRC Option is changed, a packet including a header in which one is set as the value of Parameter Change Indicator is generated at a predetermined timing and transmitted.

On the other hand, the value of Parameter Change Indicator is 0(1'b0), and this indicates that the parameter is not changed.

Note that bits other than the most significant bit of 24 bits allocated as Additional Information ([22:0]) are Reserved.

Figure 53:
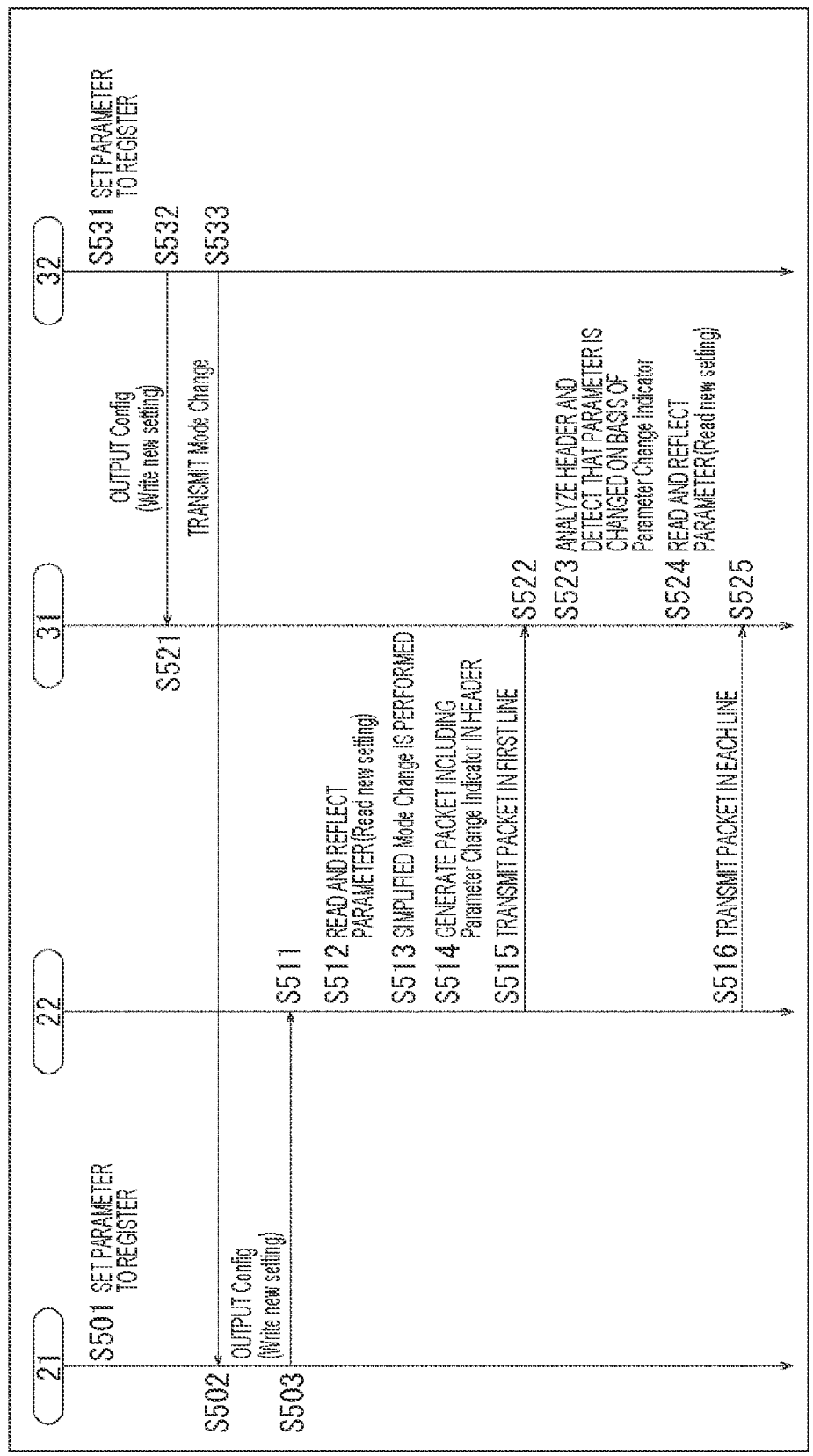
FIG. 53 is a sequence diagram for explaining processing of each unit at the time of the simplified Mode Change.

Here, processing of each unit at the time of the simplified Mode Change in a case where the change in the parameter is notified by using Parameter Change Indicator will be described with reference to the sequence diagram in FIG. 53.

After the parameter is changed between the imaging unit 21 and the image processing unit 32, the imaging unit 21 sets the changed parameter to the register 53 in step S501.

On the other hand, the image processing unit 32 sets the changed parameter to the register 142 in step S531.

In step S532, the image processing unit 32 outputs Config to the reception unit 31. Config output here notifies that the changed parameter is set to the register 142 (Write new setting) and does not require the reception unit 31 to read the parameter from the register 142 and reflect the parameter. Config is output to the reception unit 31, for example, while a predetermined line of the first frame is transmitted.

In step S521, the reception unit 31 receives Config output from the image processing unit 32.

In step S533, the image processing unit 32 issues Mode Change to the imaging unit 21. Mode Change is issued, for example, while the predetermined line of the first frame is transmitted.

In step S502, the imaging unit 21 receives the issuance of Mode Change.

In step S503, the imaging unit 21 outputs Config to the transmission unit 22. Config output here notifies that the changed parameter is set to the register 53 (Write new setting) and does not require the transmission unit 22 to read the parameter from the register 53 and reflect the parameter.

In step S511, the transmission unit 22 receives Config output from the imaging unit 21.

For example, in step S512 in which the transmission of the final line of the first frame is completed, the transmission unit 22 reads the parameter from the register 53 and reflects the parameter in the data transmission operation. The state control unit 71 controls each unit of the link layer and makes each unit execute processing according to a newly set parameter.

In a case where the changed parameter is any one of Pixel Bit, Line Length, ECC Option, and CRC Option, the state control unit 71 of the transmission unit 22 changes the state of the link layer to the state where the simplified Mode Change is performed in step S513.

In step S514, the packet generation unit 64 of the transmission unit 22 stores data in the first line of the second frame in the payload and adds the header to which one is set as the value of Parameter Change Indicator so as to generate a packet. The header to which one is set as the value of Parameter Change Indicator is generated by the header generation unit 72 and is supplied to the packet generation unit 64.

In other words, in this example, Parameter Change Indicator is set to a header of a packet of a first line of a certain frame.

In step S515, the transmission unit 22 transmits a packet of the first line. Packet data included in the packet of the first line is supplied to the reception unit 31 as a data stream.

In step S522, the reception unit 31 executes processing on the data stream transmitted from the transmission unit 22 and receives the packet of the first line. The packet of the first line is separated by the packet separation unit 123, and each piece of information forming the header is, for example, supplied to the state control unit 131.

In step S523, the state control unit 131 analyzes the header and detects that any one of parameters Pixel Bit, Line Length, ECC Option, and CRC Option is changed on the basis of that one is set as the value of Parameter Change Indicator.

In step S524, the state control unit 131 reads the parameter from the register 142 and reflects the parameter in the data reception operation in response to that the change in the parameter is detected. The state control unit 131 controls each unit of the link layer and makes each unit execute processing according to a newly set parameter. With this operation, the change in the parameter is reflected in both of the transmission unit 22 and the reception unit 31.

In step S516, the transmission unit 22 transmits a packet of each line of a valid frame.

On the other hand, in step S525, the reception unit 31 receives a packet of each line transmitted from the transmission unit 22. Thereafter, the exchange of the valid frame is continued between the transmission unit 22 and the reception unit 31.

In this way, by transmitting Parameter Change Indicator by using a header of a packet of a first line of a certain frame, it is possible to notify from the transmission side of the reception side whether or not the parameter is changed after the first line.

Furthermore, the parameter can be changed by the simplified Mode Change, in which no invalid frame is transmitted, in frame unit.

The notification by using Parameter Change Indicator may be performed by using the header of the packet of each line without using a header of a packet of a first line of a certain frame.

With this operation, the parameter can be changed by the simplified Mode Change, in which no invalid frame is transmitted, in line unit.

By setting Parameter Change Indicator as described with reference to FIG. 51, it is possible to transmit new information to the reception side while maintaining backward compatibility.

Furthermore, by dividing the 27-bit reserve region into the region of Information Type and the region of Additional Information, it is possible to maintain extensibility.

(3-3) Example in which Parameter is Transmitted by Using Packet Header

The parameter may be notified from the transmission side of the reception side by using the header to be added to the packet.

FIG. 54 is a diagram illustrating another example of allocation of 27 bits ([26:0]) of the reserve region.

As illustrated in FIG. 54, upper three bits ([26:24]) of 27 bits in the reserve region are allocated as Information Type.

The value of Information Type ([2:0]) is 000(3'd0), and this indicates that the reserve region is not used for storage of the parameter. For example, in a case where the reception side cannot interpret the parameter stored in the header, 000 is set as the value of Information Type. This makes it possible to secure compatibility due to a difference in performance of the reception side.

The value of Information Type is 001(3'd1), and this indicates that the reserve region is used for storage of Link Parameters as parameters.

Of the 27 bits in the reserve region, 24 bits after the upper four bits ([23:0]) are allocated as Additional Information.

FIG. 55 is a diagram illustrating an example of Additional Information in a case where the value of Information Type is 001.

Upper three bits of the 24 bits allocated as Additional Information ([23:21]) are allocated to Pixel Bit. The bit length of one pixel is indicated by using three bits.

A value of Pixel Bit is 000(3'd0), and this indicates that one pixel is represented by eight bits. A value of Pixel Bit is 001(3'd1), and this indicates that one pixel is represented by 10 bits. A value of Pixel Bit is 010(3'd2), and this indicates that one pixel is represented by 12 bits. A value of Pixel Bit is 011(3'd3), and this indicates that one pixel is represented by 14 bits. A value of Pixel Bit is 100(3'd4), and this indicates that one pixel is represented by 16 bits.

Of 24 bits allocated as Additional Information, 18 bits ([20:3]) are allocated to Line Length. The number of pixels per line is indicated by using 18 bits.

Of 24 bits allocated as Additional Information, two bits ([2:1]) are allocated to ECC Option. The type of ECC Option is indicated by using two bits.

A value of ECC Option is 00(2'd0), and this indicates that the type of ECC Option is ECC Option 0. A value of ECC Option is 01(2'd1), and this indicates that the type of ECC Option is ECC Option 1. A value of ECC Option is 10(2'd2), and this indicates that the type of ECC Option is ECC Option 2.

The least significant one bit ([0]) of the 24 bits allocated as Additional Information is allocated to CRC Option. ON/OFF of CRC Option is indicated by using one bit.

A value of CRC Option is 1(1'b1), and this indicates that CRC Option is ON. A value of CRC Option is 0(1'b0), and this indicates that CRC Option is OFF.

In this way, Link Parameters that are Pixel Bit, Line Length, ECC Option, and CRC Option are set to the header of the packet.

Figure 56:
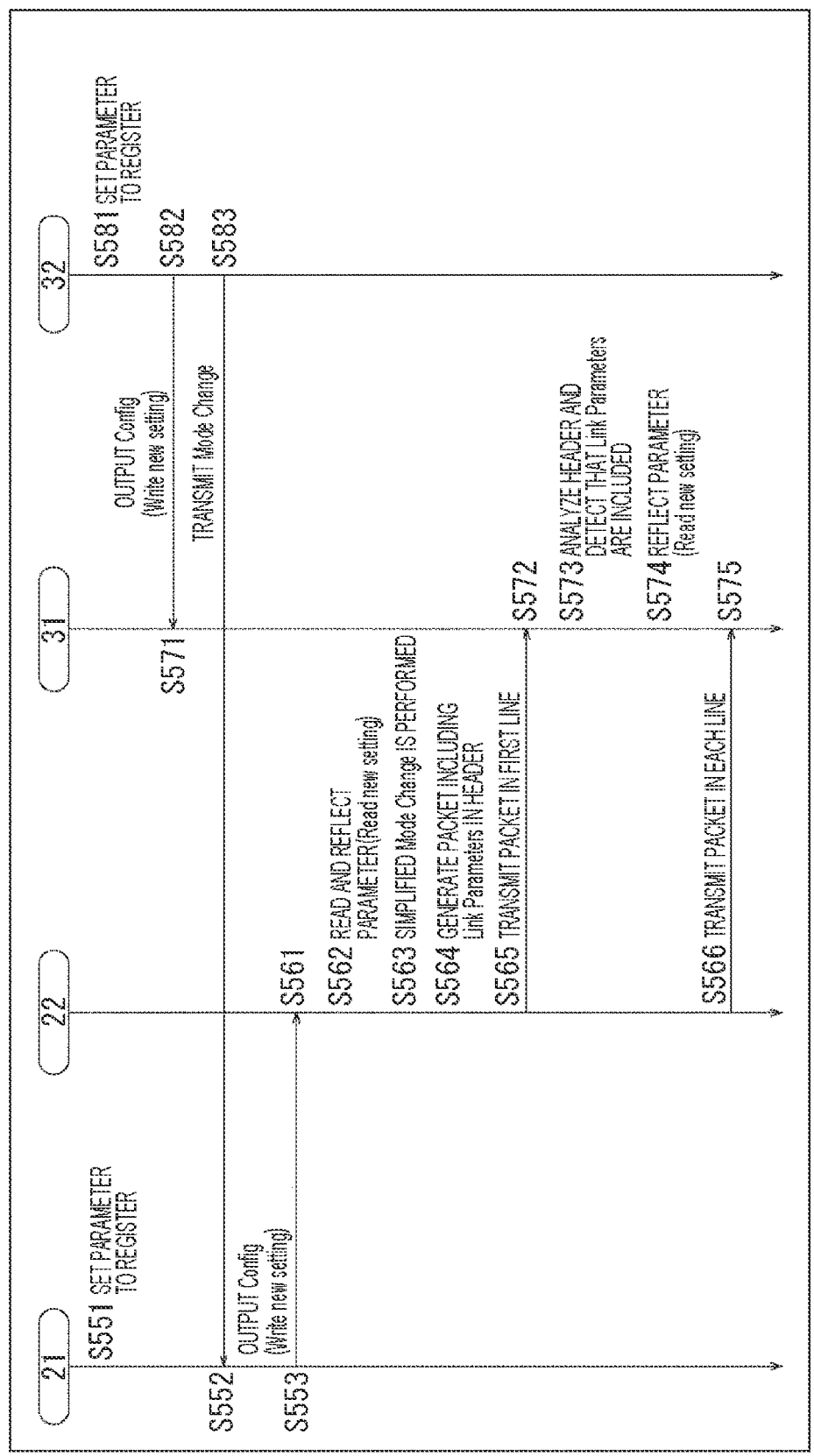
FIG. 56 is a sequence diagram for explaining processing of each unit at the time of the simplified Mode Change.

Here, processing of each unit at the time of the simplified Mode Change in a case where Link Parameters are notified by using the header will be described with reference to the sequence diagram in FIG. 56. In the processing illustrated in FIG. 56, processing similar to the processing described with reference to FIG. 53 will be appropriately omitted.

After the parameter is changed between the imaging unit 21 and the image processing unit 32, the imaging unit 21 sets the changed parameter to the register 53 in step S551.

On the other hand, the image processing unit 32 sets the changed parameter to the register 142 in step S581.

In step S582, the image processing unit 32 outputs Config to the reception unit 31. Config output here notifies that the changed parameter is set to the register 142. Config is output to the reception unit 31, for example, while a predetermined line of the first frame is transmitted.

In step S571, the reception unit 31 receives Config output from the image processing unit 32.

In step S583, the image processing unit 32 issues Mode Change to the imaging unit 21. Mode Change is issued, for example, while the predetermined line of the first frame is transmitted.

In step S552, the imaging unit 21 receives the issuance of Mode Change.

In step S553, the imaging unit 21 outputs Config to the transmission unit 22. Config output here notifies that the changed parameter is set to the register 53.

In step S561, the transmission unit 22 receives Config output from the imaging unit 21.

In step S562 in which the transmission of the final line of the first frame is completed, the transmission unit 22 reads the parameter from the register 53 and reflects the parameter in the data transmission operation. The state control unit 71 controls each unit of the link layer and makes each unit execute processing according to a newly set parameter.

In a case where the changed parameter is any one of Pixel Bit, Line Length, ECC Option, and CRC Option, the state control unit 71 of the transmission unit 22 changes the state of the link layer to the state where the simplified Mode Change is performed in step S563.

In step S564, the packet generation unit 64 of the transmission unit 22 stores data in the first line of the second frame in the payload and adds a header including Link Parameters so as to generate a packet. A header including each value of Link Parameters is generated by the header generation unit 72 and is supplied to the packet generation unit 64.

In step S565, the transmission unit 22 transmits a packet of the first line. Packet data included in the packet of the first line is supplied to the reception unit 31 as a data stream.

In step S572, the reception unit 31 executes processing on the data stream transmitted from the transmission unit 22 and receives the packet of the first line. The packet of the first line is separated by the packet separation unit 123, and each piece of information forming the header is, for example, supplied to the state control unit 131.

In step S573, the state control unit 131 analyzes the header and detects that Link Parameters are included.

In step S574, the state control unit 131 reflects Link Parameters in the data reception operation and makes each unit of the link layer execute processing according to Link Parameters. With this operation, the change in the parameter is reflected in both of the transmission unit 22 and the reception unit 31.

In step S566, the transmission unit 22 transmits a packet of each line of the valid frame.

On the other hand, in step S575, the reception unit 31 receives a packet of each line transmitted from the transmission unit 22. Thereafter, the exchange of the valid frame is continued between the transmission unit 22 and the reception unit 31.

In this way, by transmitting Link Parameters by using a header of a packet of a first line of a certain frame, the changed parameter can be notified from the transmission side to the reception side in frame unit.

Link Parameters may be notified by using the header of the packet of each line without using a header of a packet of a first line of a certain frame.

With this operation, the parameter can be changed by the simplified Mode Change, in which no invalid frame is transmitted, in line unit.

By setting Link Parameters as described with reference to FIG. 54, it is possible to transmit new information to the reception side while maintaining backward compatibility.

Note that it is possible to transmit Link Parameters by using the header only in a case where the parameter is changed and the simplified Mode Change is performed and not to transmit the Link Parameters in a case where the parameter is not changed.

The allocation of the header to the reserve region is not limited to the example described above. For example, in a case where Parameter Change Indicator is stored, a first bit of 27 bits in the reserve region can be allocated as Parameter Change Indicator. Furthermore, the information to be transmitted by using the header as Link Parameters is not limited to the information described with reference to FIG. 55, and other kinds of information may be transmitted.

3. Modification

The data transmission between chips using the plurality of lanes described above can be used for transmission of various data including not only image data but also sound data, text data, and the like.

In the above, it is assumed that the image sensor 11 and the DSP 12 be provided in the same device. However, the image sensor 11 and the DSP 12 may be provided in different devices.

Exemplary Configuration of Computer

The above-mentioned series of processing can be performed by hardware and software. In a case where the software executes the series of processing, a program included in the software is installed from a program recording medium to a computer incorporated in dedicated hardware or, for example, a general-purpose personal computer.

Figure 57:
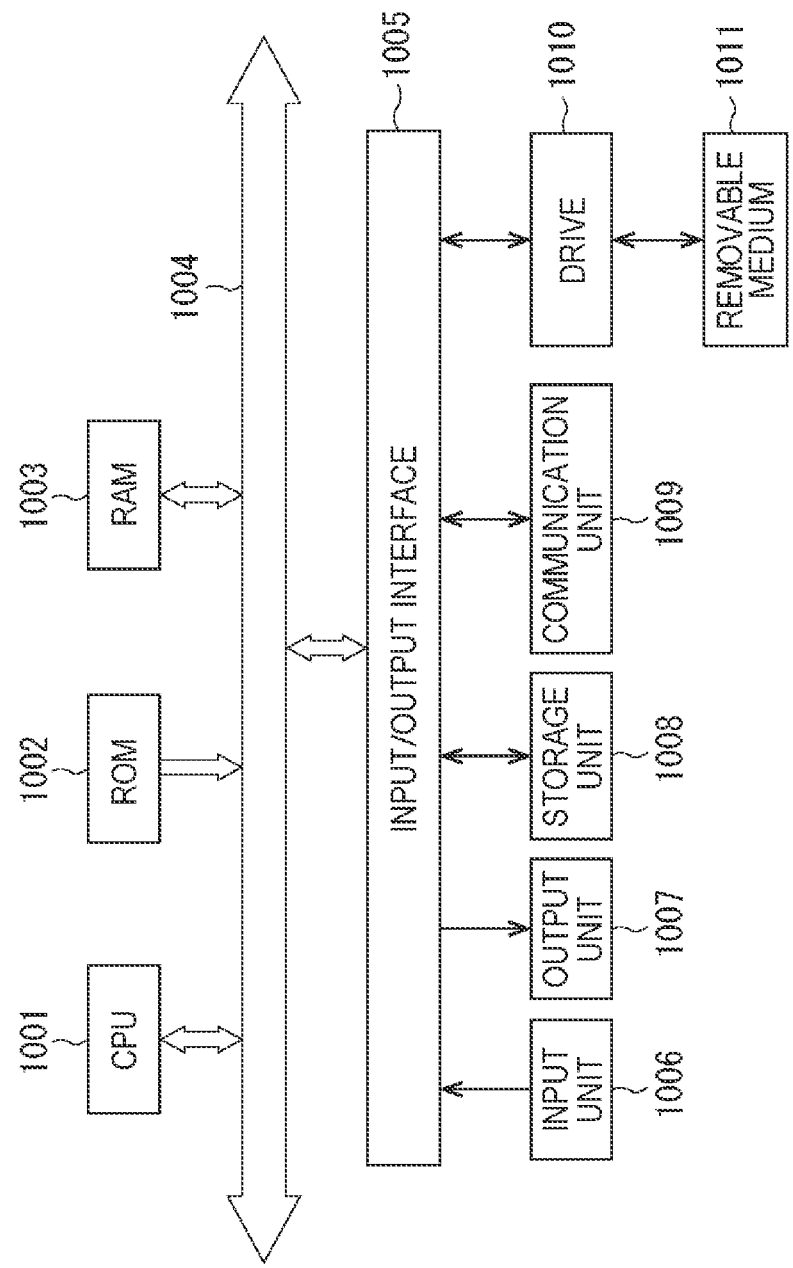
FIG. 57 is a block diagram illustrating an exemplary configuration of a computer.

FIG. 57 is a block diagram illustrating an exemplary configuration of hardware of the computer for executing the above-mentioned series of processing by the program.

A central processing unit (CPU) 1001, a read only memory (ROM) 1002, and a random access memory (RAM) 1003 are connected to each other with a bus 1004.

In addition, an input/output interface 1005 is connected to the bus 1004. The input/output interface 1005 is connected to an input unit 1006 including a keyboard, a mouse, and the like and an output unit 1007 including a display, a speaker, and the like. Furthermore, the input/output interface 1005 is connected to a storage unit 1008 including a hard disk, a non-volatile memory, and the like, a communication unit 1009 including a network interface and the like, and a drive 1010 that drives a removable medium 1011.

In the computer configured as described above, the CPU 1001 loads, for example, the program stored in the storage unit 1008 to the RAM 1003 via the input/output interface 1005 and the bus 1004 and executes the program so that the above-mentioned series of processing is executed.

The program executed by the CPU 1001 is provided and installed to the storage unit 1008, for example, by recording the program in the removable medium 1011, or via a wired or wireless transmission medium such as a local area network, the Internet, and digital broadcasting.

Note that, the program performed by the computer may be a program in which processing is executed along the order described herein in a time series manner and a program in which the processing is executed in parallel or at a necessary timing, for example, when a call has been performed.

The embodiment of the present technology is not limited to the above-mentioned embodiments, and various changes can be made without departing from the scope of the present technology.

Note that the effects described in the present specification are only exemplary and not limited to these. Furthermore, there may be an additional effect.

4. Application Example

The technology according to the present disclosure can be applied to various products. For example, the technology according to the present disclosure may be applied to an endoscopic surgery system. In this case, the image sensor 11 is provided in a casing of an endoscope, and the DSP 12 is provided in a casing of an image processing device that processes image data transmitted from the endoscope.

Figure 58:
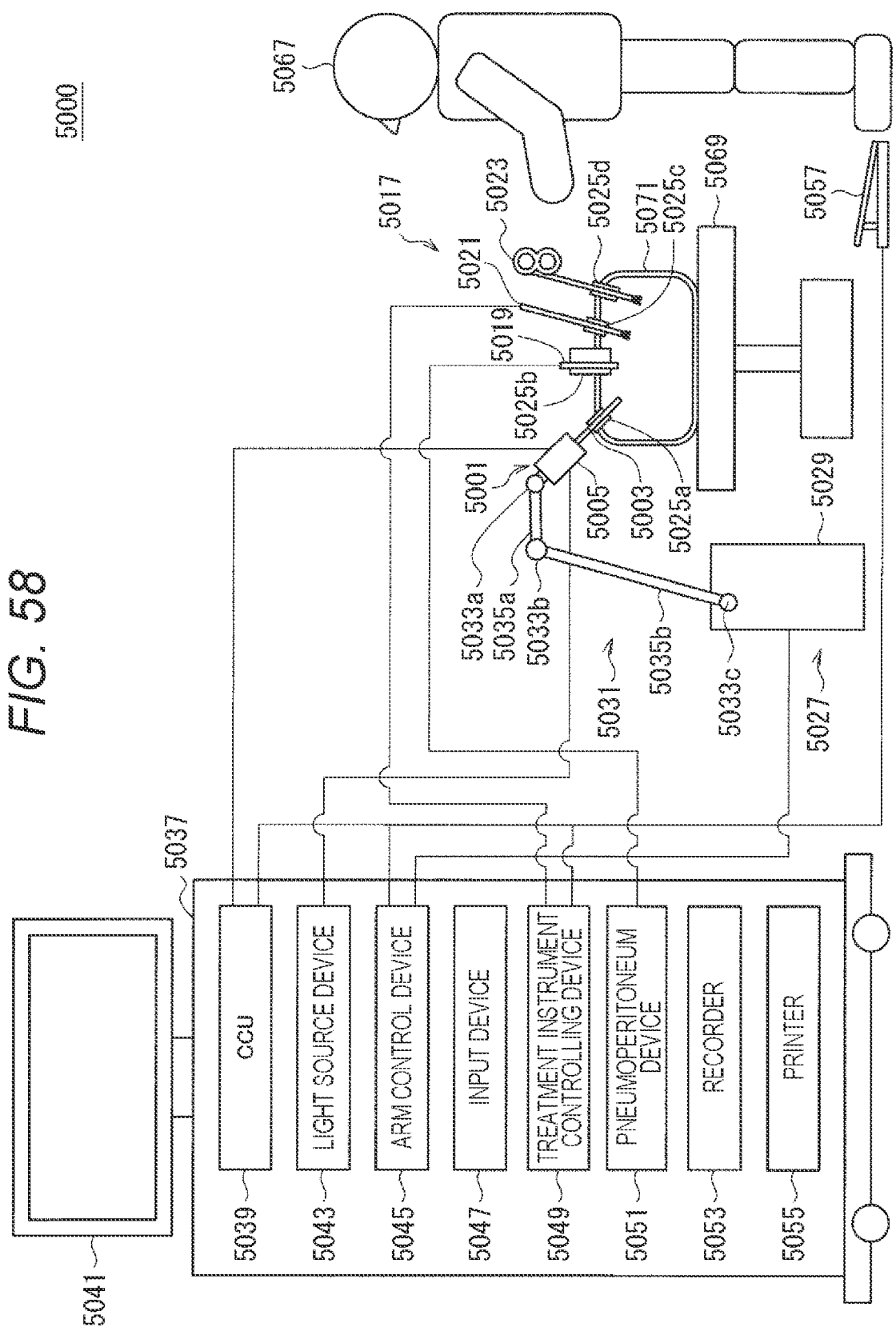
FIG. 58 is a diagram of an exemplary schematic configuration of an endoscopic surgery system.

FIG. 58 is a diagram illustrating an exemplary schematic configuration of an endoscopic surgery system 5000 to which the technology according to the present disclosure may be applied. In FIG. 58, a state is illustrated in which an operator (doctor) 5067 is operating a patient 5071 on a patient bed 5069 by using the endoscopic surgery system 5000. As illustrated in FIG. 60, the endoscopic surgery system 5000 includes an endoscope 5001, other surgical tools 5017, a supporting arm device 5027 for supporting the endoscope 5001, and a cart 5037 on which various devices for endoscopic surgery are mounted.

In endoscopic surgery, instead of cutting an abdominal wall and opening an abdomen, the abdominal wall is punctured by a plurality of cylindrical puncture devices referred to as trocars 5025a to 5025d. Then, through the trocars 5025a to 5025d, a lens barrel 5003 of the endoscope 5001 and the other surgical tools 5017 are inserted into the body cavity of the patient 5071. In the illustrated example, as the other surgical tools 5017, a pneumoperitoneum tube 5019, an energy treatment instrument 5021, and a forceps 5023 are inserted into the body cavity of the patient 5071. Furthermore, the energy treatment instrument 5021 is a treatment instrument which performs dissection and detachment of tissue, sealing of a blood vessel, or the like by high-frequency current or ultrasonic vibration. However, the illustrated surgical tools 5017 are only exemplary, and it is preferable to use various surgical tools used for general endoscopic surgery, for example, tweezers, a retractor, and the like as the surgical tools 5017.

An image of an operation site in the body cavity of the patient 5071 imaged by the endoscope 5001 is displayed on a display device 5041. While viewing the image of the operation site displayed on the display device 5041 in real time, the operator 5067 performs treatment, such as removing an affected part, or the like, by using the energy treatment instrument 5021 and the forceps 5023. Note that, although not illustrated, the pneumoperitoneum tube 5019, the energy treatment instrument 5021, and the forceps 5023 are supported by the operator 5067, an assistant, or the like during surgery.

(Supporting Arm Device)

The supporting arm device 5027 includes an arm portion 5031 extending from a base portion 5029. In the illustrated example, the arm portion 5031 includes joint portions 5033a, 5033b, and 5033c and links 5035a and 5035b and is driven by control of an arm control device 5045. The arm portion 5031 supports the endoscope 5001 and controls the position and the posture of the endoscope 5001. With this device, the endoscope 5001 may be stably fixed to a position.

(Endoscope)

The endoscope 5001 includes the lens barrel 5003 of which a portion with a predetermined length from a front end is inserted into the body cavity of the patient 5071 and a camera head 5005 connected to a base end of the lens barrel 5003. In the illustrated example, the endoscope 5001 formed as a so-called rigid endoscope having a rigid lens barrel 5003 is illustrated. However, the endoscope 5001 may be formed as a so-called flexible endoscope having a flexible lens barrel 5003.

At the front end of the lens barrel 5003, an opening in which an objective lens is fitted is provided. A light source device 5043 is connected to the endoscope 5001, and light generated by the light source device 5043 is guided to the front end of the lens barrel by a light guide extending in the lens barrel 5003 and is irradiated to an object to be observed in the body cavity of the patient 5071 through the objective lens. Note that the endoscope 5001 may be a forward-viewing endoscope, an oblique-viewing endoscope, or a side-viewing endoscope.

An optical system and an imaging element are provided in the camera head 5005, and light reflected by the object to be observed (observation light) is collected by the optical system to the imaging element. The imaging element photoelectrically converts the observation light and generates an electric signal corresponding to the observation light, that is, an image signal corresponding to an observation image. The image signal is transmitted to a Camera Control Unit (CCU) 5039 as RAW data. Note that the camera head 5005 has a function for adjusting the magnification and the focal distance by appropriately driving the optical system of the camera head 5005.

Note that, for example, to realize stereoscopic viewing (3D display) or the like, a plurality of imaging elements may be provided in the camera head 5005. In this case, a plurality of relay optical systems is provided in the lens barrel 5003 so as to guide the observation light to each of the plurality of imaging elements.

(Various Devices Mounted on Cart)

The CCU 5039 includes a Central Processing Unit (CPU), a Graphics Processing Unit (GPU), and the like and comprehensively controls the operations of the endoscope 5001 and the display device 5041. Specifically, the CCU 5039 executes various image processing to display an image based on an image signal, for example, developing processing (demosaic processing) or the like, on the image signal received from the camera head 5005. The CCU 5039 provides the image-processed image signal to the display device 5041. Furthermore, the CCU 5039 transmits a control signal to the camera head 5005 and controls driving of the camera head 5005. The control signal may include information regarding imaging conditions such as a magnification and a focal distance.

The display device 5041 displays the image based on the image signal on which the image processing has been performed by the CCU 5039 according to the control by the CCU 5039. For example, in a case where the endoscope 5001 is compatible with high resolution imaging such as 4K (the number of horizontal pixels 3840×the number of vertical pixels 2160) or 8K (the number of horizontal pixels 7680×the number of vertical pixels 4320), or the like, and/or in a case where the endoscope 5001 is compatible with 3D display, a display device which can achieve high resolution display and/or 3D display to cope with both cases may be used as the display device 5041. In a case where the display device 5041 is compatible with high resolution imaging such as 4K or 8K, more immersive feeling can be acquired by using a display device 5041 having a size equal to or larger than 55 inches. Furthermore, depending on the application, the plurality of display devices 5041 having different resolutions and different sizes may be provided.

The light source device 5043 includes a light source such as a Light Emitting Diode (LED) and the like, and supplies irradiation light, at the time when an operation site is imaged, to the endoscope 5001.

The arm control device 5045 includes, for example, a processor such as a CPU and operates according to a predetermined program so as to control driving of the arm portion 5031 of the supporting arm device 5027 according to a predetermined control method.

The input device 5047 may be an input interface relative to the endoscopic surgery system 5000. A user can input various information and input instructions to the endoscopic surgery system 5000 via the input device 5047. For example, the user inputs various information regarding the surgery such as body information of the patient, an operative method, and the like via the input device 5047. Furthermore, for example, the user inputs an instruction to drive the arm portion 5031, an instruction to change the imaging conditions (kind of irradiation light, magnification, focal distance, and the like) by the endoscope 5001, an instruction to drive the energy treatment instrument 5021, and the like via the input device 5047.

The kind of the input device 5047 is not limited, and the input device 5047 may be various known input devices. As the input device 5047, for example, a mouse, a keyboard, a touch panel, a switch, a foot switch 5057 and/or a lever, and the like may be applied. In a case where a touch panel is used as the input device 5047, the touch panel may be provided on a display surface of the display device 5041.

Alternatively, the input device 5047 is a device worn by the user, for example, a glass-type wearable device, a Head Mounted Display (HMD), or the like, and various inputs are performed according to a gesture and a line of sight of the user detected by these devices. Furthermore, the input device 5047 includes a camera which can detect a motion of the user, and various inputs are performed according to the gesture and the line of sight of the user detected from a video imaged by the camera. In addition, the input device 5047 includes a microphone which can collect voice of the user, and various inputs are performed by using voice via the microphone. In this way, the input device 5047 is configured to be capable of inputting various information in a non-contact manner so that the user (for example, operator 5067) belonging to an especially clean area can operate devices belonging to an unclean area in a non-contact manner. Furthermore, since the user can operate the device without releasing his hand from the holding surgical tools, convenience of the user is improved.

A treatment instrument controlling device 5049 controls driving of the energy treatment instrument 5021 for cauterizing or dissecting of tissue or sealing a blood vessel, for example. To secure a field of view and an operation space of an operator by the endoscope 5001, a pneumoperitoneum device 5051 injects gas into the body cavity through the pneumoperitoneum tube 5019 to swell the body cavity of the patient 5071. A recorder 5053 is a device capable of recording various information regarding surgery. A printer 5055 is a device capable of printing various information regarding surgery in various formats such as a text, an image, a graph, and the like. Hereinafter, a particularly characteristic configuration of the endoscopic surgery system 5000 will be described in more detail.

(Supporting Arm Device)

The supporting arm device 5027 includes the base portion 5029 that is a base and the arm portion 5031 extending from the base portion 5029. In the illustrated example, the arm portion 5031 includes the plurality of joint portions 5033a, 5033b, and 5033c and the plurality of links 5035a and 5035b coupled by the joint portion 5033b. However, for easy understanding, the simplified configuration of the arm portion 5031 is illustrated in FIG. 58. Actually, shapes, the number, and arrangement of the joint portions 5033a to 5033c and the links 5035a and 5035b, directions of rotation axes of the joint portions 5033a to 5033c, and the like may be appropriately set so that the arm portion 5031 has a desired degree of freedom. For example, the arm portion 5031 may be preferably configured to have degrees of freedom equal to or more than six degrees of freedom. With this configuration, since the endoscope 5001 can be freely moved in a movable range of the arm portion 5031, the lens barrel 5003 of the endoscope 5001 can be inserted into the body cavity of the patient 5071 in a desired direction.

Actuators are provided in the joint portions 5033a to 5033c, and the joint portions 5033a to 5033c can rotate around a predetermined rotation axis by driving of the actuators. By controlling the driving of the actuators by the arm control device 5045, a rotation angle of each of the joint portions 5033a to 5033c is controlled, and the driving of the arm portion 5031 is controlled. With this operation, the position and the posture of the endoscope 5001 can be controlled. At this time, the arm control device 5045 can control the driving of the arm portion 5031 by various known control methods such as force control or position control.

For example, the operator 5067 appropriately performs an operation input via the input device 5047 (including foot switch 5057) so as to appropriately control the driving of the arm portion 5031 by the arm control device 5045 according to the operation input, and the position and the posture of the endoscope 5001 may be controlled. With this control, after the endoscope 5001 provided at the front end of the arm portion 5031 is moved from a certain position to a certain position, the endoscope 5001 can be fixedly supported at the position after being moved. Note that the arm portion 5031 may be operated by a so-called master-slave method. In this case, the arm portion 5031 may be remotely controlled by the user via the input device 5047 provided at a place away from the operating room.

Furthermore, in a case where the force control is applied, the arm control device 5045 may perform so-called power assist control of receiving external force from the user and driving the actuator of each of the joint portions 5033a to 5033c so as to smoothly move the arm portion 5031 according to the external force. With this control, when the user moves the arm portion 5031 while directly having contact with the arm portion 5031, the arm portion 5031 can be moved with relatively weak force. Therefore, the endoscope 5001 can be more intuitively moved by a more simple operation, and the convenience of the user can be improved.

Here, in general, a doctor called an endoscopic technician has supported the endoscope 5001 in the endoscopic surgery. On the other hand, by using the supporting arm device 5027, the position of the endoscope 5001 can be more reliably fixed without manual operations. Therefore, the image of the operation site can be stably acquired, and surgery can be smoothly performed.

Note that the arm control device 5045 is not necessarily provided on the cart 5037. Furthermore, the arm control device 5045 is not necessarily a single device. For example, the arm control device 5045 may be provided in each of the joint portions 5033a to 5033c of the arm portion 5031 of the supporting arm device 5027, and the driving of the arm portion 5031 may be controlled by operating the plurality of arm control devices 5045 in cooperation with each other.

(Light Source Device)

The light source device 5043 supplies irradiation light used for imaging the operation site to the endoscope 5001. The light source device 5043 includes, for example, an LED, a laser light source or a white light source configured by a combination of the LED and the laser light source. At this time, in a case where the white light source is configured by a combination of RGB laser light sources, an output intensity and an output timing of each color (each wavelength) can be controlled with high accuracy. Therefore, the light source device 5043 can adjust a white balance of the captured image. Furthermore, in this case, by irradiating the object to be observed with laser light from each of the RGB laser light sources in time division and controlling the driving of the imaging element of the camera head 5005 in synchronization with the irradiation timing, images respectively corresponding to the R, G, and B can be imaged in time division. According to this method, a color image can be acquired without providing a color filter in the imaging element.

Furthermore, the driving of the light source device 5043 may be controlled so as to change the intensity of output light for each predetermined time period. By controlling the driving of the imaging element of the camera head 5005 in synchronization with a timing of the change of the light intensity and acquiring the images in time division, and synthesizing the images, an image with a high dynamic range that does not have so-called blown-out highlights and blocked up shadows can be generated.

Furthermore, the light source device 5043 may be formed to be capable of supplying light in a predetermined wavelength band compatible with special light observation. In the special light observation, for example, by irradiating light in a narrower band than irradiation light (in other words, white light) at the time of normal observation using wavelength dependency of a body tissue to absorb light, so-called Narrow Band Imaging is performed, in which a predetermined tissue such as a blood vessel in a mucosal surface layer is imaged with high contrast. Alternatively, in the special light observation, fluorescence observation for acquiring an image with fluorescence generated by irradiating excitation light may be performed. In the fluorescence observation, the fluorescence from the body tissue may be observed by irradiating the body tissue with the excitation light (self-fluorescence observation), or it is possible to inject a reagent such as indocyanine green (ICG) in the body tissue and irradiate the body tissue with the excitation light corresponding to the fluorescence wavelength of the reagent to acquire a fluorescent image, for example. The light source device 5043 can supply narrow band light and/or excitation light compatible with such special light observation.

(Camera Head and CCU)

Figure 59:
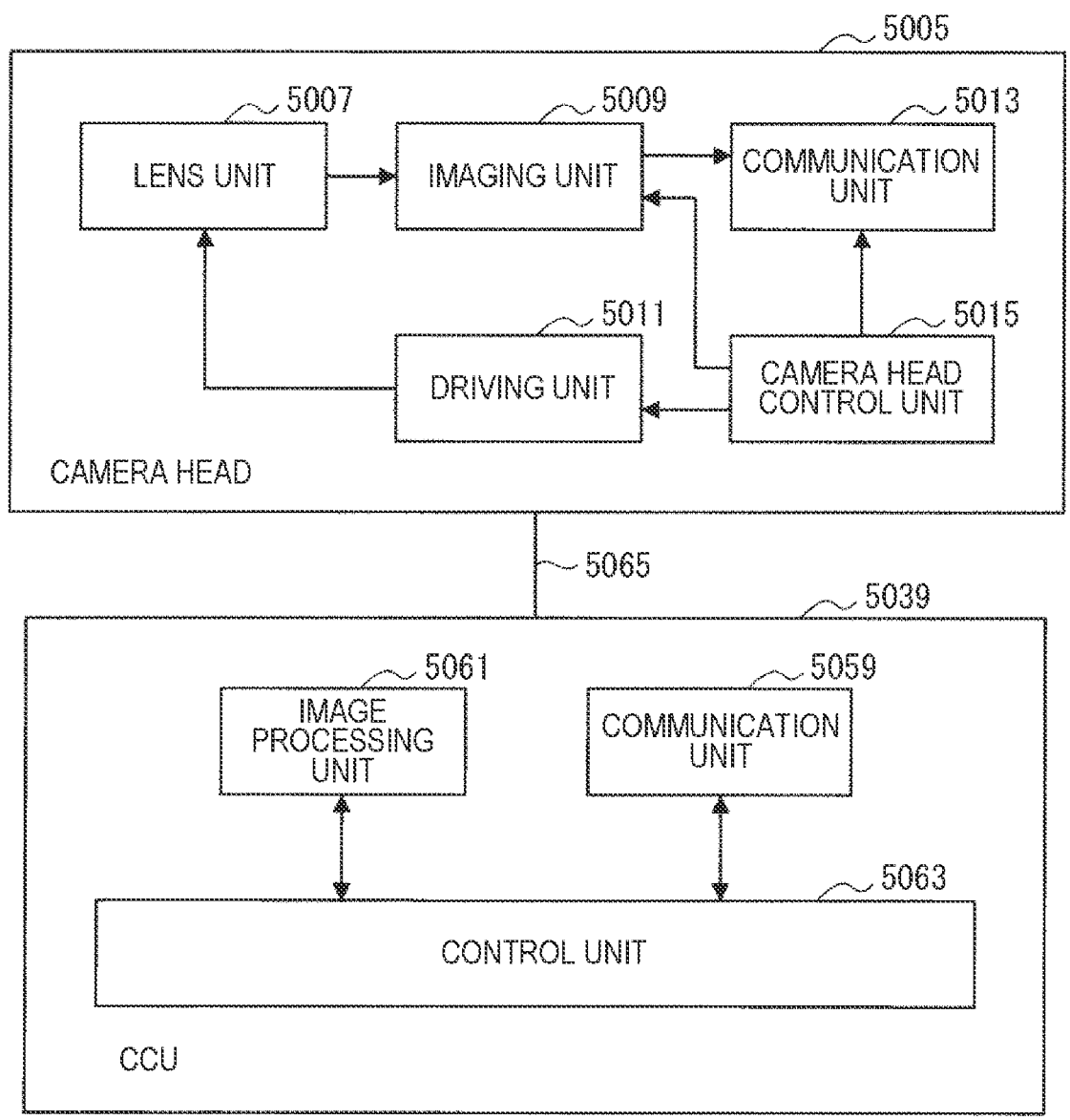
FIG. 59 is a block diagram of an exemplary functional configuration of a camera head and a CCU illustrated in FIG. 58.

Referring to FIG. 59, functions of the camera head 5005 and the CCU 5039 of the endoscope 5001 will be described in more detail. FIG. 59 is a block diagram of an exemplary functional configuration of the camera head 5005 and the CCU 5039 illustrated in FIG. 58.

Referring to FIG. 59, the camera head 5005 includes a lens unit 5007, an imaging unit 5009, a driving unit 5011, a communication unit 5013, and a camera head control unit 5015 as functions of the camera head 5005. Furthermore, the CCU 5039 includes a communication unit 5059, an image processing unit 5061, and a control unit 5063 as functions of the CCU 5039. The camera head 5005 and the CCU 5039 are communicably and bidirectionally connected to each other by a transmission cable 5065.

First, a functional configuration of the camera head 5005 will be described. The lens unit 5007 is an optical system provided at a connecting portion with the lens barrel 5003. Observation light taken from the front end of the lens barrel 5003 is guided to the camera head 5005 and enters the lens unit 5007. The lens unit 5007 is formed by combining a plurality of lenses including zoom lenses and focus lenses. Optical characteristics of the lens unit 5007 are adjusted to collect the observation light on a light receiving surface of an imaging element of the imaging unit 5009. Furthermore, positions of the zoom lens and the focus lens on the optical axis can be moved to adjust a magnification and a focus of an imaged image.

The imaging unit 5009 includes the imaging element and is arranged at a subsequent stage of the lens unit 5007. The observation light which has passed through the lens unit 5007 is collected on the light receiving surface of the imaging element, and an image signal corresponding to an observation image is generated by photoelectric conversion. The image signal generated by the imaging unit 5009 is provided to the communication unit 5013.

The imaging element included in the imaging unit 5009 is, for example, a Complementary Metal Oxide Semiconductor (CMOS) type image sensor which has a Bayer arrangement and can perform color imaging. Note that, as the imaging element, an imaging element that can cope with imaging an image with a high resolution, for example, equal to or more than 4K may be used. By acquiring the image of the operation site with high resolution, the operator 5067 can recognize the state of the operation site in more detail, and the surgery can be more smoothly progressed.

Furthermore, the imaging element configuring the imaging unit 5009 includes a pair of imaging elements for respectively acquiring image signals for right and left eyes coping with the 3D display. With the 3D display, the operator 5067 can more accurately recognize the depth of the living tissue in the operation site. Note that in a case where the imaging unit 5009 has a multi-plate type configuration, a plurality of lens units 5007 is provided in correspondence with the imaging elements.

Furthermore, the imaging unit 5009 is not necessarily provided in the camera head 5005. For example, the imaging unit 5009 may be provided just behind the objective lens in the lens barrel 5003.

The driving unit 5011 includes an actuator and moves the zoom lens and the focus lens of the lens unit 5007 by a predetermined distance along the optical axis under the control by the camera head control unit 5015. With this movement, the magnification and the focus of the image imaged by the imaging unit 5009 may be appropriately adjusted.

The communication unit 5013 includes a communication device for transmitting and receiving various information to/from the CCU 5039. The communication unit 5013 transmits the image signal acquired from the imaging unit 5009 to the CCU 5039 via the transmission cable 5065 as RAW data. At this time, to display the imaged image of the operation site with low latency, it is preferable that the image signal be transmitted by optical communication. This is because, since the operator 5067 performs surgery while observing the state of the affected part by using the imaged image at the time of surgery, it is required to display a moving image of the operation site in real time as possible for safer and more reliable surgery. In a case where the optical communication is performed, a photoelectric conversion module which converts an electric signal into an optical signal is provided in the communication unit 5013. After the image signal is converted into the optical signal by the photoelectric conversion module, the image signal is transmitted to the CCU 5039 via the transmission cable 5065.

Furthermore, the communication unit 5013 receives a control signal for controlling the driving of the camera head 5005 from the CCU 5039. The control signal includes, for example, information regarding the imaging conditions such as information specifying a frame rate of the imaged image, information specifying an exposure value at the time of imaging, and/or information specifying the magnification and the focus of the imaged image. The communication unit 5013 provides the received control signal to the camera head control unit 5015. Note that the control signal from the CCU 5039 may be transmitted by optical communication. In this case, a photoelectric conversion module which converts an optical signal into an electric signal is provided in the communication unit 5013, and after converted into an electric signal by the photoelectric conversion module, the control signal is provided to the camera head control unit 5015.

Note that the control unit 5063 of the CCU 5039 automatically sets the imaging conditions such as the frame rate, the exposure value, the magnification and the focus on the basis of the acquired image signal. That is, the endoscope 5001 has a so-called Auto Exposure (AE) function, an Auto Focus (AF) function, and an Auto White Balance (AWB) function.

The camera head control unit 5015 controls the driving of the camera head 5005 on the basis of the control signal from the CCU 5039 received via the communication unit 5013. For example, the camera head control unit 5015 controls the driving of the imaging element of the imaging unit 5009 on the basis of the information specifying the frame rate of the imaged image and/or the information specifying the exposure at the time of imaging. Furthermore, for example, the camera head control unit 5015 appropriately moves the zoom lens and the focus lens of the lens unit 5007 via the driving unit 5011 on the basis of the information specifying the magnification and the focus of the imaged image. The camera head control unit 5015 may further have a function for storing information for identifying the lens barrel 5003 and the camera head 5005.

Note that, by arranging the components such as the lens unit 5007, the imaging unit 5009, and the like in a sealed structure having high airtightness and waterproofness, the camera head 5005 can have resistance to autoclave sterilization.

Next, the functional configuration of the CCU 5039 will be described. The communication unit 5059 includes a communication device for transmitting and receiving various information to/from the camera head 5005. The communication unit 5059 receives the image signal transmitted from the camera head 5005 via the transmission cable 5065. At this time, as described above, the image signal may be preferably transmitted by optical communication. In this case, to be compatible with optical communication, a photoelectric conversion module which converts an optical signal into an electric signal is provided in the communication unit 5059. The communication unit 5059 provides the image signal converted into the electric signal to the image processing unit 5061.

Furthermore, the communication unit 5059 transmits the control signal to control the driving of the camera head 5005 to the camera head 5005. The control signal may be transmitted by optical communication.

The image processing unit 5061 executes various image processing on the image signal that is the RAW data transmitted from the camera head 5005. The image processing includes various known signal processing, for example, development processing, image quality enhancement processing (band emphasis processing, super-resolution processing, Noise Reduction (NR) processing, and/or camera shake correction processing, and/or the like), and/or enlargement processing (electronic zoom processing), and/or the like. Furthermore, the image processing unit 5061 executes detection processing on the image signal so as to achieve the AE, the AF, and the AWB.

The image processing unit 5061 includes a processor such as a CPU and a GPU, and the processor operates according to a predetermined program so that the image processing and the detection processing may be executed. Note that, in a case where the image processing unit 5061 includes the plurality of GPUs, the image processing unit 5061 appropriately divides information regarding the image signal and executes the image processing in parallel by using the plurality of GPUs.

The control unit 5063 performs various controls regarding imaging of the operation site by the endoscope 5001 and display of the imaged image. For example, the control unit 5063 generates the control signal to control the driving of the camera head 5005. At this time, in a case where the imaging conditions are input by the user, the control unit 5063 generates the control signal on the basis of the input by the user. Alternatively, in a case where the AE function, the AF function, and the AWB function are mounted on the endoscope 5001, the control unit 5063 appropriately calculates an optimum exposure value, focal distance, and white balance according to the result of the detection processing by the image processing unit 5061 and generates a control signal.

Furthermore, the control unit 5063 makes the display device 5041 display the image of the operation site on the basis of the image signal on which the image processing has been executed by the image processing unit 5061. In this case, the control unit 5063 recognizes various objects in the image of the operation site by using various image recognition technologies. For example, by detecting an edge shape, a color, and the like of the object included in the image of the operation site, the control unit 5063 can recognize surgical tools such as a forceps, a specific body portion, bleed, mist at the time of using the energy treatment instrument 5021, and the like. When making the display device 5041 display the image of the operation site, the control unit 5063 superimposes and displays various surgery assist information on the image of the operation site by using the recognition result. The surgery assist information is superimposed and displayed, and is presented to the operator 5067 so that the surgery can be more safely and reliably proceeded.

The transmission cable 5065 for connecting the camera head 5005 and the CCU 5039 is an electric signal cable compatible with electric signal communication, an optical fiber compatible with optical communication, or a composite cable thereof.

Here, in the illustrated example, wired communication has been performed by using the transmission cable 5065. However, the camera head 5005 and the CCU 5039 may wirelessly communicate with each other. In a case where the camera head 5005 and the CCU 5039 wirelessly communicate with each other, it is not necessary to provide the transmission cable 5065 in the operating room. Therefore, a state where movement of a medical staff in the operating room is prevented by the transmission cable 5065 may be resolved.

An example of the endoscopic surgery system 5000 to which the technology according to the present disclosure may be applied has been described above. Note that, here, the endoscopic surgery system 5000 has been described as an example. However, a system to which the technology according to the present disclosure may be applied is not limited to the example. For example, the technology according to the present disclosure may be applied to a flexible endoscope system for examination and a microsurgical system.

[Example of Combination of Configurations]

The present technology can have the following configuration.

(1)

A transmission device including:
  a distribution unit configured to distribute packet data configuring a packet that stores data to be transmitted into a plurality of lanes;
  a plurality of signal processing units configured to transmit data streams having same data structures including the distributed packet data to a reception device by using the plurality of lanes in parallel; and
  a control unit configured to, in a case where the data stream is transmitted in a predetermined mode, when a parameter that defines content of the mode is changed, switch transmission of the data stream in the mode defined by the changed parameter is started after training processing for performing data synchronization and correction of a difference between data timings of the lanes by the reception device is executed or without executing the training processing according to a type of the parameter to be changed.

(2)

The transmission device according to (1), in which
the data to be transmitted includes image data acquired by imaging, and
the image data is stored in each of the packets in line unit.

(3)

The transmission device according to (2), further including:
  an imaging unit configured to set the parameter and is a supply source of the image data, in which
    in a case where information that is transmitted from the reception device and requires change in the mode is received by the imaging unit, the control unit reflects the change in the parameter set by the imaging unit.

(4)
The transmission device according to (2) or (3), in which
in a case where the transmission of the data stream in the mode defined by the changed parameter is started without executing the training processing,
the plurality of signal processing units transmits blanking data in a period required for the training processing in a case where the training processing is executed and transmits the data stream after the transmission of the blanking data is completed.

(5)
The transmission device according to (4), in which
the plurality of signal processing units transmits the blanking data until transmission of a next frame is started with reference to a timing when the parameter is changed.

(6)
The transmission device according to (2), in which
in a case where the parameter is changed in a blanking interval after a predetermined line is transmitted, the plurality of signal processing units transmits the packet data configuring the packet that stores the image data of a next line of the predetermined line in the mode defined by the changed parameter.

(7)
The transmission device according to (2), in which
in a case where the parameter is changed in a blanking interval after a predetermined frame is transmitted, the plurality of signal processing units transmits the packet data configuring the packet that stores the image data of a next frame of the predetermined frame in the mode defined by the changed parameter.

(8)
The transmission device according to (6) or (7), further including:
 a packet generation unit configured to generate the packet including a flag indicating whether or not the parameter is changed in a header.

(9)
The transmission device according to (6) or (7), further including:
 a packet generation unit configured to generate the packet including the changed parameter in a header.

(10)
The transmission device according to any one of (2) to (9), in which
the parameter includes at least one of
lane information representing the number of lanes used to transmit the data stream,
bit information representing a bit length of each pixel included in the image data,
line information representing the number of pixels in one line,
error correction code information representing a type of an error correction code used to correct an error in payload data configuring the packet,
error detection code information representing a type of an error detection code that is included in a footer configuring the packet and is used to detect the payload data, or
rate information representing a type of a transmission rate of each of the lanes.

(11)
The transmission device according to (10), in which
in a case where the parameter to be changed is the lane information or the rate information, the control unit starts to transmit the data stream in the mode defined by the changed parameter after the training processing is executed, and in a case where the parameter to be changed is the bit information, the line information, the error correction code information, or the error detection code information, the control unit starts to transmit the data stream in the mode defined by the changed parameter without executing the training processing.

(12)
A control method including:
distributing packet data configuring a packet that stores data to be transmitted into a plurality of lanes;
transmitting data streams having same data structures including the distributed packet data to a reception device by using the plurality of lanes in parallel; and
in a case where the data stream is transmitted in a predetermined mode, when a parameter that defines content of the mode is changed, switching transmission of the data stream in the mode defined by the changed parameter is started after training processing for performing data synchronization and correction of a difference between data timings of the lanes by the reception device is executed or without executing the training processing according to a type of the parameter to be changed.

(13)
A program causing a computer to execute processing including steps of:
distributing packet data configuring a packet that stores data to be transmitted into a plurality of lanes;
transmitting data streams having same data structures including the distributed packet data to a reception device by using the plurality of lanes in parallel; and
in a case where the data stream is transmitted in a predetermined mode, when a parameter that defines content of the mode is changed, switching transmission of the data stream in the mode defined by the changed parameter is started after training processing for performing data synchronization and correction of a difference between data timings of the lanes by the reception device is executed or without executing the training processing according to a type of the parameter to be changed.

(14)
A reception device including:
a plurality of signal processing units configured to distribute packet data configuring a packet that stores data to be transmitted into a plurality of lanes and receive data streams transmitted from a transmission device that transmits the data streams having same data structures including the distributed packet data by using the plurality of lanes in parallel; and
a control unit configured to, in a case where the data stream is transmitted in a predetermined mode, when a parameter that defines content of the mode is changed, switch the reception of the data stream transmitted in the mode defined by the changed parameter is started after training processing for performing data synchronization and correction of a difference between data timings of the lanes is executed or without executing the training processing according to a type of the parameter to be changed.

(15)
The reception device according to (14), in which
in a case where a flag that is included in a header of the packet and indicates whether or not the parameter is changed indicates that the parameter is changed, the control unit starts to receive the data stream without executing the training processing.

(16)

The reception device according to (14), in which the control unit starts to receive the data stream by using the parameter included in the header as the changed parameter and without executing the training processing.

(17)

A control method including:
distributing packet data configuring a packet that stores data to be transmitted into a plurality of lanes and receiving data streams transmitted from a transmission device that transmits the data streams having same data structures including the distributed packet data by using the plurality of lanes in parallel; and
in a case where the data stream is transmitted in a predetermined mode, when a parameter that defines content of the mode is changed, switching the reception of the data stream transmitted in the mode defined by the changed parameter is started after training processing for performing data synchronization and correction of a difference between data timings of the lanes is executed or without executing the training processing according to a type of the parameter to be changed.

(18)

A program causing a computer to execute processing including steps of:
distributing packet data configuring a packet that stores data to be transmitted into a plurality of lanes and receiving data streams transmitted from a transmission device that transmits the data streams having same data structures including the distributed packet data by using the plurality of lanes in parallel; and
in a case where the data stream is transmitted in a predetermined mode, when a parameter that defines content of the mode is changed, switching the reception of the data stream transmitted in the mode defined by the changed parameter is started after training processing for performing data synchronization and correction of a difference between data timings of the lanes is executed or without executing the training processing according to a type of the parameter to be changed.

(19)

A transmission and reception system including:
a transmission device including:
a distribution unit that distributes packet data configuring a packet that stores data to be transmitted into a plurality of lanes;
a plurality of signal processing units that transmits data streams having same data structures including the distributed packet data to a reception device by using the plurality of lanes in parallel; and
a control unit that, in a case where the data stream is transmitted in a predetermined mode, when a parameter that defines content of the mode is changed, switches transmission of the data stream in the mode defined by the changed parameter is started after training processing for performing data synchronization and correction of a difference between data timings of the lanes by the reception device is executed or without executing the training processing according to a type of the parameter to be changed; and
a reception device including:
a plurality of signal processing units that receives the data streams transmitted from the transmission device; and
a control unit that, in a case where the data stream is transmitted in a predetermined mode, when the parameter is changed, switches reception of the data stream in the mode defined by the changed parameter is started after the training processing is executed or without executing the training processing according to a type of the parameter to be changed.

REFERENCE SIGNS LIST

1 Transmission system
11 Image sensor
12 DSP
21 Imaging unit
22 Transmission unit
31 Reception unit
32 Image processing unit
62 Pixel to Byte converter
63 Payload ECC insertion unit
64 Packet generation unit
65 Lane distribution unit
72 Header generation unit
83-0 to 83-N Signal processing unit
91 Control code insertion unit
92 8B10B symbol encoder
93 Synchronization unit
94 Transmission unit
102-0 to 102-N Signal processing unit
111 Reception unit
112 Clock generation unit
113 Synchronization unit
114 Symbol synchronization unit
115 10B8B symbol decoder
116 Skew correction unit
117 Control code removal unit
122 Lane integration unit
123 Packet separation unit
124 Payload error correction unit
125 Byte to Pixel converter
132 Header error correction unit

The invention claimed is:

1. A transmission device comprising:
distribution circuitry configured to distribute packet data configuring a packet that stores data to be transmitted into a plurality of lanes;
a plurality of signal processors configured to transmit data streams having same data structures including the distributed packet data to a reception device by using the plurality of lanes in parallel; and
a controller configured to, in a case where the data stream is transmitted in a mode, when a parameter that defines content of the mode is changed, switch transmission of the data stream in the mode defined by the changed parameter is started after training processing for performing data synchronization and correction of a difference between data timings of the lanes by the reception device is executed or is started without executing the training processing according to a type of the changed parameter, wherein
when the type of the changed parameter indicates that a type of a transmission rate of each lane is changed, the transmission of the data stream in the mode defined by the changed parameter is started after the training processing.

2. The transmission device according to claim 1, wherein the data to be transmitted includes image data acquired by imaging, and
the image data is stored in each of the packets in line unit.

3. The transmission device according to claim 2, further comprising:
an imaging unit configured to set the parameter and to be a supply source of the image data, wherein
in a case where information that is transmitted from the reception device and requires change in the mode is received by the imaging unit, the controller reflects the change in the parameter set by the imaging unit.

4. The transmission device according to claim 2, wherein
in a case where the transmission of the data stream in the mode defined by the changed parameter is started without executing the training processing,
the plurality of signal processors transmits blanking data in a period required for the training processing in a case where the training processing is executed and transmits the data stream after the transmission of the blanking data is completed.

5. The transmission device according to claim 4, wherein the plurality of signal processors transmits the blanking data until transmission of a next frame is started with reference to a timing when the parameter is changed.

6. The transmission device according to claim 2, wherein
in a case where the parameter is changed in a blanking interval after a predetermined line is transmitted, the plurality of signal processors transmits the packet data configuring the packet that stores the image data of a next line of the predetermined line in the mode defined by the changed parameter.

7. The transmission device according to claim 2, wherein
in a case where the parameter is changed in a blanking interval after a predetermined frame is transmitted, the plurality of signal processors transmits the packet data configuring the packet that stores the image data of a next frame of the predetermined frame in the mode defined by the changed parameter.

8. The transmission device according to claim 1, further comprising:
packet generation circuitry configured to generate the packet including a flag indicating whether or not the parameter is changed in a header.

9. The transmission device according to claim 1, further comprising:
packet generation circuitry configured to generate the packet including the changed parameter in a header.

10. The transmission device according to claim 2, wherein the parameter further includes at least one of
lane information representing the number of lanes used to transmit the data stream,
bit information representing a bit length of each pixel included in the image data,
line information representing the number of pixels in one line,
error correction code information representing a type of an error correction code used to correct an error in payload data configuring the packet, or
error detection code information representing a type of an error detection code that is included in a footer configuring the packet and is used to detect the payload data.

11. The transmission device according to claim 10, wherein
in a case where the parameter to be changed is the lane information or the rate information, the controller starts to transmit the data stream in the mode defined by the changed parameter after the training processing is executed, and in a case where the parameter to be changed is the bit information, the line information, the error correction code information, or the error detection code information, the controller starts to transmit the data stream in the mode defined by the changed parameter without executing the training processing.

12. A control method comprising:
distributing packet data configuring a packet that stores data to be transmitted into a plurality of lanes;
transmitting data streams having same data structures including the distributed packet data to a reception device by using the plurality of lanes in parallel; and
in a case where the data stream is transmitted in a mode, when a parameter that defines content of the mode is changed, switching transmission of the data stream in the mode defined by the changed parameter, the switching transmission being started after training processing for performing data synchronization and correction of a difference between data timings of the lanes by the reception device is executed or being started without executing the training processing, according to a type of the changed parameter, wherein
when the type of the changed parameter indicates that a type of a transmission rate of each lane is changed, the transmission of the data stream in the mode defined by the changed parameter is started after the training processing.

13. A non-transitory computer readable medium storing a program, the program being executable by a computer to perform operations comprising:
distributing packet data configuring a packet that stores data to be transmitted into a plurality of lanes;
transmitting data streams having the same data structure including the distributed packet data to a reception device by using the plurality of lanes in parallel; and
in a case where the data stream is transmitted in a mode, when a parameter that defines content of the mode is changed, switching transmission of the data stream in the mode defined by the changed parameter, the switching transmission being started after training processing for performing data synchronization and correction of a difference between data timings of the lanes by the reception device is executed or being started without executing the training processing, according to a type of the changed parameter, wherein
when the type of the changed parameter indicates that a type of a transmission rate of each lane is changed, the transmission of the data stream in the mode defined by the changed parameter is started after the training processing.

14. A reception device comprising:
a plurality of signal processors configured to distribute packet data configuring a packet that stores data to be transmitted into a plurality of lanes and receive data streams transmitted from a transmission device that transmits the data streams having same data structures including the distributed packet data by using the plurality of lanes in parallel; and
a controller configured to, in a case where the data stream is transmitted in a mode, when a parameter that defines content of the mode is changed, switch the reception of the data stream transmitted in the mode defined by the changed parameter the switch being started after training processing for performing data synchronization and correction of a difference between data timings of the lanes is executed or being started without executing the training processing according to a type of the changed parameter, wherein when the type of the changed parameter indicates that a type of a transmission rate of each lane is changed, the transmission of the data stream in the mode defined by the changed parameter is started after the training processing.

15. The reception device according to claim 14, wherein in a case where a flag that is included in a header of the packet and indicates whether or not the parameter is changed indicates that the parameter is changed, the controller starts to receive the data stream without executing the training processing.

16. The reception device according to claim 14, wherein the controller starts to receive the data stream by using the parameter included in the header as the changed parameter and without executing the training processing.

17. A control method comprising:
distributing packet data configuring a packet that stores data to be transmitted into a plurality of lanes and receiving data streams transmitted from a transmission device that transmits the data streams having same data structures including the distributed packet data by using the plurality of lanes in parallel; and
in a case where the data stream is transmitted in a mode, when a parameter that defines content of the mode is changed, switching the reception of the data stream transmitted in the mode defined by the changed parameter is started after training processing for performing data synchronization and correction of a difference between data timings of the lanes is executed or is started without executing the training processing according to a type of the changed parameter, wherein
when the type of the changed parameter indicates that a type of a transmission rate of each lane is changed, the transmission of the data stream in the mode defined by the changed parameter is started after the training processing.

18. A non-transitory computer readable medium storing a program, the program being executable by a computer to perform operations comprising:
distributing packet data configuring a packet that stores data to be transmitted into a plurality of lanes and receiving data streams transmitted from a transmission device that transmits the data streams having same data structures including the distributed packet data by using the plurality of lanes in parallel; and
in a case where the data stream is transmitted in a mode, when a parameter that defines content of the mode is changed, switching the reception of the data stream transmitted in the mode defined by the changed parameter is started after training processing for performing data synchronization and correction of a difference between data timings of the lanes is executed or is started without executing the training processing according to a type of the changed parameter, wherein
when the type of the changed parameter indicates that a type of a transmission rate of each lane is changed, the transmission of the data stream in the mode defined by the changed parameter is started after the training processing.

19. A transmission and reception system comprising:
a transmission device including:
distribution circuitry that distributes packet data configuring a packet that stores data to be transmitted into a plurality of lanes;
a plurality of signal processors that transmits data streams having same data structures including the distributed packet data to a reception device by using the plurality of lanes in parallel; and
a controller that, in a case where the data stream is transmitted in a mode, when a parameter that defines content of the mode is changed, switches transmission of the data stream in the mode defined by the changed parameter is started after training processing for performing data synchronization and correction of a difference between data timings of the lanes by the reception device is executed or is started without executing the training processing, according to a type of the changed parameter, wherein
when the type of the changed parameter indicates that a type of a transmission rate of each lane is changed, the transmission of the data stream in the mode defined by the changed parameter is started after the training processing; and
a reception device including:
a plurality of signal processors that receives the data streams transmitted from the transmission device; and
a controller that, in a case where the data stream is transmitted in a mode, when the parameter is changed, switches reception of the data stream in the mode defined by the changed parameter is started after the training processing is executed or without executing the training processing according to the type of the changed parameter.

* * * * *